(12) United States Patent
Ogawa et al.

(10) Patent No.: US 10,163,115 B2
(45) Date of Patent: Dec. 25, 2018

(54) CONTROL METHOD FOR DISPLAYING MERCHANDISING INFORMATION ON INFORMATION TERMINAL

(71) Applicant: Panasonic Intellectual Property Corporation of America, Torrance, CA (US)

(72) Inventors: Kento Ogawa, Osaka (JP); Toru Tanigawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 758 days.

(21) Appl. No.: 14/443,489

(22) PCT Filed: Dec. 27, 2013

(86) PCT No.: PCT/JP2013/007665
§ 371 (c)(1),
(2) Date: May 18, 2015

(87) PCT Pub. No.: WO2015/040661
PCT Pub. Date: Mar. 26, 2015

(65) Prior Publication Data
US 2015/0348060 A1    Dec. 3, 2015

Related U.S. Application Data

(60) Provisional application No. 61/879,855, filed on Sep. 19, 2013.

(51) Int. Cl.
*G06Q 30/00* (2012.01)
*G06Q 30/02* (2012.01)
(Continued)

(52) U.S. Cl.
CPC ..... *G06Q 30/0201* (2013.01); *G06F 3/04842* (2013.01); *G06K 9/00335* (2013.01);
(Continued)

(58) Field of Classification Search
CPC .................................................. G06Q 30/0201
See application file for complete search history.

(56) References Cited

U.S. PATENT DOCUMENTS

| 2003/0204453 A1* | 10/2003 | Kawamata | G06Q 10/087 705/28 |
| 2007/0067203 A1* | 3/2007 | Gil | G06Q 10/087 705/7.32 |
| 2009/0009317 A1* | 1/2009 | Weaver | G06Q 10/06 340/517 |

FOREIGN PATENT DOCUMENTS

| JP | 11-64505 | 3/1999 |
| JP | 2003-323539 | 11/2003 |

(Continued)

OTHER PUBLICATIONS

International Search Report dated Feb. 4, 2014 in corresponding International Application No. PCT/JP2013/007665.

*Primary Examiner* — Mario C. Iosif
(74) *Attorney, Agent, or Firm* — Wenderoth, Lind & Ponack, L.L.P.

(57) ABSTRACT

An MD management device manages action statistics associated with each of a plurality of shelving units. Action statistics for one shelving unit indicate actions that store visitors make near the shelving unit. An information terminal device acquires, from the MD management device merchandising information for each shelving unit. Merchandising information for one shelving unit includes a value of statistics for the shelving unit. The information terminal device displays a store screen including one or more shelving unit icons each representing one of one or more shelving (Continued)

units located in a store. Further, the information terminal device displays a graphic item in the vicinity of each shelving unit icon. The graphic item is displayed in a display state that is in accordance with the value of statistics for the corresponding shelving unit.

24 Claims, 51 Drawing Sheets

(51) Int. Cl.
*G06F 3/0484* (2013.01)
*G06K 9/00* (2006.01)
*G06K 9/62* (2006.01)
*G06T 11/20* (2006.01)

(52) U.S. Cl.
CPC ....... *G06K 9/00771* (2013.01); *G06K 9/6253* (2013.01); *G06Q 30/02* (2013.01); *G06Q 30/0254* (2013.01); *G06T 11/206* (2013.01)

(56) References Cited

FOREIGN PATENT DOCUMENTS

| | | |
|---|---|---|
| JP | 2006-309280 | 11/2006 |
| JP | 2007-122266 | 5/2007 |
| JP | 2011-253344 | 12/2011 |
| JP | 2012-22528 | 2/2012 |
| JP | 2012-88878 | 5/2012 |

* cited by examiner

Human absent image

Human present image

Reach image

Hand holding image

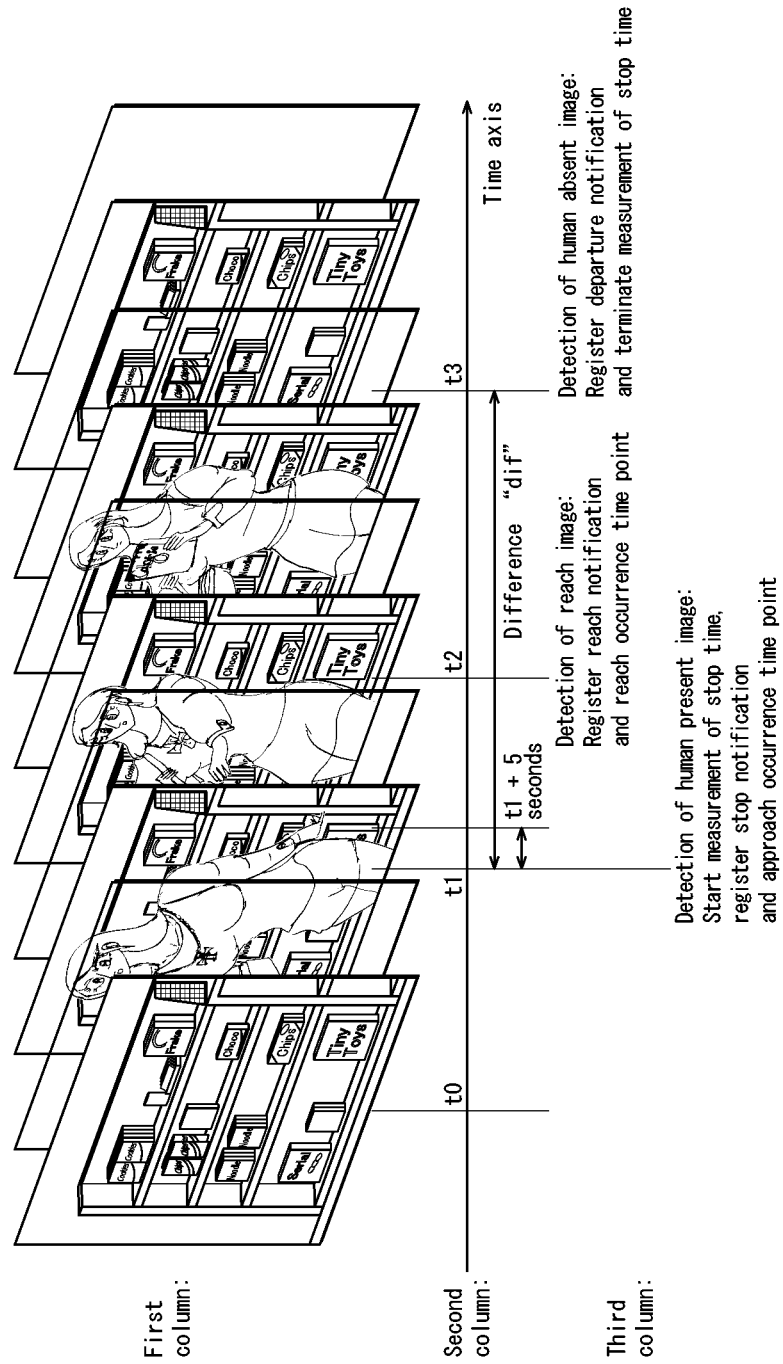

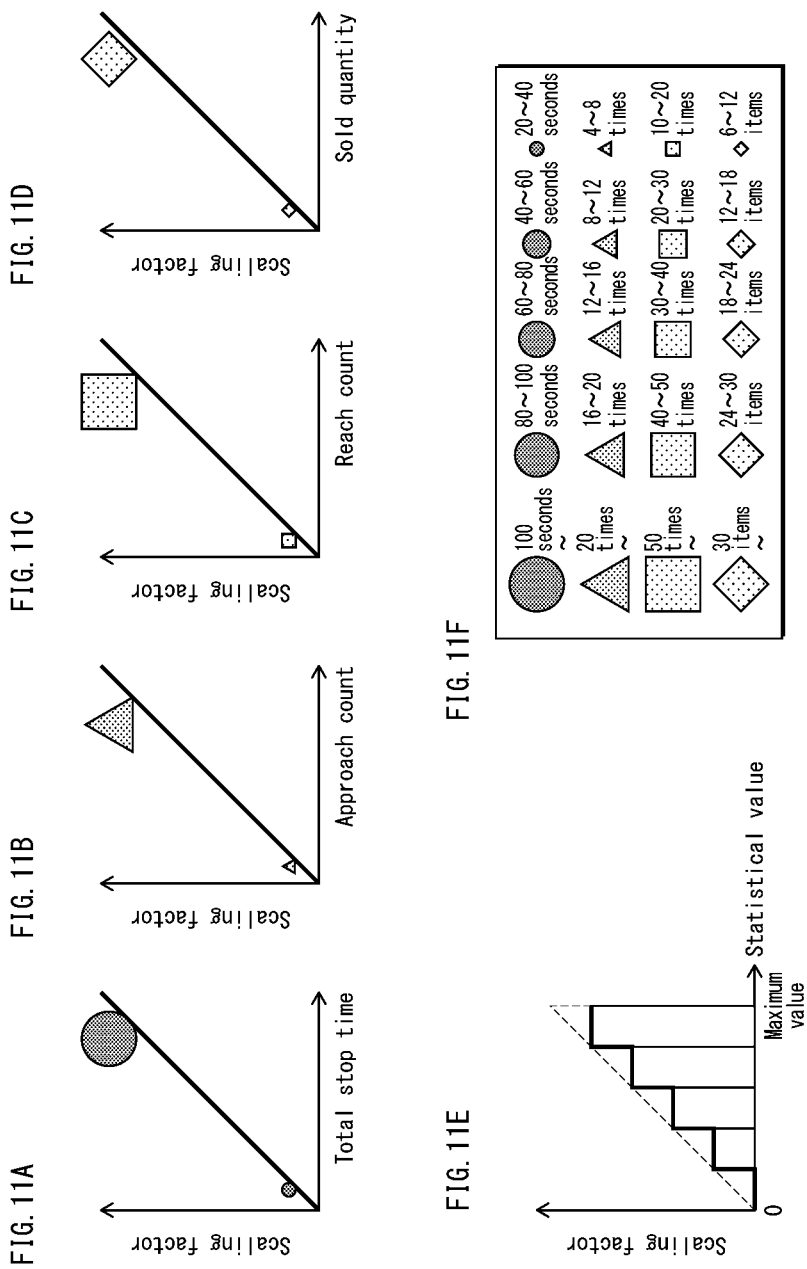

FIG. 14A
*Sold quantity/statistical value graphics plane*
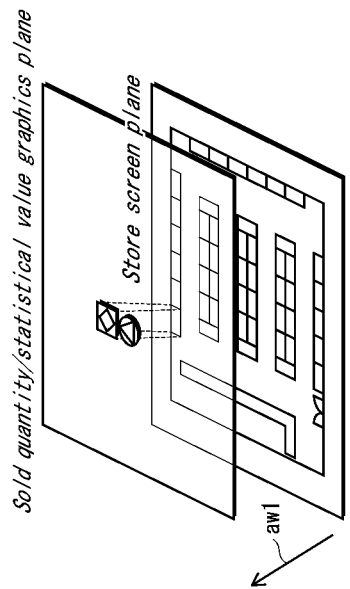
FIG. 14B
Figure that is a combination of figure indicating sold quantity and figure indicating reach count
FIG. 14C
Figure that is a combination of figure indicating stop time and figure indicating approach count
FIG. 14D
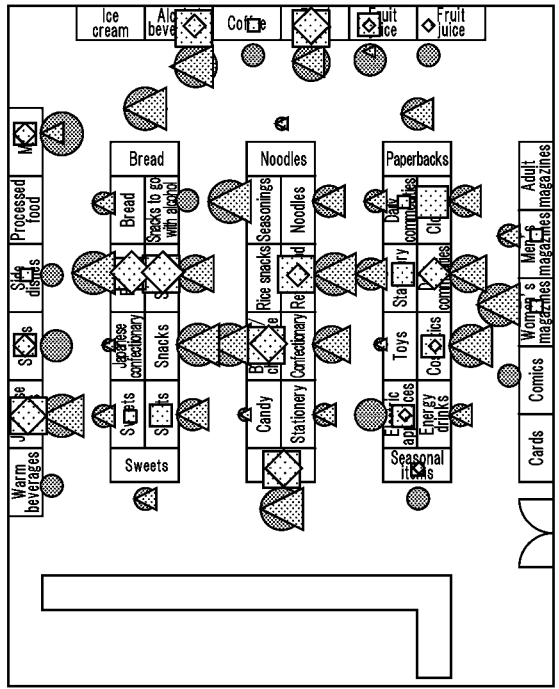

FIG. 15A
|  | OffsetX | OffsetY |
|---|---|---|
| Aisle at lower side | +(Icon_width)/4 | +Icon_height |
| Aisle at upper side | +(Icon_width)/4 | −Icon_height |
| Aisle at left side | −Icon_width | +(Icon_height)/4 |
| Aisle at right side | +Icon_width | +(Icon_height)/4 |
FIG. 15B
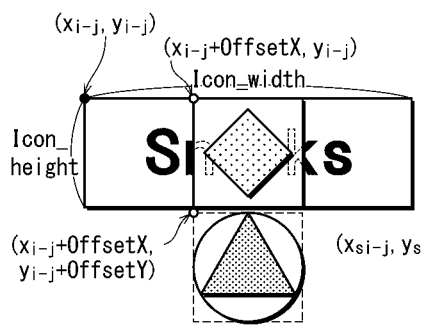
FIG. 15C
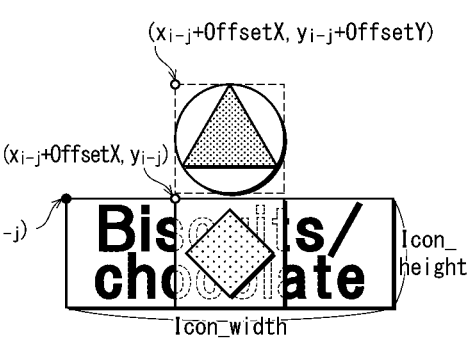
FIG. 15D
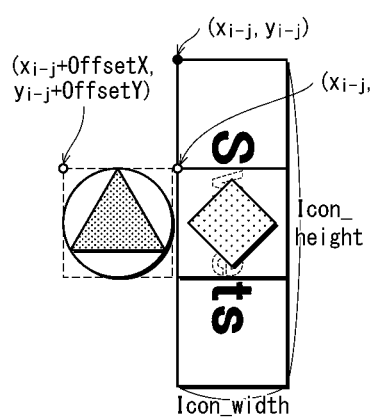
FIG. 15E
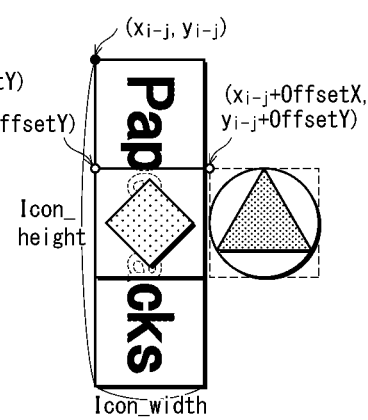

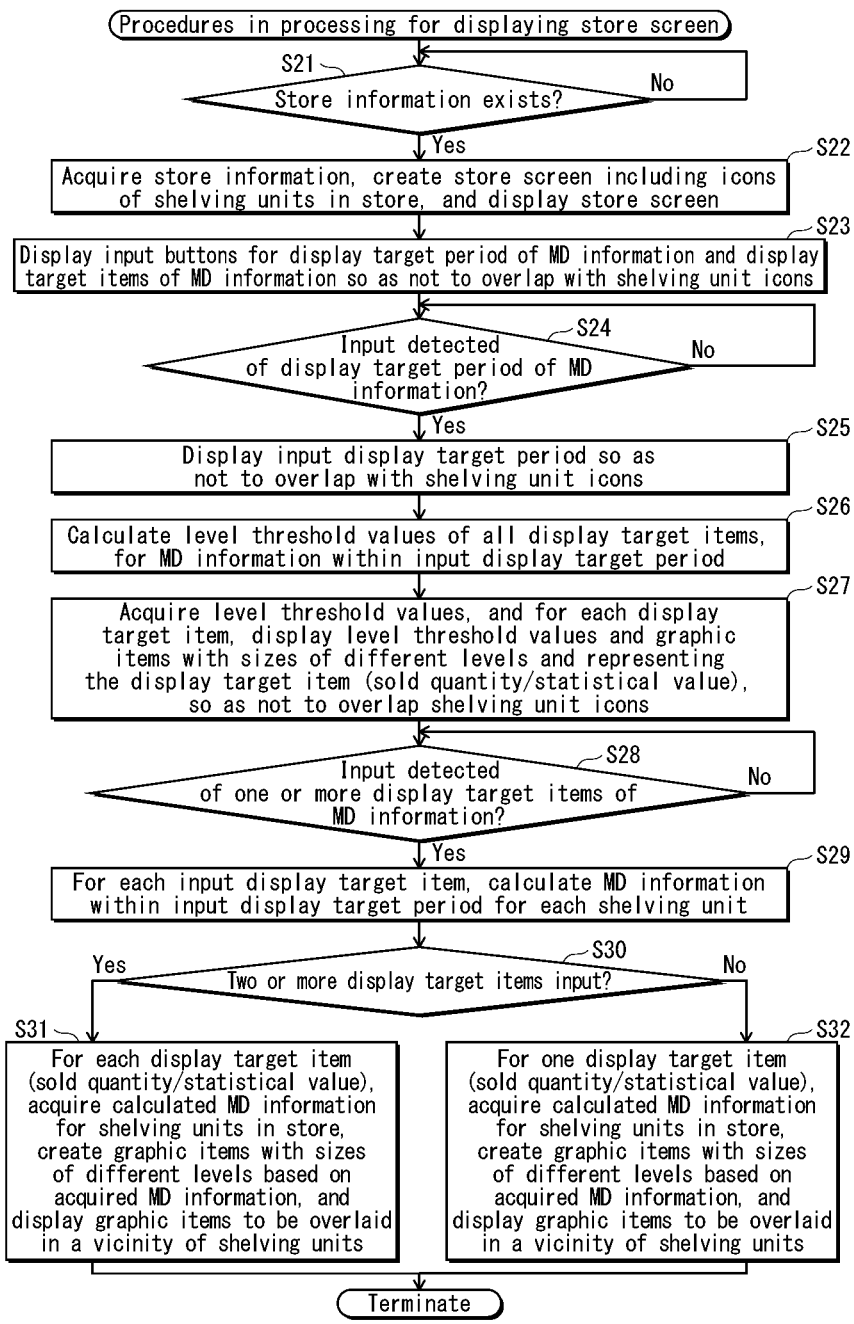

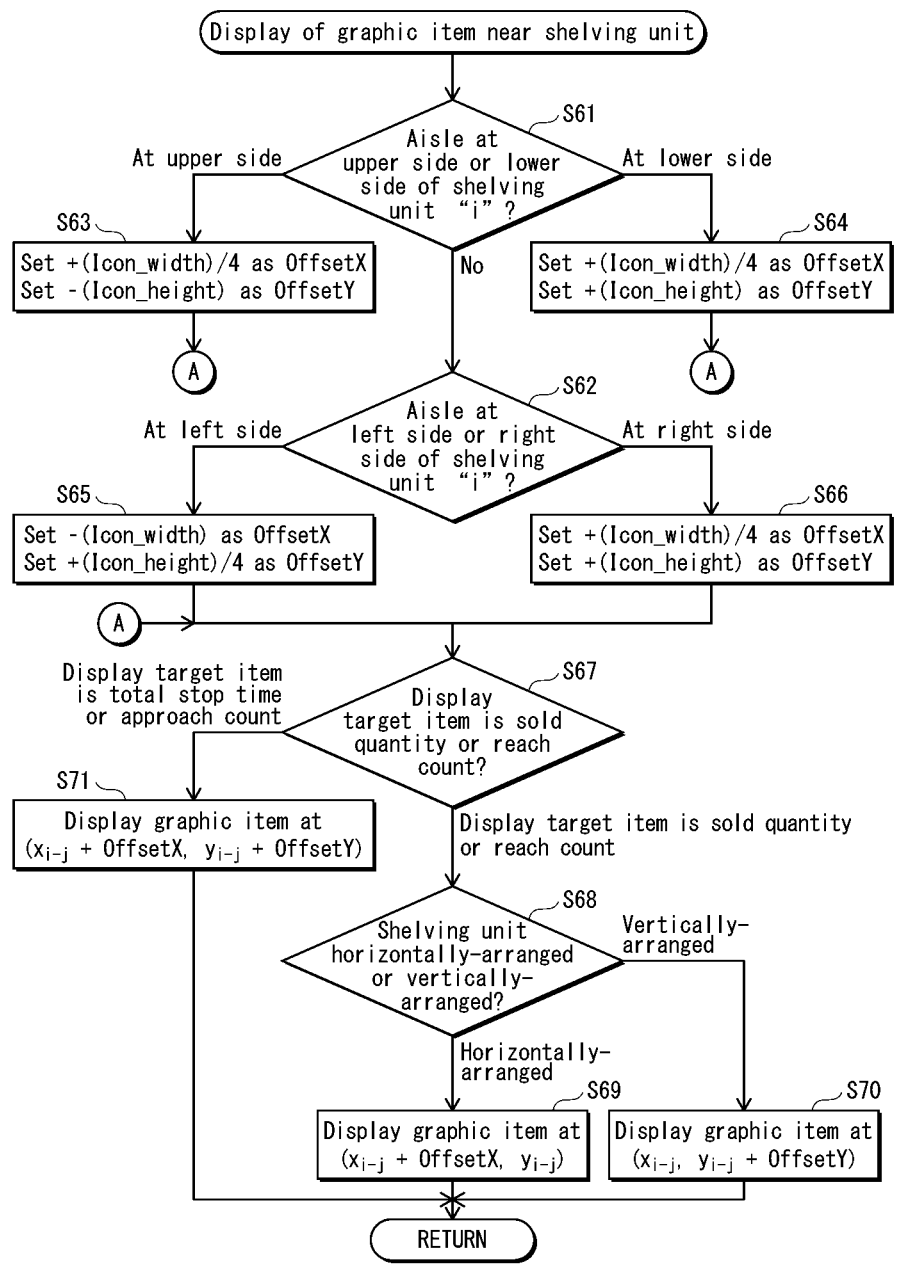

Store screen and MD information screen when selecting icon of shelving unit for which shelving units of same genre exist Store screen when setting display target items of MD information in a case where threshold values of numerical information defining levels of graphic items of MD information are varied Store screen and MD information screen when making configuration to display all graphic items for each display target item of MD information in a case where threshold values of numerical information defining levels of graphic items of MD information are the same

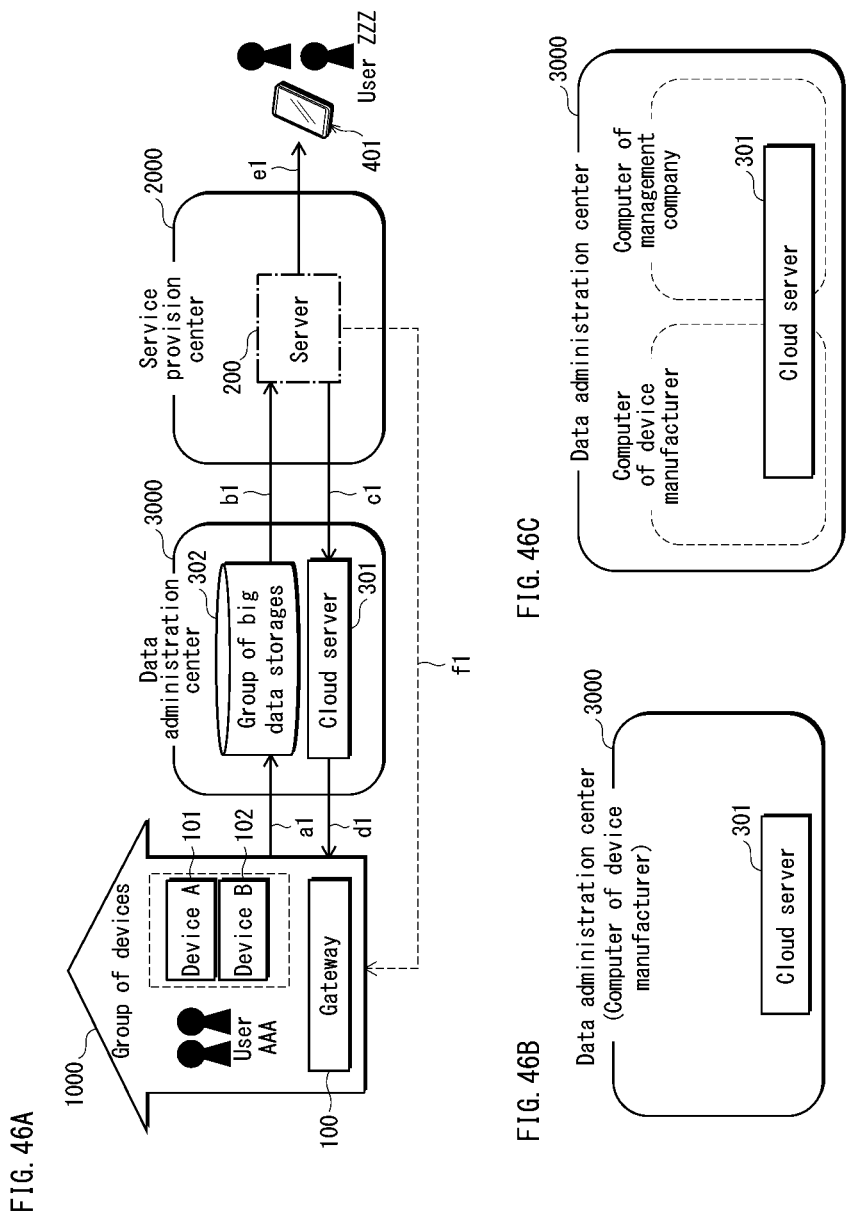

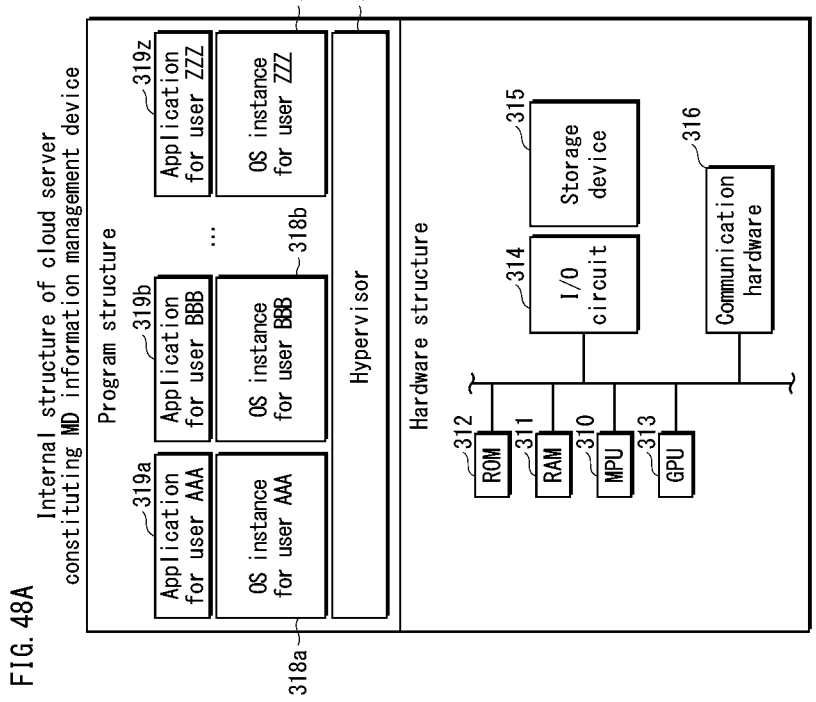

CONTROL METHOD FOR DISPLAYING MERCHANDISING INFORMATION ON INFORMATION TERMINAL

This application is the National Stage of PCT/JP2013/007665, filed Dec. 27, 2013, which claims the benefit of U.S. Provisional Application No. 61/879,855, filed Sep. 19, 2013.

TECHNICAL FIELD

The present invention belongs to the technical field of technology for assessing store layout.

BACKGROUND ART

Typically, a store layout refers to how shelving units with merchandise of various types are arranged. Shelving units may be located at various places, e.g., near an entrance, in front of a cash register, facing a road, and at an inner part of a store. Arranging shelving units at appropriate locations according to merchandise thereon leads to an increase in merchandise sales. Meanwhile, a franchiser running a franchise business with a large number of franchise stores has a desire to, as one form of merchandising, assess store layouts of the franchise stores to grasp consumer behavior.

CITATION LIST

Patent Literature

[Patent Literature 1]
Japanese Patent Application Publication No. H11-064505
[Patent Literature 2]
Japanese Patent Application Publication No. 2003-323539

SUMMARY OF INVENTION

Technical Problem

Franchise stores in a franchise chain basically carry the same merchandise. However, merchandise sales may differ greatly between stores, regardless of this similarity in the merchandise carried by the stores. This is a result of the stores having different locations, the stores having different sales staff, the stores having different shelving unit layouts, and the like. Different stores have different locations, such that a first store is located in front of a train station, a second store is located in a business district, and a third store is located in an academic district. Changing locations of stores is not practical. This is since, changing a location of a store requires much work. Changing store staff is also not practical. Meanwhile, shelving unit layout and merchandise arrangement can be changed to a certain extent. This is since shelving unit layout can be changed through store remodeling, simple renovation, and the like. Accordingly, analyzing what difference in shelving unit layout is giving rise to difference in merchandise sales between stores and improving shelving unit layout based on such analysis are an important part of franchise chain business strategy. However, store merchandise sales is affected by multiple factors that cannot be clearly separated from one another, such as store location, etc., and shelving unit layout. Accordingly, it is very difficult to individually assess the influence that shelving unit layout has on merchandise sales while excluding the influence that store location has on merchandise sales.

Conventionally, even when a franchise store with low sales exists, there are not so many plans for improving the shelving unit layout of the store. Accordingly, conventional franchise chain business strategies tend to leave such a store as it is, i.e., without improving the low sales of the store. However, an increase in the number of stores left to have low sales as described above may result in a great drop in revenue of the franchiser.

In the above, a technical problem is presented, assuming that a store that is the target of sales promotion is a convenience store in a franchise chain. However, this example is taken merely in order to describe the technical problem based on a familiar example, and the technical problem applies to various other cases differing from the above-described example. For example, the same technical problem may arise in the sales of merchandise in general, by supermarkets, large-sized mass retailers, and the like. Thus, the technical problem will be faced without exception by skilled artisans in this technical field who attempt to practically implement the above.

The present invention aims to comprehensively assess a shelving unit layout of a store.

Solution to Technical Problem

The technical problem described above can be solved by providing:
a means causing a display to display a store screen including at least one shelving unit object representing at least one shelving unit located in a store; and
a means for acquiring a plurality of types of merchandising information from a management device, and overlaying a first graphic item and a second graphic item on or near the shelving unit object each in a predetermined display state, the first graphic item and the second graphic item each corresponding to one of the plurality of types of merchandising information.

Here, the predetermined display state of at least one of the first graphic item and the second graphic item is in accordance with a value of statistics indicated by a corresponding one of the types of merchandising information, the statistics pertaining to an action that store visitors make near the shelving unit.

Advantageous Effect of Invention

Each of the first graphic item and the second graphic item corresponds to one of the plurality of types of merchandising information. As such, displaying/comparing multiple ones among the plurality of types of merchandising information is possible. Further, the predetermined display state of at least one of the first graphic item and the second graphic items indicates a value of statistics pertaining to an action that store visitors make near the shelving unit. As such, the displaying/comparing of multiple types of merchandising information is closely related to store visitor behavior in the store, indicating for example, the proportion of the number of times store visitors actually purchase merchandise to the number of times store visitors stop at the shelving unit, or at what rate each one of a plurality of types of actions pertaining to action statistics have taken place. Due to such graphic items being displayed in the vicinity of the shelving unit object, it can be intuitively determined, based on statistics indicating the behavior of a plurality of store visitors, what layout of shelving units has affected the behavior of store visitors, has attracted customers, and has lead to sales increase. Further, when merchandise sales does not increase as desired, a problem in the layout of shelving units in a store can be intuitively determined, based on statistics indicating the behavior of a plurality of store visitors. This allows determining strategies for improving the layout of shelving units in stores. As such, staff belonging to a franchise chain, which includes a large number of franchise stores, owners of supermarkets, large-size mass retailers, privately owned stores, etc., are able to provide accurate instructions to retail stores with low sales as to how store layout should be improved. Accordingly, improvement of business revenue can be achieved.

BRIEF DESCRIPTION OF DRAWINGS

FIG. 7 is a diagram in which the human absent image data, the human present image data, the reach image data, and the hand holding image data, respectively illustrated in FIGS. 6A, 6B, 6C, and 6D, are indicated on a time axis.

FIG. 11A is an example of a graph illustrating the relationship between a scaling factor and the total stop time, FIG. 11B is an example of a graph illustrating the relationship between a scaling factor and the approach count, FIG. 11C is an example of a graph illustrating the relationship between a scaling factor and the reach count, and FIG. 11D is an example of a graph illustrating the relationship between a scaling factor and a sold quantity. FIG. 11E illustrates bar graphs, each corresponding to one of five levels yielded by dividing a scaling factor. FIG. 11F illustrates the relationship between a graphic item and the total stop time, a graphic item and the approach count, a graphic item and the reach count, a graphic item and the sold quantity.

FIG. 14A illustrates compositing of a sold quantity/statistical value plane and a store screen plane, among plane layers. FIG. 14B illustrates a "card with diamond" figure, and FIG. 14C illustrates a "circle with pyramid" figure. FIG. 14D illustrates an application screen image yielded by executing graphic item compositing of a sold quantity graphic item and three statistical value graphic items (a reach count graphic item, a total stop time graphic item, and an approach count graphic item) with respect to all shelving units.

FIG. 15A illustrates how an X-direction offset and a Y-direction offset change depending upon which side faces an aisle. FIGS. 15B through 15E each illustrate a two-dimensional arrangement of a corresponding one of the sold quantity graphic item, the reach graphic item, the total stop time graphic item, and the approach count graphic item.

FIG. 25 is a flowchart illustrating processing procedures in store screen display.

FIG. 27 is a flowchart illustrating processing procedures in graphic item display in the vicinity of shelving units.

FIG. 46A illustrates a computer system (information provision system) for achieving provision of merchandising information. FIG. 46B illustrates a structure where a computer of a device manufacturer corresponds to a data administration center 3000 FIG. 46C illustrates an example where at least one of a computer of a device manufacturer and a computer of a different management company corresponds to the data administration center 3000.

FIG. 48A illustrates the internal structure of a cloud server. FIG. 48B illustrates the internal structure of an application 319. FIG. 48C illustrates the internal structure of the information terminal device 20.

DESCRIPTION OF EMBODIMENTS

Figure 1:
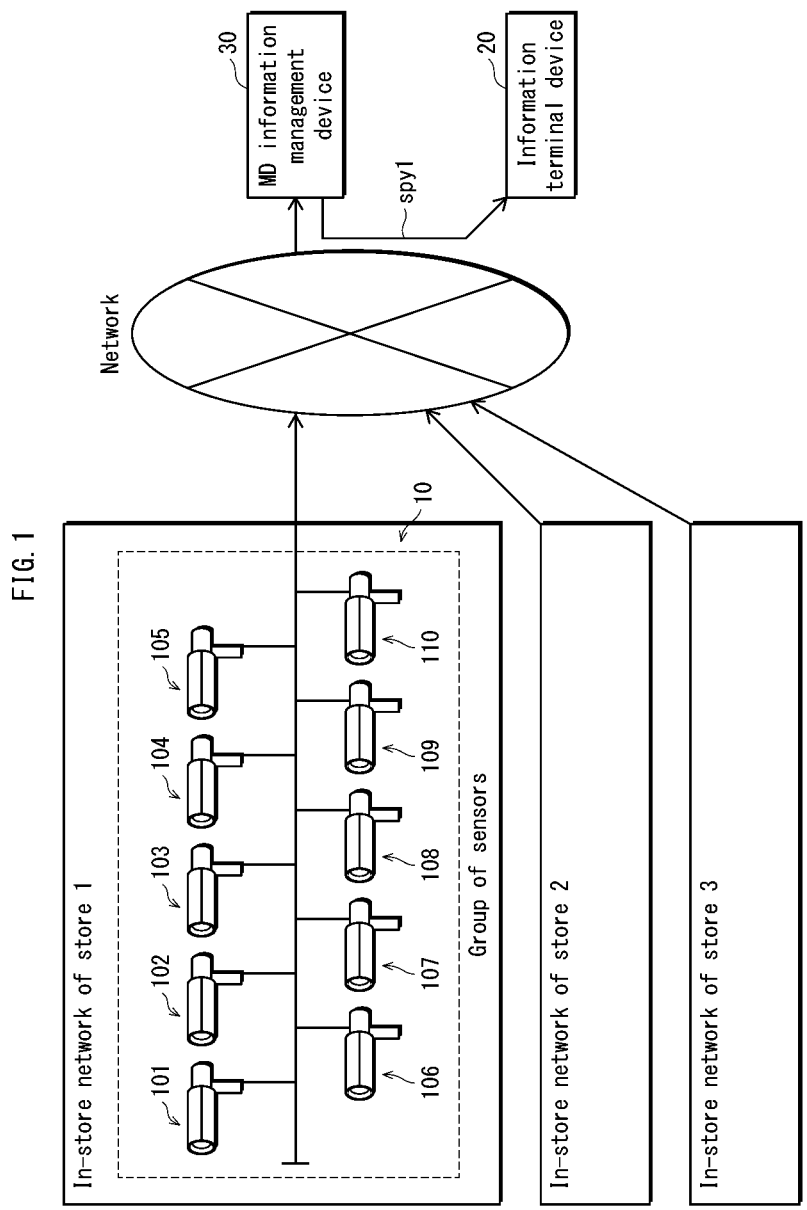
FIG. 1 illustrates an overall structure of a system including an information terminal device 20 and an MD information management device 30.

The inventors of the present invention were challenged with various technical barriers in implementing a control method providing the solution described above. The following describes the process through which the present inventors overcame such technical barriers.

Generally, shelving unit layout mentally influences a store visitor who visits a store with a vague expectation that he/she might find merchandise that impresses him/her.

Specifically, stores carrying various types of merchandise, such as convenience stores, supermarkets, large-size mass retailers, privately-owned stores, etc., are visited by store visitors with such expectations. Such store visitors are whimsical, in the sense that they may or may not buy merchandise depending upon slight differences in store atmosphere.

This said about the behavior of store visitors, it is necessary to analyze how actions of store visitors around shelving units are linked with the purchase of merchandise. That is, a comprehensive analysis is necessary, of the difference between shelving units that attract store visitors but do not sell merchandise and shelving units that actually sell merchandise, and of how factors, such as the amount of time store visitors spend inside a store and the number of times store visitors reach for merchandise, are linked with the purchase of merchandise.

The present inventors considered that application of technology of displaying merchandising information is ideal to keep track of the behavior of such store visitors. Patent Literatures 1 and 2 disclose conventional technology for separately displaying merchandising information of shelving units. Patent Literature 1 discloses a technology of displaying the total amount of time spent at a shelving unit by using a symbol, i.e., a black dot. Patent Literature 2 discloses a technology of displaying, in a merchandise allocation diagram with marks indicating top-selling merchandise and slow-selling merchandise, merchandising information for a specific shelving unit.

Specifically, Patent Literature 1 discloses providing a shelving unit with a transmitter and a shopping basket carried by a customer with a receiver, and calculating a track of movement of the customer and the total amount of time spent at different shelving units. Further, Patent Literature 1 discloses displaying symbols, i.e., block dots, indicating the total amount of time spent by the customer at the different shelving units in a shelving unit allocation diagram. Accordingly, the shelving unit allocation diagram of Patent Literature 1 accurately represents the movement of a specific visitor, but does not analyze how shelving unit layout influences the behavior of numerous, unspecified store visitors visiting a store.

Patent Literature 2 discloses displaying detailed information of merchandise on a shelving unit when an icon for the shelving unit is selected in the merchandise layout diagram. The detailed information of merchandise on a shelving unit, which is provided for each shelving unit, includes a quantity of merchandise bought in for sales, a quantity of merchandise in stock, and a name of a manufacturer. The conventional technology disclosed in Patent Literature 2 enables keeping track of such information (i.e., the quantity of merchandise bought in for sales, the quantity of merchandise in stock, and the name of a manufacturer) separately for each shelving unit. However, the conventional technology disclosed in Patent Literature 2 does not present sufficient information as to how the movement of numerous, unspecified store visitors are influenced.

Aspects for overcoming the above-described technical barriers include the basic aspect described in 1. First Aspect, which is the most basic among the aspects, and others described in and following 2. Second aspect, which are modifications deriving from the basic aspect.

1. First Aspect: Basic Aspect

One aspect for overcoming the above-described technical barriers is, a control method of controlling an information terminal that has a display for displaying a store screen representing a store having at least one shelving unit for displaying merchandise, the control method including:

causing a computer of the information terminal to display the store screen, the store screen including at least one shelving unit object representing the at least one shelving unit; and acquiring a plurality of types of merchandising information from a management device, and overlaying a first graphic item and a second graphic item on or near the shelving unit object each in a predetermined display state, the first graphic item and the second graphic item each corresponding to one of the plurality of types of merchandising information.

In this aspect, the predetermined display state of at least one of the first graphic item and the second graphic item is in accordance with a value of statistics indicated by a corresponding one of the types of merchandising information, the statistics pertaining to an action that store visitors make near the shelving unit.

Each of the first graphic item and the second graphic item corresponds to one of the plurality of types of merchandising information. As such, displaying and comparing multiple ones among the plurality of types of merchandising information are possible. Further, since at least one of the first graphic item and the second graphic item is a visualization of a value of statistics pertaining to an action that store visitors make near the shelving unit, when focusing on one specific type of action of store visitors, at least one of the first graphic item and the second graphic item represents distribution of the action with respect to shelving units. When a plurality of shelving units are located in the store, this distribution indicates at which shelving units the specific type of action has occurred frequently. As such, this aspect visualizes the distribution of action among shelving units, and thus, allows assessing how store layout is affecting store sales.

In addition, this aspect displays actions of a plurality of store visitors visiting the store in the store screen. Thus, the behavior of the store visitors can be analyzed comprehensively.

The following describes the technical scope of terms included in the basic aspect.

Merchandising information ("MD information" in the following) is information for promoting merchandise sales, and is supported by numerical values of some type. Here, information for promoting merchandise sales may be any information, as long as such information is supported by numerical values of some type. Accordingly, the information for promoting merchandise sales encompasses a wide variety of information, including, for example: advertisement information supported by a current foreign exchange rate, a current stock price average, a current business condition index, a current GDP, etc.; a sales manual supported by the number of merchandise shipped, the number of merchandise in the market, the number of merchandise sold, the number of merchandise to be sold, etc.; sales know-how information supported by user trend, etc.; sales promotion information supported by the number of respondents selecting specific answers, the ratio of the number of respondents selecting different answers, etc., in a consumer questionnaire; and sales promotion information supported by a program rating. Further, merchandise may be a classification or genre of merchandise, merchandise under a brand of a certain manufacturer, one merchandise item that is identified by one distribution code, items of merchandise that are commonly accepted as belonging to one merchandise type, or a group of merchandise items that are identified by a general name. In connection with this, the basic aspect described above is characterized in that among the plurality of types of MD information, one type of MD information is information for sales promotion of merchandise of a specific genre and is supported by a value of statistics pertaining to one type of action that store visitors make near shelving units. Thus, sales promotion information supported by a value of statistics can be compared with sales promotion information supported by a different value.

Statistics indicating an action that store visitors make ("action statistics" in the following) are statistics acquired by classifying actions that various store visitors of different age ranges, of different sex, and different occupations may make in a store based on a predetermined rule. Action statistics are acquired for actions in general which can be collected through physical means, electro-magnetic means, optical means, and information processing, one example of which being image recognition. For example, such actions include: entry to a store; departure from a store; payment of money at a cash register; receiving of a ticket in a store; walking through a store aisle; conversation with a store staff or with another store visitor; viewing of a paper item such as a pamphlet, a flyer, or a poster; viewing of a merchandise label; operation of a mobile phones or a smartphone; use of the lavatory; and use of an automatic teller machine. Providing description on all such subordinate concepts included in action statistics may be acquired in the embodiments would be complex and thus non-desirable. Thus, the following provides description with focus on an action of stopping at a shelving unit ("stopping" in the following), an action of approaching a shelving unit to stop at the shelving unit ("approaching" in the following), and the action of reaching for merchandise on a shelving unit ("reaching" in the following), as examples of actions for which action statistics are acquired.

A value of statistics (statistical value in the following) is a value acquired through quantification of action statistics, and encompasses an average, a variance, a deviation, or a percentage. Providing description based on all such subordinate concepts in the embodiments would be complex and thus non-desirable. Thus, a statistical value is a value that indicates a count or a duration of time in embodiment 1.

A predetermined display state of a graphic item may be, in addition to graphs and charts indicating a level of a statistical value (e.g., a bar graph, a line graph, a color graph, a radar chart), a shape provided to a graphic item to indicate a level of a statistical value (e.g., a polygonal shape whose number of sides indicates a level of a statistical value), a texture provided to a graphic item to indicate a level of a statistical value, a character whose expression changes to indicate a level of a statistical value, a change in tone or brilliance of a graphic item to indicate a statistical value. Providing description based on all such subordinate concepts in the embodiments would be complex and thus non-desirable. Thus, description in the following is simplified by using a scaling factor of a graphic item (i.e., the size of a graphic item) as the predetermined display state of a graphic item.

A shelving unit object refers to a data object that is generated based on a class structure defined by an object-oriented programming language, is presented visually to a user, and is a target of user operations. In specific, a shelving unit object refers to any widget representing one shelving unit in a GUI. Providing description based on all subordinate concepts of widgets in the embodiments would be complex and thus non-desirable. Thus, description is provided in the following by using an icon representing a shelving unit (shelving unit icon in the following) as a shelving unit object.

A management device may be composed of a single computer or two or more computers in a distributed computing environment. As such, a management device may be composed of a computer (collecting server) that collects, from each shelving unit, an action log indicating of an action that a store visitor has made at a shelving unit, a computer (database server) that updates a database of action statistics based on the action log so collected, and a computer (information provision server) that creates MD information based on the database that is so updated and provides the MD information. Further, the database server, the collecting server, etc., may each be composed of a plurality of computers. Providing description based on all such subordinate concepts of the management device in the embodiments would be complex and thus non-desirable. Thus, in the description provided in embodiment 1, a management device is composed of a single computer. A system encompasses a wide variety of computer systems, including a computer system composed of a client computer and a server computer, a cloud network computer system in which an application is loaded on a cloud server, and a computer system in which computers perform peer to peer connection with one another.

At least one of the first graphic item and the second graphic item being in accordance with a value of statistics encompasses a case (i) where the first graphic item and the second graphic item respectively correspond to a graphic item indicating a sold quantity and a graphic item indicating a statistical value, and a case (ii) where each of the first graphic item and the second graphic item corresponds to a graphic item indicating a different type of statistical value. A graphic item indicating a sold quantity indicates the quantity of merchandise sold by a shelving unit. A graphic item indicating a statistical value indicates a statistical value pertaining to user action at a shelving unit, and is provided for each type of action. Providing description based on all subordinates concepts of the first and second graphic items in the embodiments would be complex and thus non-desirable. Thus, in embodiment 1, description is provided on a case where the first graphic item and the second graphic item respectively correspond to a graphic item indicating a sold quantity and a graphic item indicating a statistical value, and in addition to the first graphic item and the second graphic item, a third graphic item and a fourth graphic item exist. Note that in embodiment 1, the second graphic item, the third graphic item, and the fourth graphic item are graphic items each representing a statistical value of a different type of action statistics.

2. Second Aspect: Updating of Action Statistics by Management Device

In the First Aspect, updating of action statistics can be substantiated as the follows.

That is, it is preferable that the control method be such that the store is provided with a human-detecting sensor detecting presence and actions of store visitors near the shelving unit, the statistics are composed of a plurality of types of statistics each corresponding to a different type of action made by store visitors, and the control method further include each time the human-detecting sensor transmits an action log indicating that a store visitor has made a predetermined action near the shelving unit, updating one of the plurality of types of statistics that corresponds to the predetermined action.

According to this, a type of statistics corresponding to a predetermined action is updated. Accordingly, different types of actions of various store visitors visiting the store are used for statistical processing, disregarding the age and the sex of the store visitors.

Since different types of actions of various store visitors visiting the store are displayed separately each in a different form, the different types of action are usable as resource for analyzing store layout.

Here, considering availability, convenience, etc., the human-detecting sensor may be that of an infrared type. An infrared human-detecting sensor senses infrared light emitted from the human body, and a sensing unit of the sensor is activated and outputs a signal indicating that a human has been detected when a human approaches the sensor. Alternatively, the human-detecting sensor may be that of an ultrasound type, a microwave type, or an acoustic type. Alternatively, the human-detecting sensor may by a phase-type distance measurement sensor or a pyroelectric sensor. Alternatively, the human-detecting sensor may be a sensor detecting holding of merchandise by performing detection with respect to a tag for avoiding shoplifting, or when providing illumination with the human-detecting sensor, may be a motion sensor sensing approaching of a store visitor to the shelving unit or reaching of a store visitor to the shelving unit.

Alternatively, the human-detecting sensor may be an image sensor or a distance image sensor. Image sensors and distance image sensors detect the approaching, the stopping, and the reaching of store visitors according to a background difference method. The background difference method is a method of image-capturing a background image not including a detection target in advance, and detecting the detection target in an input image image-captured under the same conditions as the background image according to the difference between the background image and the input image. Providing description based on all such subordinates concepts in the embodiments would be complex and thus non-desirable. Thus, in embodiment 1, description is provided while using an image sensor as the human-detecting sensor.

3. Third Aspect: Substantiation of Total Stop Time

In the Second Aspect, the predetermined action and the predetermined type of statistics can be substantiated as follows.

That is, it is preferable that the control method be such that one of the plurality of types of statistics indicates a number of times store visitors approach the shelving unit and stop at the shelving unit, and when the human-detecting sensor transmits an action log indicating that a store visitor has approached the shelving unit and stopped at the shelving unit, the number of times is updated by increasing, in accordance with the transmitted action log, a current value of the number of times managed by the management unit.

According to this, the action statistics indicate the total time store visitors have stopped at one given shelving unit. Thus, the action statistics indicate how attractive the shelving unit is to store visitors. Accordingly, the attractiveness of shelving units to store visitors can be assessed based on the amount of time store visitors spend in front of the shelving units. Thus, it can be assessed, for example, which of a plurality of shelving units has merchandise displayed in a desirable manner.

4. Fourth Aspect: Substantiation of Approach Count

In the Second Aspect, the predetermined action and the predetermined type of statistics can be substantiated as follows.

That is, it is preferable that the control method be such that one of the plurality of types of statistics indicates an amount of time for which store visitors have stopped at the shelving unit, and when the human-detecting sensor transmits an action log indicating that a store visitor has approached the shelving unit and stopped at the shelving unit, the amount of time is updated by increasing, in accordance with a difference between a time point indicating that the store visitor has approached the shelving unit and stopped at the shelving unit and a time point indicating that the store visitor has departed from the shelving unit, a current value of the amount of time managed by the management unit.

According to this, the display state of a graphic item for a shelving unit changes depending upon the number of times store visitors have approached the shelving unit to stop at the shelving unit. As such, is can be assessed which shelving unit is attracting many people. This enables determining how shelving unit layout should be changed to change the flow of people in the store, and thus, is beneficial for providing individual advice and instructions to stores.

5. Fifth Aspect: Substantiation of Reaching Count

In the Third Aspect, the predetermined action and the predetermined type of statistics can be substantiated as follows.

That is, it is preferable that the control method be such that one of the plurality of types of statistics indicates a number of times store visitors have reached for the shelving unit, and when the human-detecting sensor transmits an action log indicating that a store visitor has reached for the shelving unit, the number of times is updated by increasing, in accordance with the transmitted action log, a current value of the number of times managed by the management unit.

According to this, the ability of shelving units to attract customers can be assessed based on the number of times store visitors perform the positive action of picking up merchandise and viewing the merchandise in his/her hands.

6. Sixth Aspect: Substantiation of Sold Quantity

In any of the First through Fifth Aspects, the first graphic item and the second graphic item can be substantiated as follows.

That is, it is preferable that the control method be such that one of the first graphic item and the second graphic item is dependent upon one of a number of times store visitors have approached the shelving unit and stopped at the shelving unit, an amount of time for which store visitors have stopped at the shelving unit, and a number of times store visitors have reached for the shelving unit, and another one of the first graphic item and the second graphic item is dependent upon a sold quantity of merchandise on the shelving unit.

According to this, action statistics for a given shelving unit can be directly compared with sold quantity for the given shelving unit. Accordingly, careful analysis is possible of the relationship between actions of store visitors near a shelving unit and the number of merchandise sold at the shelving unit.

7. Seventh Aspect: Substantiation of Display State in Accordance with Statistical Value In any of the First through Sixth Aspects, the predetermined display state that is in accordance with a statistical value can be substantiated as follows.

That is, it is preferable that the control method be such that the predetermined display state of each of the first graphic item and the second graphic item has a plurality of levels, one of which is applied according to which of a plurality of numerical ranges a corresponding value belongs to, the corresponding value being the value of statistics for one of the first graphic item and the second graphic item and being a sold quantity for another one of the first graphic item and the second graphic item, and threshold values defining the numerical ranges are the same for the first graphic item and the second graphic item.

According to this, the difference between statistics of shelving units can be understood intuitively by comparing the sizes of graphic items provided to the shelving units and determining shelving units provided with graphics of large size.

8. Eighth Aspect: Substantiation of Plurality of Levels for Statistical Value Classification In any of the First through Sixth Aspects, the predetermined display state that is in accordance with a statistical value can be substantiated as follows.

That is, it is preferable that the control method be such that the predetermined display state of each of the first graphic item and the second graphic item has a plurality of levels, one of which is applied according to which of a plurality of numerical ranges a corresponding value belongs to, the corresponding value being the value of statistics for both the first graphic item and the second graphic item, and a start value of a numerical range of a highest level is based on a maximum one of values of statistics for a plurality of shelving units, a start value of a numerical range of a lowest level is based on a result of dividing the start value of the numerical range of the highest level by a number of levels included in the plurality of levels, and a start value of a numerical range that is not the highest level or the lowest level is based on a multiple of the start value of the numerical range of the lowest level.

According to this, when visualizing statistical values by changing the size of a graphic item in levels, the number of levels is determined according to the maximum statistical value. Thus, the sizes of graphic items in a store screen are well-balanced, being normalized according to the maximum values of a plurality of action statistics. Accordingly, it is possible to intuitively understand at which shelving unit much user action has taken place. Further, according to this aspect, when graphic items corresponding to a plurality of types of MD information are overlaid, the comparison between values of sold quantity and one or more statistical values can be visually presented in an easily understandable state.

9. Ninth Aspect: Substantiation of Numerical Ranges for Levels

In the Eighth Aspect, the numerical ranges corresponding to the levels can be substantiated as follows.

That is, it is preferable that the control method be such that an end value of a given one of the plurality of numerical ranges is based on a result of adding the start value of the numerical range of the lowest level to a start value of the given one of the plurality of numerical ranges.

According to this, an end point of a numerical range of a given level is defined by a start point of the numerical range of the given level, and the start point of a numerical range of a lowest level. Thus, the maximum statistical value of action statistics and the numbers are indirectly reflected in the start points of numerical ranges of different levels and the start point of the numerical range of the lowest level, and accordingly, the sizes of graphic items corresponding to statistical values in a store screen are well-balanced, being normalized according to the maximum values of a plurality of action statistics.

10. Tenth Aspect: Displaying of Numerical Values

Any of the First through Ninth Aspects can be substantiated as follows.

That is, it is preferable that the control method further include in response to an operation performed by a user for selecting one shelving unit object in a store screen, putting the selected shelving unit object in selected state; and when putting one shelving unit object in the store screen in the selected state, displaying a merchandising information screen unique to the selected shelving unit, the merchandising information screen displaying a numerical value of statistics and a character string indicating a type of the numerical value, the numerical value of statistics being a numerical representation of a value of statistics that the predetermined display state of at least one of a first graphic item and a second graphic item is in accordance with.

According to this, when one icon is selected, an auxiliary store screen and an MD information screen specific to a shelving unit corresponding to the selected icon are displayed. Thus, a user, by selecting an icon corresponding to a shelving unit that the user is interested in the store screen, is able to acquire details of instructions related to the shelving unit.

Further, according to this aspect, visual representation is provided of where in the store the shelving unit corresponding to the selected shelving unit icon exists, and the frequency at which user actions have been made in front of the shelving unit. Accordingly, the user is able to analyze the behavior of store visitors while focusing on one shelving unit, and thus, is able to assess how layout is affecting store sales.

11. Eleventh Aspect: Displaying MD Information and New Store Screen with Shelving Unit Icons in Response to Selection of Shelving Unit Icon in Store Screen The Tenth Aspect can be substantiated as follows.

That is, it is preferable that the control method further include causing the information terminal device to create an auxiliary store screen including a plurality of shelving unit objects in response to a selection of one shelving unit object, and in the control method, the shelving unit objects in the auxiliary store screen correspond one-to-one with a plurality of shelving unit objects in the store screen, and the character string and the numerical value in the merchandising information screen and the at least one shelving unit object in the auxiliary store screen are displayed without overlapping one another.

According to this, the store screen, on which the combination of the auxiliary store screen and the MD screen were overlaid, returns to be displayed at the front when the user selects the store screen. Thus, the user is able to freely select which of the store screen and the combination of the auxiliary store screen and the MD screen is to be displayed at the front. Further, a selection of a shelving unit that the user makes on the store screen is reflected in the auxiliary store screen. As such, it is possible to analyze the behavior of store visitors while focusing on one shelving unit.

When a user checking MD information for one specific shelving unit and would then like to go on to checking MD information for another shelving unit, the user is able to select a shelving unit icon corresponding to the other shelving unit without switching between screens. This reduces the number of operations that the user has to perform, and thus, the user is able to check MD information for the other shelving unit with ease.

12. Twelfth Aspect: Displaying New Store Screen and MD Information to be Overlaid on Store Screen The Eleventh Aspect can be substantiated as follows.

That is, it is preferable that the control method be such that when putting a shelving unit object in the store screen in the selected state, the auxiliary store screen and a screen of merchandising information for the selected shelving unit object are displayed on the display at a same time so as to overlap with the store screen, and the control method further include when the auxiliary store screen and the merchandising information screen overlap with the store screen, putting the shelving unit object in the store screen in non-selectable state.

According to this, the auxiliary store screen and the MD screen are displayed so as to cover up the store screen. Thus, the auxiliary store screen is emphasized, which urges the user to make a prompt decision.

Further, by putting one or more shelving unit icons included in the store screen in non-selectable state, the user is prevented from erroneously selecting shelving unit icons included in the store screen.

13. Thirteenth Aspect: Explicitly Displaying Shelving Unit Icon Selected in Store Screen in New Store Screen The Eleventh Aspect can be substantiated as follows.

That is, it is preferable that the control method further include when putting one shelving unit object in the store screen in the selected state, causing a display state of a shelving unit object in an auxiliary store screen that corresponds to the one selected shelving unit object to transition to a display state differing from a display state of another shelving unit object in the auxiliary store screen.

According to this, it becomes easy to visually understand which shelving unit icon has been selected.

14. Fourteenth Aspect: Switching MD Information when Shelving Unit Icon in New Store Screen is Selected The Eleventh Aspect can be substantiated as follows.

That is, it is preferable that the control method further include when putting one of shelving unit objects in the auxiliary store screen in selected state, updating the merchandising information screen so as to display a numerical value of statistics and a character string indicating a type of the numerical value for the selected shelving unit object in the auxiliary store screen.

According to this, when selection of one shelving unit icon is detected, only the MD information screen changes. Thus, a shelving unit icon corresponding to a shelving unit differing from the currently-selected shelving unit can be selected without switching between screens.

15. Fifteenth Aspect:

Switching MD Information in Same Screen As Store Screen When Shelving Unit Icon in Store Screen with Shelving Unit Icons Is Selected The Tenth Aspect can be substantiated as follows.

That is, it is preferable that the control method further include with a first graphic item and a second graphic item corresponding to one shelving unit object having been displayed, when the user makes a selection of another shelving unit object, deleting display of the first graphic item and the second graphic item and displaying, at a same time, the store screen and a merchandising information screen corresponding to the one selected shelving unit object; and causing a display state of the one selected shelving unit object to transition to a display state differing from a display state of another shelving unit object.

According to this, when it is determined that a selection of one shelving unit icon has been detected, the first graphic item and the second graphic item in the store screen are deleted, so that the shelving unit icons in the store screen become easier to see for the user. Accordingly, the user is able to select another shelving unit icon with ease.

16. Sixteenth Aspect: Deleting Graphic Item in Accordance with Selection of Shelving Unit Icon The First Aspect can be substantiated as follows.

It is preferable that the control method further include with a first graphic item and a second graphic item for one shelving unit being displayed, when a selection of another shelving unit object is detected, deleting the first graphic item and the second graphic item from the store screen.

According to this, when a selection of a shelving unit object is made, only a first graphic item and a second graphic item for the selected shelving unit are displayed. Accordingly, the displaying of first graphic items and second graphic items is linked with the selection of shelving unit objects.

17. Seventeenth Aspect: Continuing to Display Graphic Items for Selected Shelving Unit and Deleting Other Graphic Items The First Aspect can be substantiated as follows.

That is, it is preferable that the control method further include with first graphic items and second graphic items for two or more shelving unit objects being displayed, when one shelving unit object is selected, continuing to display a first graphic item and a second graphic item for the selected shelving unit object among the two or more shelving unit objects and deleting each first graphic item and each second graphic item for each shelving unit object, among the two or more shelving unit objects, other than the selected shelving unit object.

According to this, a first graphic item and a second graphic item for a selected shelving unit object are displayed, while first graphic items and second graphic items for other shelving unit objects are deleted. Accordingly, the shelving unit for which a first graphic item and a second graphic item are displayed changes in accordance with a selection of a shelving unit object performed by the user. Further, since displaying of a first graphic item and a second graphic item is continued even when a selection of a shelving unit object is performed, it is possible to successively change the target shelving unit object from one shelving unit to another while referring to a first graphic item and a second graphic item for the target shelving unit.

18. Eighteenth Aspect: Continuing to Display Graphic Items for Selected Shelving Unit and Deleting Other Graphic Items The First Aspect can be substantiated as follows.

That is, it is preferable that the control method further include with a first graphic item and a second graphic item for one shelving unit object being displayed, when another shelving unit object is selected, continuing to display the first graphic item and the second graphic item in the store screen.

According to this, due to a first graphic item and a second graphic item of a selected shelving unit object being continued to be displayed, the user is able to select shelving unit objects while viewing the first graphic item and the second graphic item. Enabling reference to the first graphic item and the second graphic item improves operability with respect to shelving unit objects.

19. Nineteenth Aspect: Continuing Display of Graphic Items when Shelving Unit is Selected The First Aspect can be substantiated as follows.

That is, it is preferable that the control method be such that a first graphic item and a second graphic item are overlaid with respect to each of all shelving units located in the store, and the control method further include with first graphic items and second graphic items for all shelving units being displayed, when a selection of one shelving unit object is detected, continuing to display the first graphic items and the second graphic items for all shelving units regardless of the detection of the selection.

According to this, a first graphic item and a second graphic item are displayed with respect to each of all shelving units in the store. Accordingly, visual representation is performed of the distribution of levels of action statistics in the entire store. As such, it is possible to assess the shelving unit layout of a store in entirety.

20. Twentieth Aspect: Linking Display of MD with Selection of Multiple Shelving Units The First Aspect can be substantiated as follows.

That is, it is preferable that the control method further include receiving a selection of two or more shelving unit objects on the store screen, and in response to a selection of all of two or more shelving units on the store screen, displaying a first graphic item and a second graphic item for each of the two or more selected shelving unit objects, and displaying a numerical value obtained by summing values of statistics for the two or more shelving unit objects.

According to this, a total of statistical values for shelving units in a group of two or more shelving units is displayed. Accordingly, it is possible to perform local assessment of shelving unit layout while focusing on a group of merchandise belonging to a specific category.

21. Twenty-First Aspect: Linking Display of MD with Selection of Multiple Shelving Units The First Aspect can be substantiated as follows.

That is, it is preferable that the control method be such that on the store screen, two or more shelving unit objects can be selected, and the control method further include in response to a selection of two or more shelving unit objects on the store screen, displaying, on or near each of the two or more shelving unit objects, a first graphic item and a second graphic item for a shelving unit corresponding to the each of the two or more shelving unit objects in overlaid state.

According to this, when a plurality of shelving unit objects are selected, the first graphic items and the second graphic items for the selected shelving unit objects are displayed on or near the selected shelving unit objects. Accordingly, the difference in level between action statistics for the plurality of shelving units selected becomes clear. That is, for example, it becomes clear which one of the selected shelving units is higher than the others in terms of action statistics.

22. Twenty-Second Aspect: Displaying of Button for Displaying all MD Information for Shelving Units of Same Genre The First Aspect can be substantiated as follows.

That is, it is preferable that the control method further include when receiving a selection of one shelving unit object on the store screen by a user, putting the selected shelving unit object in selected state; and displaying a select-all button when the shelving unit object displayed on the store screen and a genre of merchandise on the shelving unit satisfies a predetermined condition, and the control method be such that the predetermined condition is that when the user performs an operation with respect to one shelving unit object and thus one shelving unit corresponding to the one shelving unit object is selected, merchandise belonging to a same genre as merchandise on the one selected shelving unit is on at least one shelving unit other than the one shelving unit corresponding to the one selected shelving unit object, and pressing of the all-select button puts shelving unit objects corresponding to shelving units other than the one selected shelving unit in selected state.

According to this, when a plurality of shelving units are provided with merchandise of the same genre, a total of MD information for the merchandise genre is displayed. Further, the user is able to cause the total of MD information to be displayed by selecting the all-select button and not by selecting a plurality of shelving units. Accordingly, the user is freed from the trouble of having to select a plurality of shelving units while confirming that the shelving units have merchandise of the same genre. Further, a situation is prevented where the user erroneously selects a plurality of shelving units that do not have merchandise of the same genre.

23. Twenty-Third Aspect: Displaying MD Information and New Store Screen with Shelving Units Icons in Response to Selection of Shelving Unit Icon in Store Screen In terms of operability, the conventional technology that Patent Literature 2 discloses has the following technical problem. The conventional technology disclosed in Patent Literature 2 displays merchandise for a given shelving unit when a shelving unit icon corresponding to the given shelving unit is selected in a shelving unit allocation diagram. Here, specification of MD information to be displayed is received for each shelving unit, which leads to a large number of steps being involved in operation. The conventional technology that Patent Literature 2 discloses poses this additional technical problem.

To overcome this technical problem, a control method described in the following is preferable.

A control method of performing sales promotion for a store by causing an information terminal in a system to display a store screen including at least one shelving unit object, the system including the information terminal and a management device, the control method including:

in response to an operation performed by a user for selecting one shelving unit object on the store screen, putting the selected shelving unit object in selected state; and when putting the selected shelving unit object in the selected state, displaying an auxiliary store screen and a merchandising information screen unique to the selected shelving unit object, and in the control method the merchandising information screen displays a numerical value of statistics and a character string indicating a type of the numerical value, the statistics pertaining to an action that store visitors make near the selected shelving unit object, the auxiliary store screen includes a plurality of shelving unit objects corresponding one-to-one with the plurality of shelving unit objects in the store screen, and the character string and the numerical value in the merchandising information screen and the plurality of shelving unit objects in the auxiliary store screen are displayed without overlapping one another.

According to this, when one shelving unit object is selected, an MD information screen and an auxiliary store screen focusing on a specific shelving unit are displayed. Accordingly, information regarding a specific shelving unit is acquired through a small number of operation steps.

24. Twenty-Forth Aspect: Displaying of Button for Displaying all MD Information for Shelving Units of Same Genre When considering the arrangement of shelving units in a real store, Patent Literature 2 poses another technical problem. According to Patent Literature 2, when a plurality of shelving units have merchandise of the same genre, sales for only one of such shelving units is presented, and thus, the sales of the entire genre of merchandise cannot be determined. Patent Literature 2 poses this additional technical problem.

In view of this, a control method described in the following is preferable.

A control method of performing sales promotion for a store by causing an information terminal in a system to display a store screen including at least one shelving unit object, the system including the information terminal and a management device, the control method including:

displaying a select-all button when the shelving unit object displayed on the store screen and a genre of merchandise on the shelving unit satisfies a predetermined condition, and in the control method, the predetermined condition is that when a user performs an operation with respect to one shelving unit object and thus one shelving unit corresponding to the one shelving unit object is selected, merchandise belonging to a same genre as merchandise on the one selected shelving unit is on at least one shelving unit other than the one shelving unit corresponding to the one selected shelving unit object, and pressing of the all-select button puts shelving unit objects corresponding to shelving units other than the one selected shelving unit in selected state.

According to this, when one shelving unit object is selected and a shelving unit object having merchandise of the same genre as the merchandise on the selected shelving unit exists, displaying of all MD information of all shelving units having merchandise of the same genre is possible. As such, even when a plurality of shelving units have merchandise of the same genre, a situation where the sales of the entire genre of merchandise cannot be determined is prevented.

The basic aspect described in 1. First Aspect can be combined with one or more of the other aspects described in and following 2. Second Aspect. The embodiments presented in the following describe examples of an information terminal device and an MD management device that are close to actual products and are for implementing typical ones among the basic aspect and combinations derivable therefrom. The following describes such embodiments, with reference to the drawings.

(Embodiment 1)

Embodiment 1 describes basic structures of an information terminal device 20 and an MD information management device 30. First, the overall structure of a system including the information terminal device 20 and the MD information management device 30 is described. FIG. 1 illustrates the overall structure of the system. A network in a store illustrated in FIG. 1 includes a group of sensors 10. In FIG. 1, the information terminal device 20 and the MD information management device 30 are illustrated as devices linked to the in-store network.

The group of sensors 10 is composed of a plurality of human-detecting sensors (human-detecting sensors 101, 102, 103, . . . ). Each human-detecting sensor is a single device including a camera and an image recognition device. The human-detecting sensor performs image recognition with respect to a frame image captured by the camera, and determines whether or not the frame image includes an image of a person. When the frame image includes an image of a person, the human-detecting sensor transmits, to the MD information management device 30, an action log indicating an action of the person.

The information terminal device 20 is possessed by a user who conducts duties related to the store. The information terminal device 20 receives MD information from the MD information management device 30. The arrow "spy1" in FIG. 1 schematically illustrates the provision of information to the information terminal device 20.

The MD information management device 30 manages action statistics according to the action logs acquired by the human-detecting sensors 101, 102, 103, and so on. The action statistics are statistics indicating actions of numerous, unspecified store visitors in the store. The MD information management device 30 provides the information terminal device 20 with the MD information, which includes statistical values based on action statistics. In the present embodiment, MD information is information for promoting sales of merchandise on one shelving unit in the store. Further, MD information is supported by a statistical value indicating the quantity or merchandise on the shelving unit that has been sold (i.e., a sold quantity), or a statistical value pertaining to an action made by users near shelving units. That is, MD information in the present embodiment is characterized in that the MD information is for sales promotion of a group of merchandise on a single shelving unit in a store, and in that the numerical value supporting the MD information is specific to a single shelving unit in a store.

This concludes the description of the overall structure of the system including the information terminal device 20 and the MD information management device 30. Next, description is provided focusing on the information terminal device 20 and the MD information management device 30.

Figure 2:
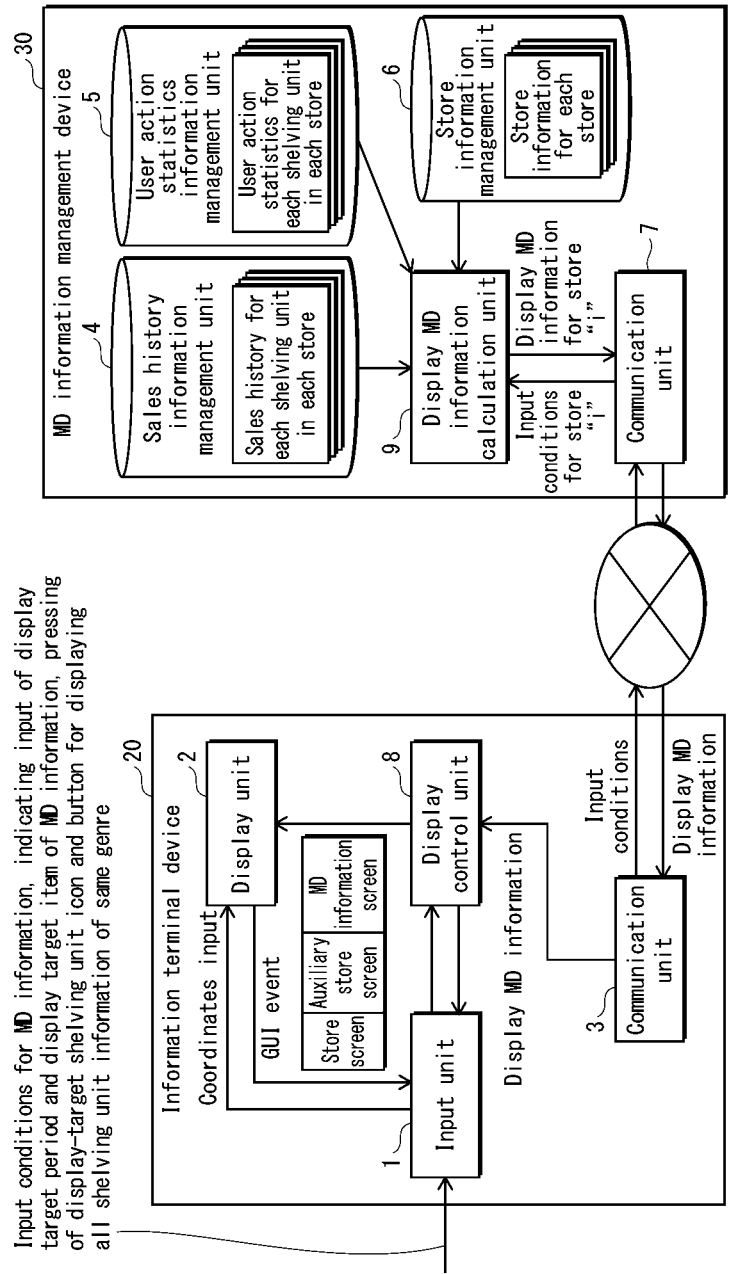
FIG. 2 is a block diagram illustrating the block structure of the information terminal device 20 and the block structure of the MD information management device 30.

FIG. 2 illustrates block structures of the information terminal device 20 and the MD information management device 30. In FIG. 2, the information terminal device 20 uniquely includes: an input unit 1; a display unit 2; and a communication unit 3. Meanwhile, the MD information management device 30 uniquely includes: a sales history information management unit 4; a user action statistics information management unit 5; a store information management unit 6; and a communication unit 7. Note that either the information terminal device 20 or the MD information management device 30 may include a display control unit 8 and a display MD information calculation unit 9.

The following describes the constituent elements that the information terminal device 20 uniquely includes (i.e., the input unit 1, the display unit 2, and the communication unit).

The input unit 1 receives input of a user operation, and outputs, to the communication unit 3, an operation event indicating the contents of the input. Note that the operation event is passed on to the MD information management device 30 via the communication unit 3. User operation performed with respect to a GUI includes, for example, GUI input of a display target period, GUI input of a display target item, pressing of a shelving unit icon, and pressing of button for displaying all shelving unit information of the same genre.

The display unit 2 performs layer compositing on two or more screen images, and provides an application screen image, which is a composite screen acquired through the layer compositing, to a touch panel for display. The display unit 2 displays the contents of a plurality of plane memories. The layer compositing is performed by storing each screen image to be composited to one of the plane memories, and by executing overlaying of line images stored in the plane memories. The screen images that are composited include a store screen, an auxiliary store screen, and an MD information screen. A store screen is a map of an inside of the store, and indicates a spatial arrangement of a cash register counter, an entrance, a plurality of shelving units, etc., on one floor of the store. A shelving unit icon is a GUI component that visually indicates the presence of a shelving unit in the store. The state of a shelving unit icon changes in accordance with user operations. States of a shelving unit icon include: a normal state; and an activated state.

An MD information screen is a screen for receiving a specification of display target period, a specification of one or more display target items, and a specification of collective display. Further, an MD information screen displays MD information in accordance with such specifications. An auxiliary store screen is a store screen that is displayed focusing on merchandise on a single shelving unit.

The communication unit 3 transmits the operation event received by the input unit 1, and receives a screen image transmitted from the MD information management device 30.

This concludes the description of the constituent elements that are uniquely included in the information terminal device 20. The following describes the constituent elements that are uniquely included in the MD information management device 30 (i.e., the sales history information management unit 4, the user action statistics information management unit 5, the store information management unit 6, and the communication unit 7).

The sales history information management unit 4 manages a sales history for each shelving unit in each store. The sales history information management unit 4 updates a sales history of a shelving unit in a given store in accordance with a daily total of sales of the given store. In addition, when a request to create sales histories is issued from a given store, the sales history information management unit 4 reads out the sales histories of the shelving units belonging to the given store, and provides the sales histories to the display MD information calculation unit 9 in response to the request.

The user action statistics information management unit 5 manages action statistics for each shelving unit in each stores. When user action with respect to a given shelving unit in a given store is detected, the user action statistics information management unit 5 updates the action statistics for the given shelving unit. Further, when the display MD information calculation unit 9 issues a request to create MD information with a specification of a given store, the user action statistics information management unit 5 reads out user action statistics for all shelving units belonging to the given store and provides the user action statistics to the display MD information calculation unit 9 in response to the request.

The store information management unit 6 stores store information for each store. When the display MD information calculation unit 9 issues a request to create a store screen with a specification of a given store, the store information management unit 6 reads out store information for the given store, and provides the store information to the display MD information calculation unit 9 in response to the request.

The communication unit 7 receives a registration event indicating registration of store information and a sales history event indicating merchandise sales. Further, the communication unit 7 causes the store information management unit 6 to update store information in accordance with the registration event, and causes the sales history information management unit 4 to update sales history in accordance with the sales history event. Further, when a action log indicating occurrence of a user action around a shelving unit is transmitted, the communication unit 7 causes the user action statistics information management unit 5 to update action statistics in accordance with the action log. Further, the communication unit 7 executes communication with the communication unit 3 as the opponent.

The following describes constituent elements that may be included in the information terminal device 20 or the MD information management device 30 (i.e., the display control unit 8 and the display MD information calculation unit 9).

The display control unit 8 creates a store screen by using store information corresponding to a store having made a request for a store screen and display MD information created by the display MD information calculation unit 9. Further, the display control unit 8 updates a store screen when an icon is pressed or a button for collective display is pressed, and in addition, creates an auxiliary store screen and an MD information screen.

The display MD information calculation unit 9, when an operation event including input conditions occurs, reads out action statistics and sales histories for all shelving units in a store to which a user having issued a request belongs, and calculates display MD information for display. When an operation event includes input conditions, the display MD information calculation unit 9 creates display MD information including only action statistics and sales histories matching a display target period and display target items included in the input conditions. Display MD information is information enabling visually planning sales promotion. The display MD information associates store layout and each of a plurality of pieces of shelving unit information included in the store information with a statistical value pertaining to user action or a sold quantity, based on the input conditions input by the user. As described above, the display MD information associates shelving unit information with either a pair of two statistical values or a pair of a sold quantity and a statistical value. Accordingly, a store screen displaying a distribution of user actions or sold quantities of shelving units can be created by displaying a screen indicating a layout of the store based on the store layout, by arranging a shelving unit icon on the layout screen based on shelving unit arrangement coordinates included in shelving unit information, and by also displaying a sold quantity or a statistical value.

FIG. 2 illustrates a structure where the display control unit 8 is included in the information terminal device 20, and the display MD information calculation unit 9 is included in the MD information management device 30. Therefore, the display control unit 8 transmits the input conditions, whose input is received by the input unit 1, to the MD information management device 30 via the communication unit 3 and the communication unit 7. Further, the display control unit 8 receives the display MD information created by the display MD information calculation unit 9 from the MD information management device 30 via the communication unit 3 and the communication unit 7. This concludes the description of the constituent elements of the information terminal device 20 and the MD information management device 30. Next, description is provided of the internal structure of the store, from which action statistics are collected.

Figure 3:
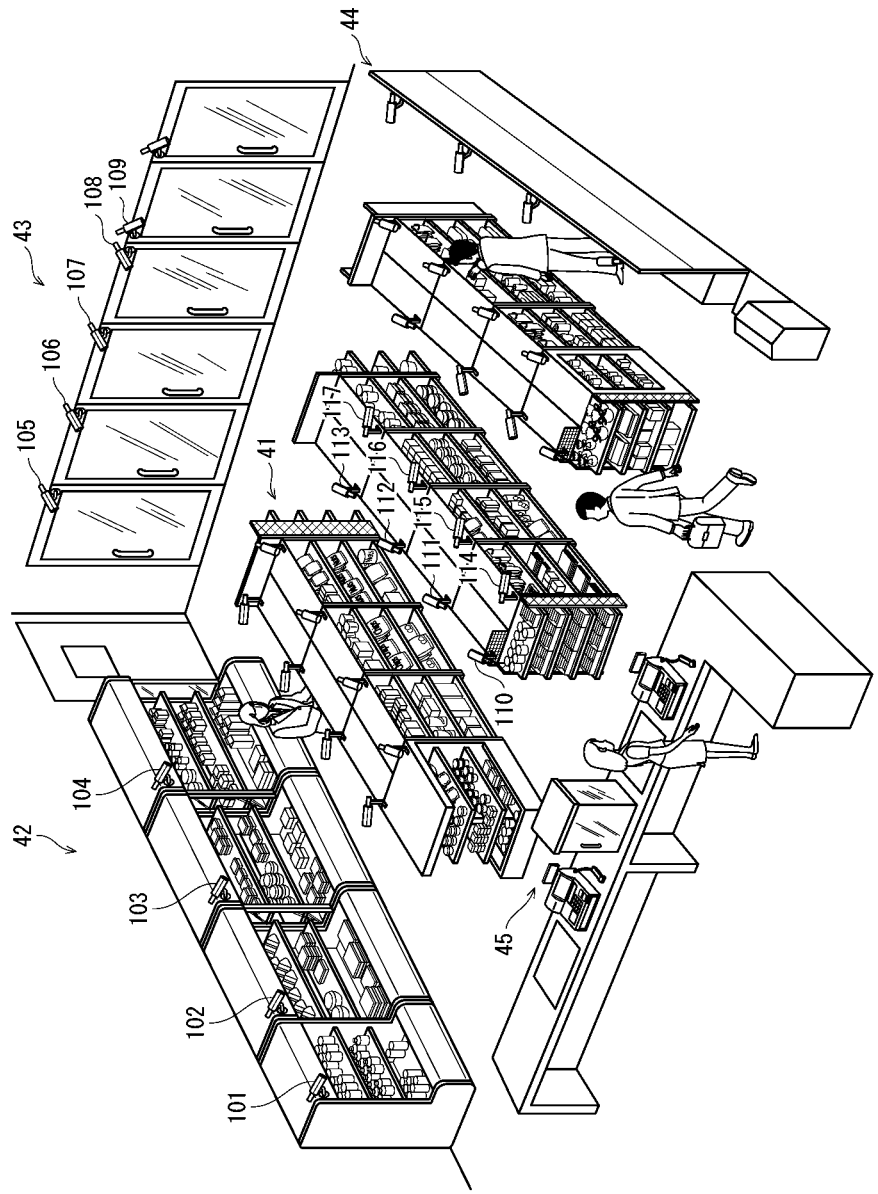
FIG. 3 illustrates the inside of a store in which human-detecting sensors 101, 102, 103, and so on are located.

FIG. 3 illustrates the inside of the store, in which the human-detecting sensors 101, 102, 103, and so on are located. The store illustrated in FIG. 3 has a plurality of normal-type shelving units 41, a plurality of low-temperature showcase-type shelving units 42, a plurality of refrigerator-type shelving units 43, a plurality of bookshelf-type shelving units 44, and a keep-warm-type shelving unit 45. These different types of shelving units, although differing in terms of function and shape, are similar for each having a plurality of merchandise racks arranged along the vertical direction. The merchandise racks are for holding and displaying merchandise, and each include a plurality of merchandise accommodation columns arranged along the horizontal direction.

The normal-type shelving units 41 each face an aisle at a front side and/or a rear side. In stores and the like, a plurality of shelving units are arranged in a line along a longitudinal direction of the shelving units. Each shelving unit is composed of pillar members, beam members each connected to the pillar members at a right angle, and a plurality of shelf boards fixed by the beam members. Each shelf board is a merchandise rack displaying and holding merchandise, and on each merchandise rack, a plurality of merchandise accommodation columns are arranged along the horizontal direction.

The low-temperature showcase-type shelving units 42 have thereon merchandise such as rice balls, Japanese bentos, salads, side dishes, processed food, milk, and dairy food. Each low-temperature showcase-type shelving unit 42 is a showcase with an opening at a front side. In the low-temperature showcase-type shelving units 42, the merchandise racks and the merchandise accommodation columns are provided inside this showcase. The showcase has heat-insulating walls attached to both sides thereof. The heat-insulating walls each have a cross-sectional shape substantially similar to a squared-"U". Further, a cooler and a duct are vertically arranged at a rear side of the showcase. A blower is disposed inside the duct, and air sucked in from a duct inlet is sent to the cooler. The duct inlet is located at a bottom edge of the opening. The cool wind from the cooler is discharged from an outlet located at a top edge of the opening of the showcase, and is sent towards the merchandise on the merchandise accommodation columns of the merchandise racks in the showcase. Accordingly, the merchandise in the showcase is kept at a low temperature.

The refrigerator-type shelving units 43 mainly have thereon merchandise such as frozen goods and beverages. The frozen goods include ice creams and frozen food, and the beverages include alcohol beverages, tea, water, and fruit juice. Each of the refrigerator-type shelving units 43 is a merchandise storage that is built-in to a wall of the store. In each of the refrigerator-type shelving units 43, the merchandise racks and the merchandise accommodation columns are formed inside this merchandise storage. The merchandise storage has an opening covering the entire front side thereof, and this opening is covered by a single-swing door. The single-swing door is glazed, so that a beverage placed at the front of each merchandise accommodation column is visually recognizable. Each merchandise accommodation column extends from the front of the merchandise storage to the back of the merchandise storage, so as to hold beverages in line from the front to the back and so that the beverages can be taken out one by one.

The bookshelf-type shelving units 44 have thereon magazines, etc. Each bookshelf-type shelving unit 44 is longer in the horizontal direction than in the vertical direction, and is supported by a pair of support pillars. Each bookshelf-type shelving unit 44 has a display stand with books for sale disposed between the support pillars at a front side, and has a display stand with sample books disposed between the support pillars at a rear side. Further, each bookshelf-type shelving unit 44 has a display stand on which books are stacked in piles, below the display stand with books for sale. The display stand with books for sale, the display stand with sample books, and the display stand with piles of books each are a merchandise rack.

The keep-warm-type shelving unit 45 stores fried food and steamed buns with meat or bean-jam filling. Specifically, the keep-warm-type shelving unit 45 includes a plurality of storage chambers, a warm-air supplying unit that is disposed below the storage chambers and functions as an air-conditioning unit, a keep-cool storage that is disposed at the same level as the warm-air supplying unit and behind the warm-air supplying unit, and a cooling unit that is disposed below the warm-air supplying unit.

Figure 4A:
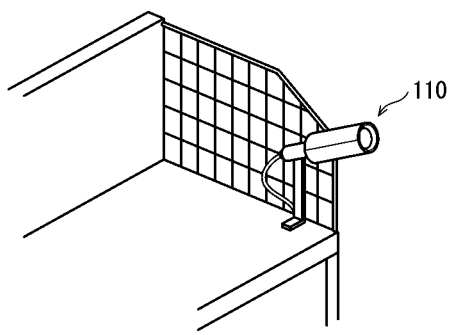
FIG. 4A illustrates the exterior appearance of a human-detecting sensor 110, which is installed to a partition between shelving units.
Figure 4B:
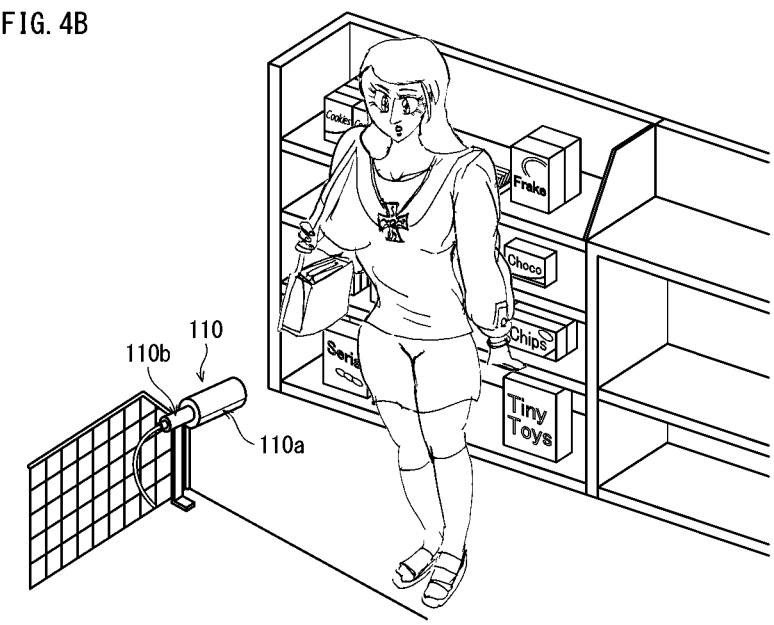
FIG. 4B illustrates a position relationship between a store visitor looking at merchandise on a shelving unit and a human-detecting sensor.
Figure 4C:
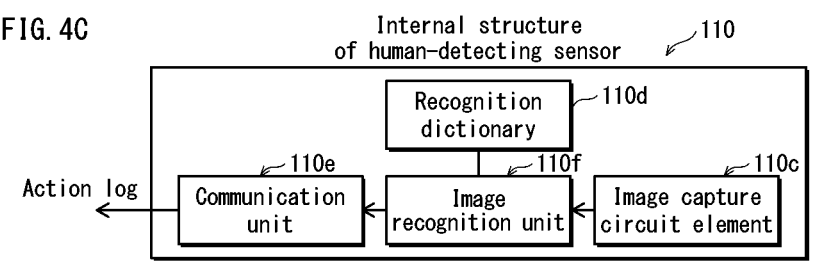
FIG. 4C illustrates the internal configuration of a human-detecting sensor.

The normal-type shelving units 41, the low-temperature showcase-type shelving units 42, the refrigerator-type shelving units 43, the bookshelf-type shelving units 44, and the keep-warm-type shelving unit 45 each have a human-detecting sensor (101, 102, 103, and so on) attached thereto. The human-detecting sensors may be provided such that each shelving unit is separately provided with one or more human-detecting sensors, or such that one or more human-detecting sensors each looking down upon a plurality of shelving units are attached to the ceiling of the store. When providing each shelving unit with one or more human-detecting sensors, the human-detecting sensors may be provided above the shelving unit, at both sides of the shelving unit, or the like. FIGS. 4A-4C illustrate a case where each shelving unit is separately provided with one or more human-detecting sensors, and FIGS. 5A and 5B illustrate a case where one or more human-detecting sensors each looking down upon a plurality of shelving units are attached to the ceiling of the store.

In FIG. 4A, one human-detecting sensor 110 is attached to each of two partition walls, each at one side of a shelving unit. The human-detecting sensor 110 performs detection with respect to a detection area, which is an area of an aisle that the shelving unit faces in the longitudinal direction. The human-detecting sensor 110 detects whether or not a person is present in the detection area. In the present embodiment, human-detecting sensors are attached to partition walls between shelving units. FIG. 4B illustrates a positional relationship between a store visitor looking at merchandise on a shelving unit and a human-detecting sensor. The human-detecting sensor is attached so as to face an aisle. Thus, when a store visitor approaches the shelving unit and stops in front of the shelving unit or reaches for merchandise on the shelving unit, the store visitor is captured by the human-detecting sensor 110.

Figure 5A:
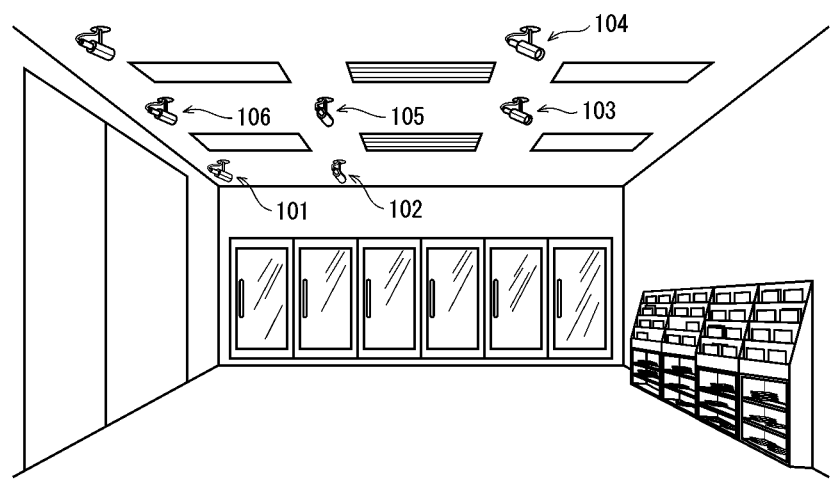
FIG. 5A illustrates a store ceiling having a human-detecting sensor attached thereto.
Figure 5B:
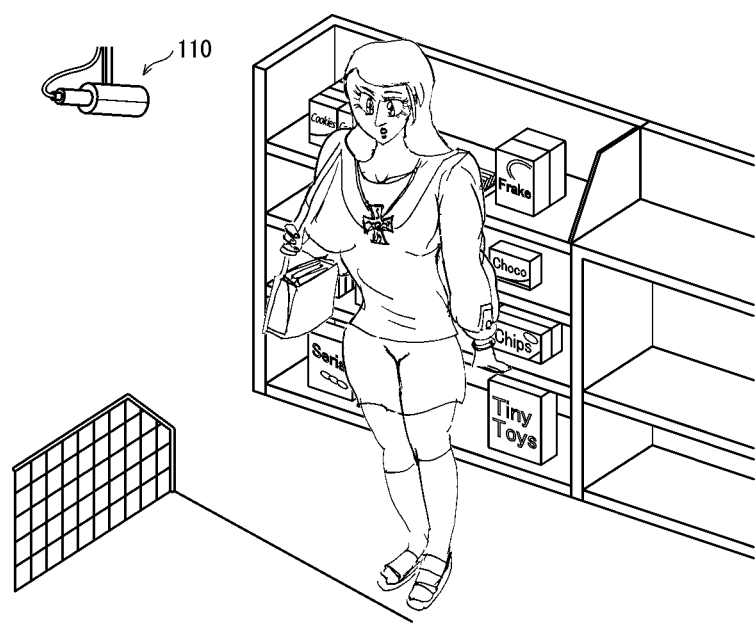
FIG. 5B illustrates a position relationship between a store visitor looking at merchandise on a shelving unit and a human-detecting sensor.

FIG. 5A illustrates the ceiling of the store, to which human-detecting sensors 101, 102, 103, and so on are attached. FIG. 5B illustrates a positional relationship between a store visitor looking at merchandise on a shelving unit and a human-detecting sensor. The human-detecting sensor is provided to look down upon the store from the ceiling. Thus, when a store visitor stops in front of the shelving unit or reaches for merchandise on the shelving unit, the store visitor is captured by the human-detecting sensor. This concludes the description of the provision of human-detecting sensors. The following describes the internal configuration of a human-detecting sensor. In specific, the following describe the structure of the human-detecting sensor 110, with reference to FIG. 4B. As illustrated in FIG. 4B, the human-detecting sensor 110 is composed of a camera main body 110a and a platform 110b. The platform 110b is able to change the orientation of the entire camera within a predetermined range. The orientation of the camera can be changed in both the horizontal direction (azimuth, panning direction) and the vertical direction (elevation, tilting direction). Thus, a range that a lens captures can be changed. Due to the platform 110b being provided, the orientation of the camera main body 110a can be changed and thus, the image capture range can be changed within a predetermined range. FIG. 4C illustrates the internal configuration of a human-detecting sensor. As illustrated in FIG. 4C, the human-detecting sensor 110 includes an image-capturing circuit element 110c, a recognition dictionary 110d, a communication unit 110e, and an image recognition unit 110f.

The image-capturing circuit element 110c is composed of a photoelectric conversion element, being, for example, a CCD sensor or a CMOS sensor. The image-capturing circuit element 110c acquires frame image data each time a predetermined time period elapses. The frame image data is composed of pixels corresponding to one screen.

The recognition dictionary 110d has registered thereto characteristic patterns indicating shape-related characteristics of parts of a human body. Each characteristic pattern is registered in association with the name of the corresponding body part. Here, the body parts registered to the recognition dictionary 110d are body parts not covered by clothing, such as the face, the neck, and a hand. In particular, for a hand, a shape pattern for a state where fingers are stretched is registered. This enables detecting a store visitor reaching for merchandise on a shelving unit with his/her hand (action referred to as "reaching" in the following).

The communication unit 110e, when an image in which a person is present (human present image in the following) or an image in which a person is performing reaching (reach image in the following) is detected, transmits an action log to a management device. The action log indicates that an action of a specific type has been occurred around a shelving unit. The specific type of action includes, for example, a store visitor stopping at a shelving unit or a store visitor reaching for a shelving unit. The action log is a communication message including an ID indicating action type and the date/time at which the action occurred.

The image recognition unit 110f determines whether or not a frame image output from the image-capturing circuit element 110c includes a pixel region that has a color distribution of a human skin color. When a frame image does not include such a pixel region, the image recognition unit 110f determines that the frame image does not include an image of a store visitor. Meanwhile, when a frame image includes a pixel region having a color distribution of a human skin color, the image recognition unit 110f extracts an outline shape of the pixel region from the frame image, and performs a search of whether or not a characteristic pattern similar to the extracted outline shape exists in the recognition dictionary 110d. Further, when a characteristic pattern of a human face or a human neck is similar to the extracted outline shape, the image recognition unit 110f determines that the frame image is a human present image, and that stopping has occurred.

Further, when a characteristic pattern of a hand with fingers extended is similar to the extracted outline shape, the image recognition unit 110f determines whether or not the pixel region having the shape of a hand is located within a vicinity range of the shelving unit. When the pixel region is located within the vicinity range of a shelving unit, the image recognition unit 110f determines that the frame image is a reach image, and that reaching has occurred.

The vicinity range is a spatial criteria applied for determining whether or not reaching has occurred, and is set as follows. A database of the recognition dictionary has registered thereto in advance an image indicating an appearance of a store visitor when reaching to a shelving unit column occurs under ideal conditions. A producer of the recognition dictionary analyzes, in the image so registered, where in the frame image fingertips of a user appear. Here, the ideal conditions indicate a situation where a camera exists at a side of a shelving unit, and a male/female of average height accesses a shelving unit of average height/width. When the human-detecting sensor 110 exists at a partition wall between shelving units as illustrated in FIG. 4A, a lower half of a frame image is determined as the vicinity range through such analysis. Accordingly, the image recognition unit 110f, when an outline shape of a hand whose fingertips are oriented in the direction of a shelving unit is included in the vicinity range in the frame image, recognizes the occurrence of reaching to the shelving unit. Setting the vicinity range as described above achieves excellent recognition of reaching to a shelving unit. Accordingly, when a store visitor almost walking past a shelving unit shows interest in merchandise at a front of the shelving unit, the camera of the human-detecting sensor captures various scenes, such as a scene where the store visitor approaches the shelving unit and stops in front of the shelving unit, and a scene where the store visitor is reaching for the merchandise on the shelving unit. As such, image capturing by the human-detecting sensor yields image data capturing a shelving unit opposite the aisle, a human present image, and a reach image. As already described above, a human present image is an image of a store visitor approaching a shelving unit and stopping in front of the shelving unit, and a reach image is an image of a store visitor standing in front of a shelving unit and reaching for merchandise on the shelving unit.

Figure 6A:
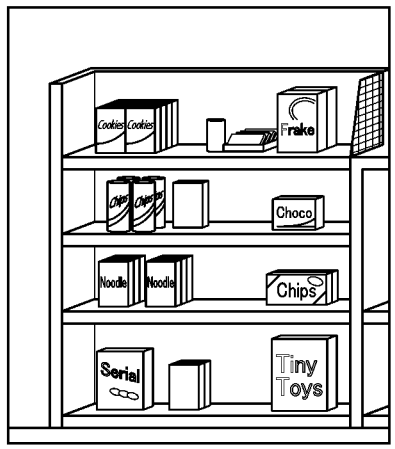
FIG. 6A illustrates image data (human absent image) capturing a shelving unit at an opposite side of an aisle.
Figure 6B:
FIG. 6B illustrates image data (human present image) capturing a store visitor approaching a shelving unit to stop in front of the shelving unit.
Figure 6C:
FIG. 6C illustrates image data (reach image data) capturing a store visitor standing in front of a shelving unit and reaching for merchandise.
Figure 6D:
FIG. 6D illustrates image data (hand holding image data) capturing a store visitor standing in front of a shelving unit and looking at merchandise with the merchandise in her hand.

FIG. 6A illustrates image data capturing a shelving unit opposite an aisle (human absent image data in the following), and FIG. 6B illustrates image data capturing a store visitor approaching a shelving unit and stopping in front of the shelving unit (human present image data in the following). FIG. 6C illustrates image data capturing a store visitor standing in front of a shelving unit and reaching for merchandise (reach image data in the following), and FIG. 6D illustrates image data capturing a store visitor standing in front of a shelving unit and looking at merchandise held in her hand (hand holding image data in the following). In the present embodiment, among the images illustrated in FIGS. 6A-6D, the image illustrated in FIG. 6C is a recognition target, whereas the image illustrated in FIG. 6D is not a recognition target, and thus, is not a target of action statistics. This is since the action of reaching for merchandise and the action of holding a merchandise pertain to one single action, and thus, it suffices to use only reaching as a target of action statistics. Alternatively, only holding of merchandise may be used as a target of action statistics, without using reaching as a target of action statistics.

The following describes the relationship between time points at which the human absent image data, the human present image data, the reach image data, and the hand holding image data are acquired. FIG. 7 is a diagram in which the human absent image data, the human present image data, the reach image data, and the hand holding image data, respectively illustrated in FIGS. 6A, 6B, 6C, and 6D, are allocated to respective time points on a time axis. The first column of FIG. 7 illustrates the human absent image data, the human present image data, the reach image data, and the hand holding image data, respectively illustrated in FIGS. 6A, 6B, 6C, and 6D. The second column of FIG. 7 illustrates the time axis. The time axis has plotted thereon four time points, namely, time point t0, time point t1, time point t2, and time point t3. Time point t0 indicates the time point when the human absent image data is captured, time point t1 indicates the time point when the human present image data is detected, time point t2 indicates the time point at which the reach image data is captured, and time point t3 indicates the time point when the human absent image data is captured following the acquisition of the human present image data. The third column of FIG. 7 illustrates processing that the information terminal device 20 executes at each of the time point when the human present image is captured, at the time point when the reach image is captured, and at the time point when the human absent image is captured. While human absent images are yielded, the information terminal device 20 does not execute any processing. However, once the human present image is generated at time point t1, a measurement of stop time is commenced in five seconds, and a notification of the generation of the human present image and a stop start time are registered to the MD information management device 30. Time point t2 indicates the time point at which the reach image is generated. At time point t2, a notification of occurrence of reaching and a reach occurrence time are registered to the MD information management device 30. Time point t3 indicates a detection timing at which the occurrence of the human absent image is detected. At this detection timing, a notification of user departure is registered, and the total amount of time for which the person stops is calculated. The reference symbol dif in FIG. 7 indicates the amount of time between when the human present image occurred until when the human absent image subsequently occurred. This time dif is added to a total stop time unique to the shelving unit, which is managed by the MD information management device 30.

Figure 8:
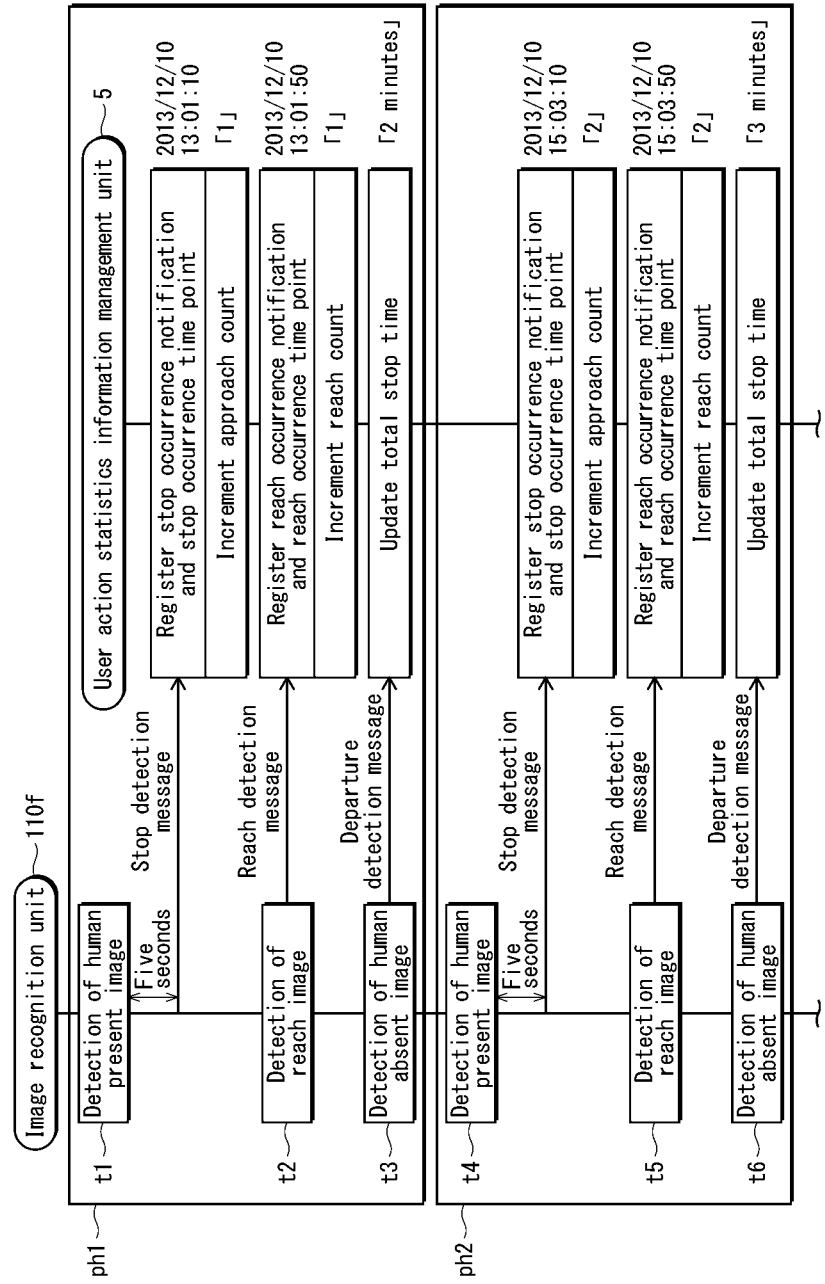
FIG. 8 is a communication sequence illustrating communication between an image recognition unit 110f of a human-detecting sensor and constituent elements of a user action statistics information management unit 5.

FIG. 8 illustrates a sequence of communication taking place between the information terminal device 20 and the MD information management device 30 when the human absent image, the human present image, and the reach image occur as described above. FIG. 8 is a communication sequence illustrating the communication between two constituent elements, namely the image recognition unit 110f of the human-detecting sensor and the user action statistic information management unit 5. The left side of FIG. 8 illustrates the image recognition unit 110f of the human-detecting sensor, and the right side of FIG. 8 illustrates the user action statistic information management unit 5. Both the image recognition unit 110f and the user action statistic information management unit 5 belong to the system. Viewed in a top-bottom direction, FIG. 8 includes a plurality of time axes. These time axes are managed by clocks included in the human-detecting sensor and the user action statistic information management unit 5. Each time point on the time axes indicates a timing at which a message is transmitted or received. Further, FIG. 8 illustrates a plurality of data items that come and go between the two time axes. The time points t1, t2, t3, and so on the time axes indicates timings at which data items are transmitted. The boxes in FIG. 8 indicate a plurality of phases in the communication sequence. In specific, the sequence includes phase ph1 including communication between the human-detecting sensor and the MD information management device 30 when one store visitor approaches and stops at a shelving unit, and phase ph2 including communication between the human-detecting sensor and the MD information management device 30 when another store visitor approaches and stops at the shelving unit. Phase ph1 is explained first.

A human present image is detected for the first time at time point t1 in phase ph1. A stop detection message is transmitted in five seconds from time point t1. The stop detection message includes a stop occurrence time (2013/12/10, 13:01:10 in FIG. 8). 2013/12/10, 13:01:10 in FIG. 8 is registered as the stop occurrence time upon reception of this message. In addition, an approach count is incremented to 1.

Reaching is detected for the first time at time point t2 in FIG. 8. At this timing, a reach detection message is transmitted. The reach detection message is transmitted from the information terminal device 20 to the MD information management device 30, and includes a reach occurrence time (2013/12/10, 13:01:50 in FIG. 8). 2013/12/10, 13:01:50 in FIG. 8 is registered as the reach occurrence time upon reception of this message. In addition, a reach count is incremented to 1.

Occurrence of a human absent image, after the first transmission of a stop detection message, is detected at time point t3. At this timing, a departure detection message is transmitted from the information terminal device 20 to the MD information management device 30. The total stop time for the shelving unit is updated to indicate 2 minutes upon the transmission and reception of this message.

This concludes the description of phase ph1. The following describes phase ph2. A human present image resulting from occurrence of a second stop is detected at time point t4 in FIG. 8. A stop detection message is transmitted in five seconds from time point t4. The stop detection message includes a stop occurrence time (2013/12/10, 15:03:10 in FIG. 8). 2013/12/10, 15:03:10 in FIG. 8 is registered as the stop occurrence time upon reception of this message. In addition, the approach count is incremented to "2".

Reaching is detected for the second time at time point t5 in FIG. 8. At this timing, a reach detection message is transmitted from the information terminal device 20 to the MD information management device 30. The reach detection message includes a reach image occurrence time (2013/12/10, 15:03:50 in FIG. 8). 2013/12/10, 15:03:50 in FIG. 8 is registered as the reach occurrence time upon reception of this message. In addition, the reach count is incremented to 2.

A human absent image is detected for the second time at time point t6, resulting from occurrence of the second stop. At this timing, a departure detection message is transmitted from the information terminal device 20 to the MD information management device 30. The total stop time of the shelving unit is updated to indicate 3 minutes upon the transmission and reception of this message.

Due to store visitors approaching and stopping at the shelving unit, which is a shelving unit with snacks, twice at 13:01:10 and 15:03:10 on 2013/12/10, the action statistic for the shelving unit are updated such that the approach count indicates twice, the reach count indicates twice, and the total stop time indicates three minutes. Continuing the updating of the action statistics, which is based on the creation of human present image data, the reach image data, and the human absent image data, for a long period of time, such as for one week or for one month, causes accumulation of action statistics, which includes the approach count and the reach count.

Through such processes, a history of user action is accumulated in the user action statistics information management unit 5.

Figure 9:
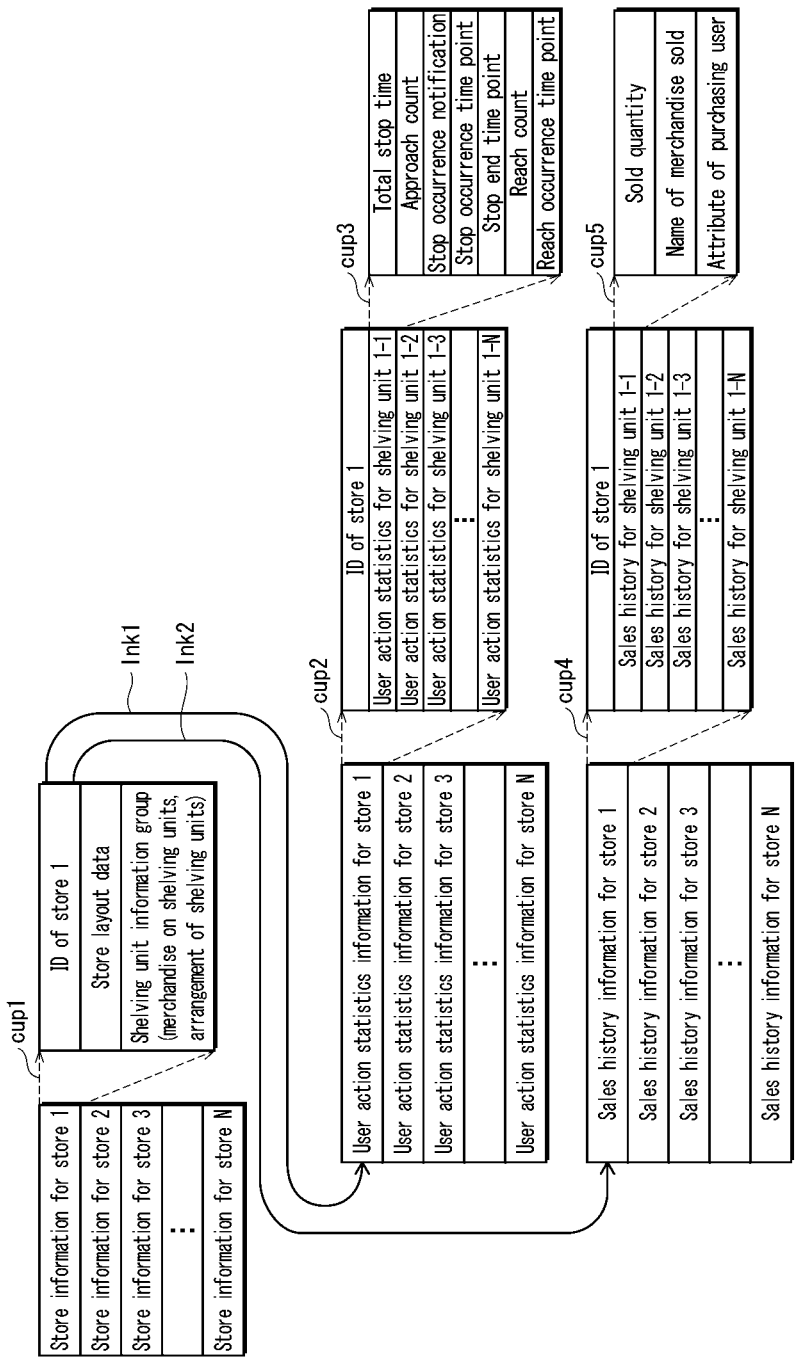
FIG. 9 illustrates the internal structures of store information, user action statistics information, and sales history information.

When time is added to the total stop time and the approach count and the reach count are incremented, user action statistics information is accumulated in the display MD information calculation unit 9 with a data structure such as that illustrated in FIG. 9. The user action statistics information is a part of the MD information. Now that the accumulation of the user action statistics information has been described, the following describes the store information, the user action statistics information, and sales history information, while focusing on the internal structures thereof. FIG. 9 illustrates the internal structures of the store information, the user action statistics information, and the sales history information. A plurality of pieces of store information (store information for each of stores 1, 2, 3, 4, . . . , N) that are managed by the system are illustrated at the left end of FIG. 9. The store information pieces are a plurality of instances of one type of cluster structure, and thus have the same data structures. The lines cup1 in FIG. 9 indicate that the internal structure of the store information is illustrated in close-up. The store information includes ID of store 1, store layout data, and shelving unit information group related to the shelving units in the layout.

The link lnk1 in FIG. 9 indicates the link between a store ID and user action statistics information, which exists for each store. The following describes the user action statistics information. The user action statistics information management unit 5 has N pieces of user action statistics information, each of which corresponding to one of the N stores (action statistics information for each of stores 1, 2, 3, . . . , N). Each piece of user action statistics information is identified by a store ID. The different pieces of action statistics information are instances of the same class structure. The lines cup2 indicate that the structure of the action statistics information is illustrated in close-up. As illustrated by the lines cup2, a piece of user action statistics information is composed of ID of store 1 and action statistics information for each shelving unit (action statistics information for each of shelving units 1-1, 1-2, 1-3, . . . , 1-N). The lines cup3 indicate that the structure of the action statistics information is illustrated in close-up. As illustrated by lines cup3, a piece of action statistics information is composed of total stop time, approach count, stop occurrence notification, stop occurrence time, stop end time, reach count, and reach occurrence time.

The link lnk2 in FIG. 9 indicates the link between store IDs and sales history information. The following describes the sales history information. A piece of sales history information exists for each store (sales history information for each of stores 1, 2, 3, . . . , N). The different pieces of sales history information are instances of the same class structure. The lines cup4 indicate that the internal structure of the sales history information is illustrated in close-up. As illustrated by the lines cup4, a piece of sales history information is composed of ID of store 1 and sales history information for each shelving unit (sales history information for each of shelving units 1-1, 1-2, 1-3, . . . , 1-N). The lines cup5 indicate that the internal structure of the sales history information for shelving unit 1-1 is illustrated in close-up. As illustrated by the lines cup5, a piece of sales history information is composed of sold quantity, sold merchandise name, purchasing user attribute.

Figures 10A, 10B:
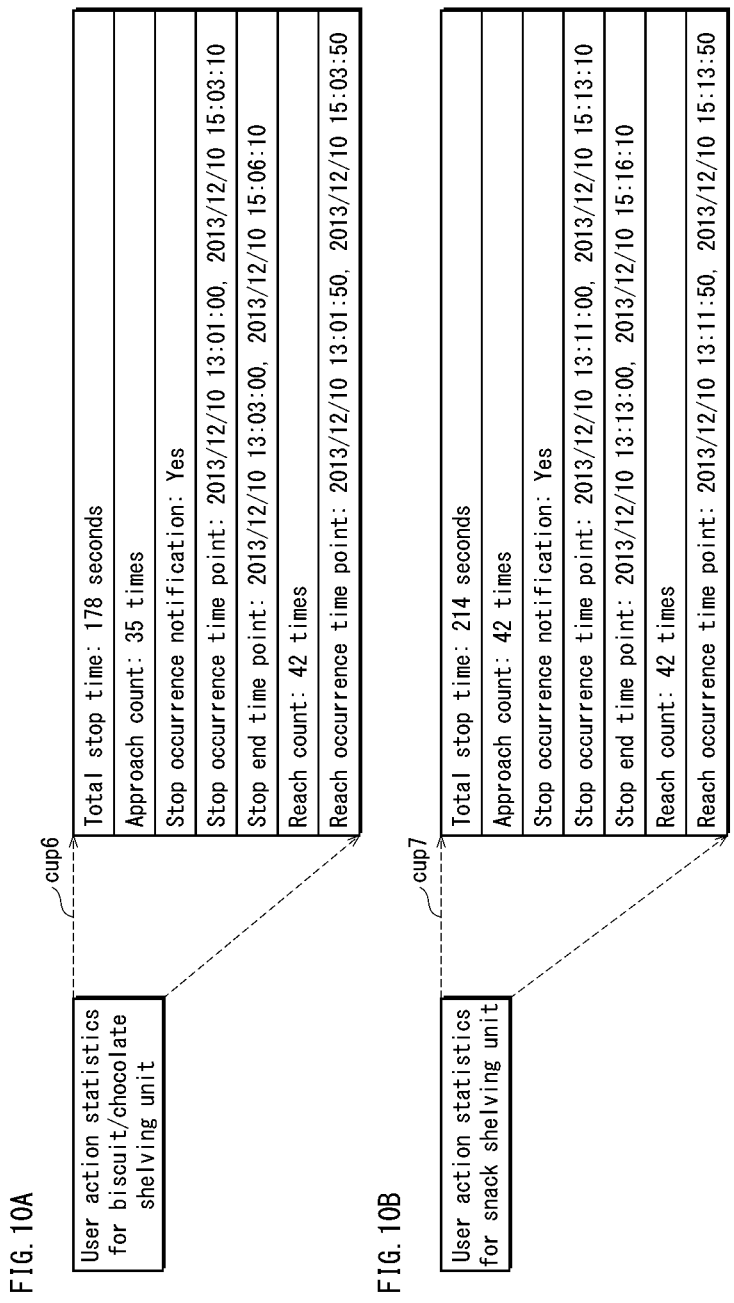
FIG. 10A illustrates one example of a total stop time, an approach count, and a reach count with respect to a biscuit/chocolate shelving unit.
FIG. 10B illustrates one example of the total stop time, the approach count, and the reach count with respect to a snack shelving unit

Say that accumulating of action statistics is performed for a shelving unit with biscuits and chocolate (biscuit/chocolate shelving unit in the following) and a shelving unit with snacks (snack shelving unit in the following), among the shelving units in the store identified by store ID 1. FIGS. 10A and 10B respectively illustrate the action statistics for the biscuit/chocolate shelving unit and the action statistics for the snack shelving unit, which are acquired as a result of the accumulation of action statistics. FIG. 10A indicates that, for the biscuit/chocolate shelving unit, the total stop time is 178 seconds, the approach count is 35, a stop occurrence notification has been made (Yes), the stop occurrence time is 2013/12/10, 13:01:00 and 2013/12/10, 15:03:10, the stop end time is 2013/12/10, 13:03:00 and 2013/12/10, 15:06:10, the reach count is 42, and the reach occurrence time is 2013/12/10, 13:01:50 and 2013/12/10, 15:03:50.

FIG. 10B indicates that, for the snack shelving unit, the total stop time is 214 seconds, the approach count is 42, a stop occurrence notification has been made (Yes), the stop occurrence time is 2013/12/10, 13:11:00 and 2013/12/10, 15:13:10, the stop end time is 2013/12/10, 13:13:00 and 2013/12/10, 15:16:10, the reach count is 42, and the reach occurrence time is 2013/12/10, 13:11:50 and 2013/12/10, 15:13:50. Statistical values to be displayed on the store screen are based on such information.

Specifically, scaling factors applied to graphic items to be composited with the store screen are determined according to statistical values indicated by the action statistics. FIG. 11A is an example of a graph illustrating the relationship between a scaling factor and the total stop time, FIG. 11B is an example of a graph illustrating the relationship between a scaling factor and the approach count, FIG. 11C is an example of a graph illustrating the relationship between a scaling factor and the reach count, and FIG. 11D is an example of a graph illustrating the relationship between a scaling factor and the sold quantity. FIGS. 11A through 11D are created based on the same description rule. In FIGS. 11A through 11D, the vertical axis respectively indicates the scaling factor, and the horizontal axis respectively indicates the total stop time, the approach count, the reach count, and the sold quantity. Further, a straight line between the two axes indicates a change in the scaling factor, with respect to the total stop time, the approach count, the reach count, and the sold quantity, in FIGS. 11A, 11B, 11C, and 11D, respectively. The graphs in FIGS. 11A, 11B, 11C, and 11D respectively indicate that an increase in the total stop time, the approach count, the reach count, and the sold quantity results in an increase in scaling factor. FIG. 11A indicates that the graphic symbol allocated to the total stop time is a circle. FIG. 11B indicates that the graphic symbol allocated to the approach count is a triangle. FIG. 11C indicates that the graphic symbol allocated to the reach count is a rectangle. FIG. 11D indicates that the graphic symbol allocated to the sold quantity is a rhombus. As illustrated in FIGS. 11A, 11B, 11C and 11D, respectively, scaling factor increases proportionally as the total stop time, the approach count, the reach count, and the sold quantity increase.

The increase of scaling factor is proportional as described above; nevertheless, considering the size of the store screen, it is preferable that scaling factor have a predetermined number of levels (e.g., five levels).

FIG. 11E illustrates a bar graph in which scaling factor has five levels. When the scaling factor has five levels as illustrated in FIG. 11E, the possible numerical range of each of the total stop time, the approach count, the reach count, and the sold quantity is to be divided into five numerical ranges. Further, the scaling factor to be applied in the displaying of graphic items is to be determined according to which of the five numerical ranges the total stop time, the approach count, the reach count, and the sold quantity belong to. Each bar in FIG. 11E indicates one of five numeral ranges generated in order to divide scaling factor into five levels.

When changing scaling factor according to which numerical range the total stop time, the approach count, the reach count, and the sold quantity belong, the relationships between the total stop time, the approach count, the reach count, and the sold quantity and the corresponding graphic items can be expressed as illustrated in FIG. 11F. Viewed in the top-bottom direction, FIG. 11F illustrates the graphic items for the total stop time, the graphic items for the approach count, the graphic items for the reach count, and the graphic items for the sold quantity. Note that the graphic items for the total stop time, the approach count, and the reach count may be referred to as statistical value graphic items in the following. Viewed in the left-right direction, FIG. 11F illustrates graphic items with different sizes that are in accordance with the five scaling factor levels. Specifically, viewed from the left to right, FIG. 11F illustrates graphic items acquired by applying the five scaling factor levels, in the order from large to small. The numerical range at the right side of each graphic item for each scaling factor indicates the numerical range represented by the size of the graphic item. As such, the total stop time, the approach count, the reach count, and the sold quantity indicated by the action statistics, which are provided for each shelving unit, are displayed by using statistical value graphic items and the sold quantity graphic item, whose sizes change in five levels.

Figure 12:
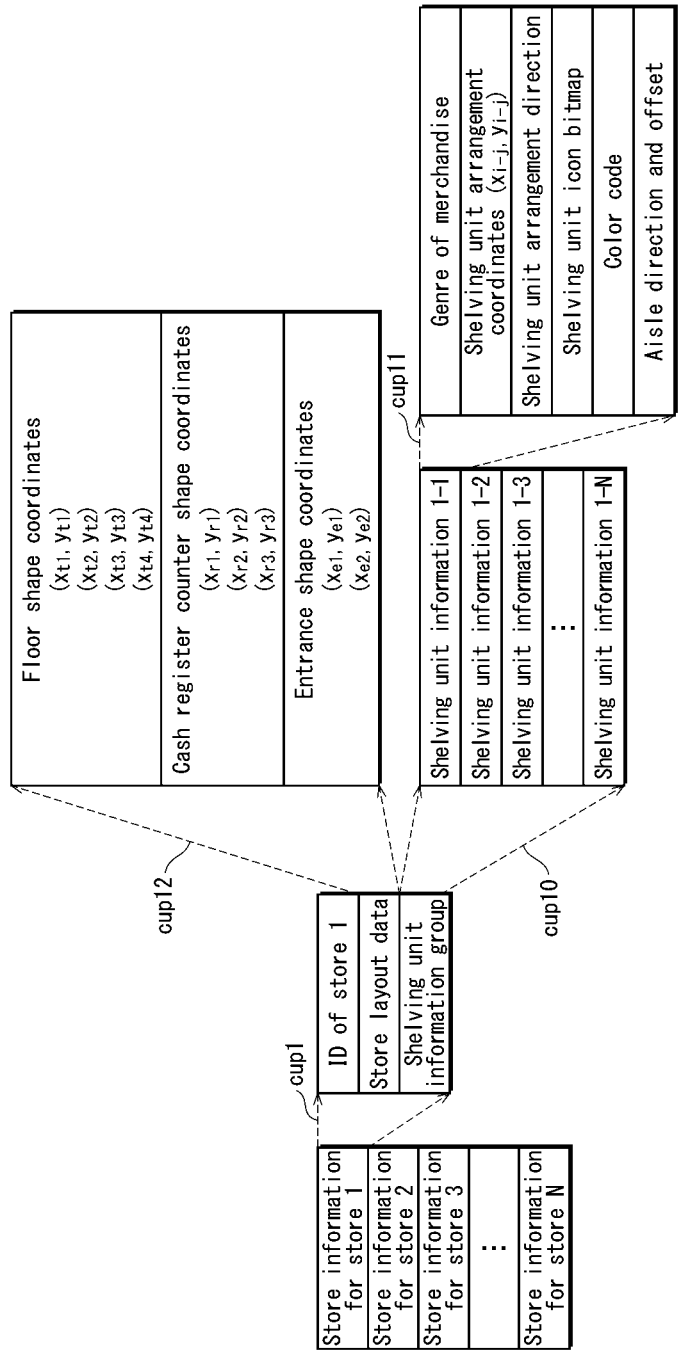
FIG. 12 illustrates the data structure of store information.

This concludes the description of the statistical value graphic items and the sold quantity graphic item. The following explains the shelving unit information group and the layout data that are included in the store information. FIG. 12 illustrates the data structure of the shelving unit information group in the store information. The lines cup 10 indicate that the structure of the shelving unit information group is illustrated in close-up. As illustrated by the lines cup10, the shelving unit information group is composed of a plurality of shelving unit information pieces corresponding to shelving units belonging to one store. The values 1-1, 1-2, and 1-3 in FIG. 12 indicate that the corresponding shelving unit information pieces are for shelving units 1, 2, and 3 in the store identified by store ID 1. The lines cup11 indicate that the internal structure of one piece of shelving unit information is illustrated in close-up. As indicated by the lines cup11, a piece of shelving unit information is composed of merchandise genre, shelving unit arrangement coordinates, shelving unit arrangement direction, shelving unit icon bitmap, color code, and aisle direction and offset" The merchandise genre indicates the genre of merchandise on a shelving unit. The shelving unit arrangement coordinates indicate the coordinates at which a shelving unit icon of the shelving unit is to be arranged. The shelving unit arrangement direction indicates whether the shelving unit is arranged horizontally or vertically. The shelving unit icon bitmap indicates a bitmap constituting the shelving unit icon. The color code specifies display color of the shelving unit icon when the state of the shelving unit icon is to be changed in accordance with a user operation. The aisle direction and offset indicates a side (upper side, lower side, left side, or right side) of the shelving unit facing an aisle and the distance between the shelving unit and the aisle.

The lines cup12 in FIG. 12 indicate that the structure of the store layout data is illustrated in close-up. As illustrated by the lines cup12, the store layout data is composed of floor shape coordinates, cash register counter shape coordinates, and entrance shape coordinates. The floor shape coordinates indicates the shape of a floor of a store, the cash register counter shape coordinates indicates the shape of a cash register counter located on the floor, and the entrance shape coordinates indicates the shape of an entrance portion of the store. In FIG. 12, $(x_{i\text{-}j}, y_{i\text{-}j})$ indicates one example of shelving unit coordinates, which indicate the position at which one shelving unit icon is to be arranged in a coordinate system of a screen. The set of $(x_{f1}, y_{f1})$, $(x_{f2}, y_{f2})$, $(x_{f3}, y_{f3})$, $(x_{f4}, y_{f4})$ is one example of floor shape coordinates, which indicate where the four corners of the floor shape exist in the coordinate system of the screen. The set of $(x_{r1}, y_{r1})$, $(x_{r2}, y_{r2})$, $(x_{r3}, y_{r3})$ indicates one example of cash register counter shape coordinates, which indicate an area of the floor that the cash register counter occupies in the coordinate system of the screen. The set of $(x_{e1}, y_{e1})$, $(x_{e2}, y_{e2})$, $(x_{e3}, y_{e3})$ indicates one example of entrance shape coordinates, which indicate an area of the floor that the entrance portion occupies in the coordinate system of the screen.

Figure 13A:
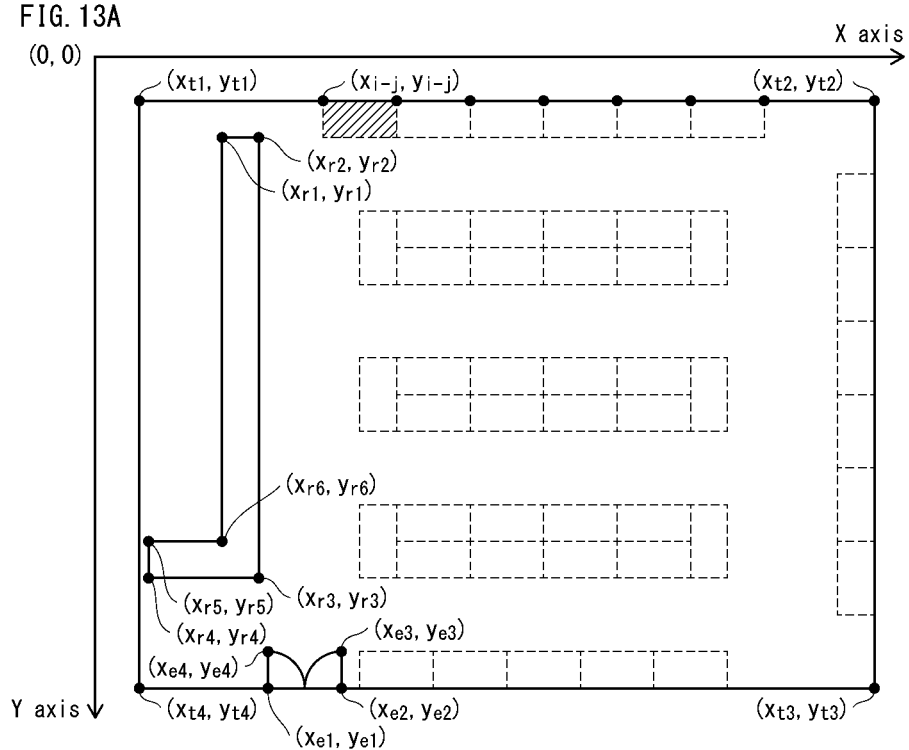
FIG. 13A illustrates shelving unit arrangement coordinates $(x_{i\text{-}j}, y_{i\text{-}j})$, floor shape coordinates $(x_{t1}, y_{t1})$, $(x_{t2}, y_{t2})$, $(x_{t3}, y_{t3})$, . . . , and cash register counter shape coordinates $(x_{r1}, y_{r1})$, $(x_{r2}, y_{r2})$, $(x_{r3}, y_{r3})$ plotted on a coordinate system of a screen.
Figure 13B:
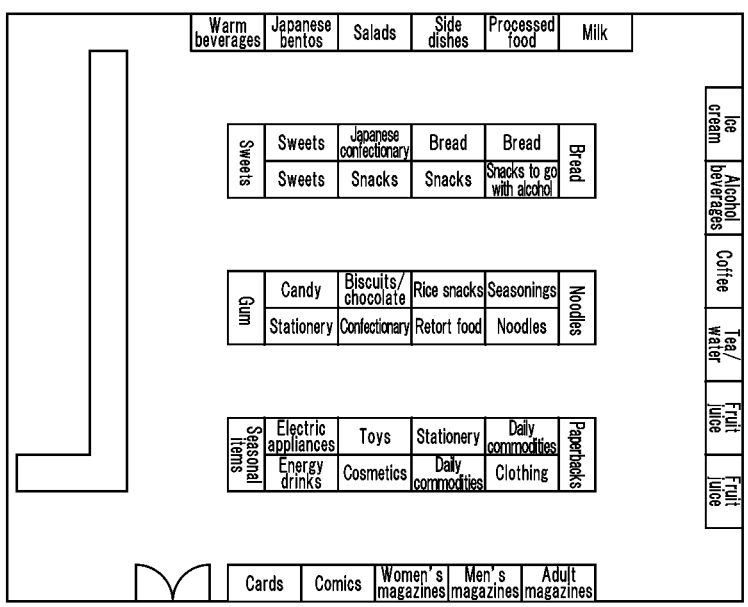
FIG. 13B illustrates one example of a store screen that is created based on shelving unit arrangement coordinates of shelving units, the floor shape coordinates, and entrance shape coordinates.

FIG. 13A illustrates the coordinate system of the screen having plotted thereon $(x_{i\text{-}j}, y_{i\text{-}j})$, which are the shelving unit arrangement coordinates, the set of $(x_{f1}, y_{f1})$, $(x_{f2}, y_{f2})$, $(x_{f3}, y_{f3})$, which are the floor shape coordinates, and the set of $(x_{r1}, y_{r1})$, $(X_{r2}, y_{r2})$, $(x_{r3}, y_{r3})$, which are the cash register counter shape coordinates. The horizontal direction indicates the X axis and the vertical direction indicates the Y axis. In the coordinate system of the screen illustrated in FIG. 13A, lines connecting $(x_{f1}, y_{f1})$, $(x_{f2}, y_{f2})$, $(x_{f3}, y_{f3})$, $(x_{f4}, y_{f4})$ indicate the overall shape of the floor. Further, lines connecting $(x_{r1}, y_{r1})$, $(x_{r2}, y_{r2})$, $(x_{r3}, y_{r3})$, and so on indicate the cash register counter, and lines connecting $(x_{e1}, y_{e1})$, $(x_{e2}, y_{e2})$, $(x_{e3}, y_{e3})$, and so on indicate the entrance portion. In addition, the shelving unit icon is arranged so that the top left corner thereof is arranged at $(x_{i\text{-}j}, y_{i\text{-}j})$. FIG. 13B illustrates one example of a store screen that is created according to the shelving unit arrangement coordinates of shelving units, the floor shape coordinates, and the entrance shape coordinates. This store screen is arranged at a store screen plane, which is the bottommost plane layer among a plurality of plane layers.

FIG. 14A illustrates a state where a sold quantity/statistical value plane and the store screen plane, among the plane layers, are composited. As illustrated in FIG. 14A, the store screen bitmap is stored to the store screen plane, which is bottommost plane layer. The sold quantity/statistical value plane stores figures obtained by combining the statistical value/sold quantity graphic items. The arrow aw1 in FIG. 14A indicates the order of compositing. Specifically, the application screen image is acquired by placing the sold quantity/statistical value plane at the front and compositing the store screen plane to a back side of the sold quantity/statistical value plane.

The figures obtained by combining the statistical value/sold quantity graphic items include a "card-with-diamond" figure, in which a rhombus is arranged on a rectangle, and a "circle-with-pyramid" figure, in which a triangle is arranged on a circle. FIG. 14B illustrates the "card-with-diamond" figure, and FIG. 14C illustrates the "circle-with-pyramid" figure.

This enables overlaying a sold quantity graphic item indicating sold quantity and a statistical value graphic item indicating reach count on a shelving unit icon, and overlaying statistical value graphic items indicating total stop time and approach count on an aisle in front of a shelving unit icon.

Executing the compositing of the sold quantity graphic item and the three statistical value graphic items (i.e., the reach count graphic item, the total stop time graphic item, and the approach count graphic item) for all shelving units yields the application screen image illustrated in FIG. 14D.

Note that the store screen includes both shelving units arranged horizontally and shelving units arranged vertically. Further, the store screen includes shelving unit facing an aisle at an upper side thereof, shelving units facing an aisle at a lower side thereof, shelving units facing an aisle at a left side thereof, and shelving units facing an aisle at a right side thereof. Such difference between shelving units are indicated by the shelving unit arrangement direction and aisle direction and offset in the shelving unit information for the shelving units. The table in FIG. 15A illustrates how an X-direction offset and a Y-direction offset change depending upon which side of a shelving unit faces an aisle. Viewed in the top-bottom direction, FIG. 15A illustrates where an aisle exists with respect to a shelving unit (whether at an upper side, a lower side, a left side, or a right side). Viewed in the left-right direction, FIG. 15A illustrates values for OffsetX and OffsetY.

OffsetX and OffsetY are values indicating the offsets of the sold quantity graphic item and the three types of statistical value graphic items (i.e., the reach count graphic item, the total stop time graphic item, and the approach count graphic item) with respect to coordinates of a shelving unit. OffsetX and OffsetY are values with either a "+" (plus) symbol or a "−" (minus) symbol. OffsetX and OffsetY with a "+" (plus) symbol indicates that an aisle exists in the positive direction along the X axis and in the positive direction along the Y axis, respectively. OffsetX and OffsetY with a "−" (minus) symbol indicates that an aisle exists in the negative direction along the X axis and in the negative direction along the Y axis, respectively. Further, Icon_width indicates a length of a shelving unit icon in the horizontal direction, and Icon_height indicates a length of a shelving unit icon in the vertical direction. FIG. 15A indicates that when an aisle is at a lower side of a shelving unit, OffsetX is set to Icon_width/4 and OffsetY is set to +Icon_height, and that when an aisle is at an upper side of a shelving unit, OffsetX is set to Icon_width/4 and OffsetY is set to −Icon_height. Further, FIG. 15A indicates that when an aisle is at a left side of a shelving unit, OffsetX is set to −Icon_width and OffsetY is set to Icon_height/4, and that when an aisle is at a right side of a shelving unit, OffsetX is set to +Icon_width and OffsetY is set to Icon_height/4.

FIGS. 15B through 15E illustrates, two-dimensionally, the sold quantity graphic item, the reach count graphic item, the total stop time graphic item, and the approach count graphic item when OffsetX and OffsetY are specified as illustrated in the table in FIG. 15A. In FIGS. 15B and 15C, the sold quantity graphic item and the reach count graphic item are arranged at $(x_{i-j}+\text{offsetX}, y_{i-j})$. In FIGS. 15D and 15E, the sold quantity graphic item and the reach count graphic item are arranged at $(x_{i-j}, y_{i-j}+\text{offsetY})$ In FIGS. 15B through 15E, the total stop time graphic item and the approach count graphic item are arranged at $(x_{i-j}+\text{offsetX}, y_{i-j}+\text{offsetY})$.

Among FIGS. 15B through 15E, FIG. 15B illustrates the arrangement of the sold quantity graphic item, the reach count graphic item, the total stop time graphic item, and the approach count graphic item with respect to a horizontally-arranged shelving unit facing an aisle at a lower side. FIG. 15B indicates that, since OffsetX is set to Icon_width/4 when an aisle exists at a lower side, the "card-with-diamond" figure, which is composed of the sold quantity graphic item and the reach count graphic item, is overlaid onto the shelving unit icon.

Further, FIG. 15B indicates that, since OffsetY is set to Icon_height when an aisle exists at a lower side, the total stop time graphic item and the approach count graphic item are arranged immediately below the horizontally-arranged shelving unit icon.

FIG. 15C illustrates the arrangement of the sold quantity graphic item, the reach count graphic item, the total stop time graphic item, and the approach count graphic item with respect to a horizontally-arranged shelving unit facing an aisle at an upper side. FIG. 15C indicates that, since OffsetX is set to Icon_width/4 when an aisle exists at an upper side, the sold quantity graphic item and the reach count graphic item are arranged around the center of the horizontally-arranged shelving unit icon. Further, FIG. 15C indicates that, since OffsetY is set to −Icon_height when an aisle exists at an upper side, the total stop time graphic item and the approach count graphic item are arranged immediately above the horizontally-arranged shelving unit icon.

FIG. 15D illustrates the arrangement of the sold quantity graphic item, the reach count graphic item, the total stop time graphic item, and the approach count graphic item with respect to a vertically-arranged shelving unit facing an aisle at a left side. FIG. 15D indicates that, since OffsetY is set to Icon_height/4 when an aisle exists at a left side, the sold quantity graphic item and the reach count graphic item are arranged around the center of the vertically-arranged shelving unit icon. Further, FIG. 15D indicates that, since OffsetX is set to −Icon_width when an aisle exists at a left side, the total stop time graphic item and the approach count graphic item are arranged at the left side of the vertically-arranged shelving unit icon.

FIG. 15E illustrates the arrangement of the sold quantity graphic item, the reach count graphic item, the total stop time graphic item, and the approach count graphic item with respect to a vertically-arranged shelving unit facing an aisle at a right side. FIG. 15E indicates that, since OffsetY is set to Icon_height/4 when an aisle exists at a right side, the sold quantity graphic item and the reach count graphic item are arranged around the center of the vertically-arranged shelving unit icon. Further, FIG. 15E indicates that, since OffsetX is set to +Icon_width when an aisle exists at a right side, the total stop time graphic item and the approach count graphic item are arranged at the right side of the vertically-arranged shelving unit icon.

Figure 16A:
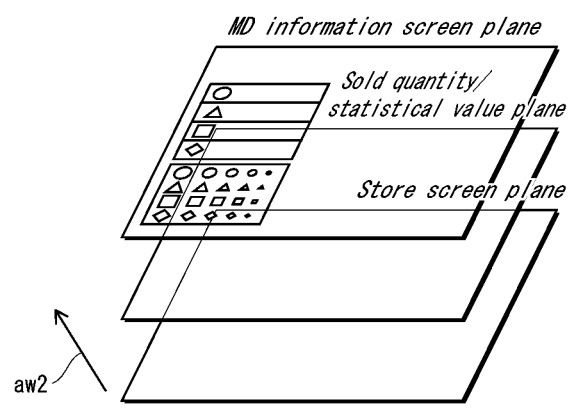
FIG. 16A illustrates layer compositing where an MD information screen plane is composited with respect to the store screen plane and the sold quantity/statistical value plane.
Figure 16B:
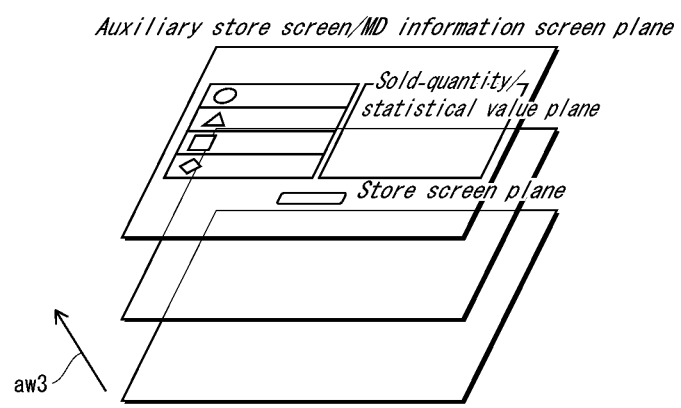
FIG. 16B illustrates layer compositing where an auxiliary store screen/MD information screen plane is composited with respect to the store screen plane and the sold quantity/statistical value plane.

The following describes the compositing of other layers. FIG. 16A illustrates compositing of an MD information screen plane with respect to the store screen plane and the sold quantity/statistical value plane. The MD information screen plane, which is arranged at the front, is a plane memory for storing a GUI for displaying MD information. The arrow aw2 in FIG. 16A indicates the order in which the compositing is performed. Specifically, an application screen image is acquired by placing the MD information screen plane at the front, and compositing the sold quantity/statistical value plane and the store screen plane to a back side of the MD information screen plane. FIG. 16B illustrates compositing of an auxiliary store screen/MD information screen plane with respect to the store screen plane and the sold quantity/statistical value plane. The arrow aw3 in FIG. 14B indicates the order in which the compositing is performed. Specifically, the application screen image is acquired by placing the auxiliary store screen/MD information screen plane at the front and compositing the sold quantity/statistical value plane and the store screen plane to a back side of the auxiliary store screen/MD information screen plane.

This concludes the description of the process through which an application screen image is created. The following describes details of a case where the user action statistics, the sales history information, and the store information are used.

Figure 17:
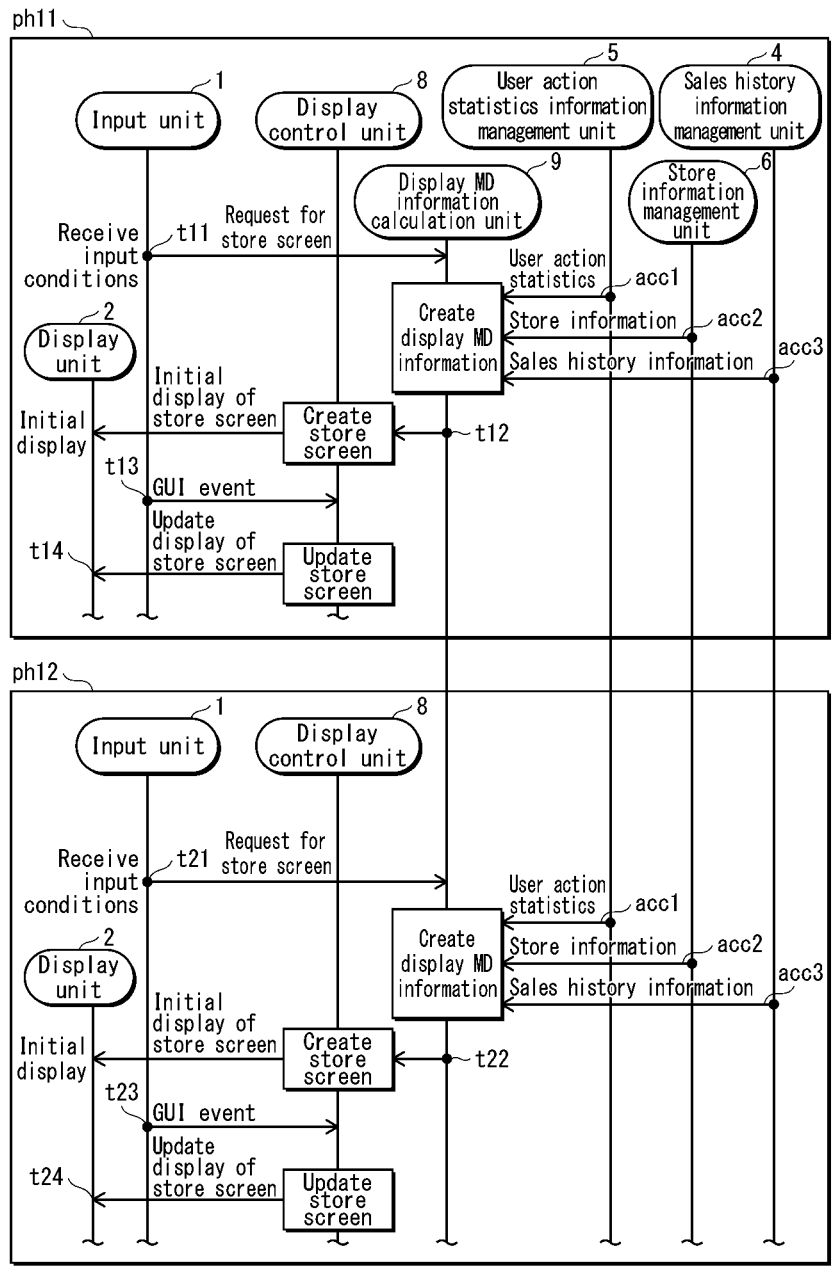
FIG. 17 is a sequence illustrating a situation where the store information, the user action statistics, and the sales history information are used.

FIG. 17 is a sequence illustrating a case where the store information, the user action statistics, and the sales history information are used. The sequence illustrated in FIG. 17 includes phase ph11 in which service is provided to user AAA, and phase ph12 in which service is provided to user ZZZ. The following describes the sequence in phase ph11.

A request for creating a screen occurs at time point t11 in phase ph11. At time point t11, a store screen request message including input conditions received from a user is transmitted from the input unit 1 of the information terminal device 20 to the display MD information calculation unit 9 of the MD information management device 30. The reference symbols acct, acc2, and acc3 in FIG. 17 indicate access made to action statistics information, store information, and sales history information, respectively, when the store screen request message is received.

A store screen is initially displayed at time point t12, due to transmission of a store screen.

A user operation with respect to the initially-displayed store screen is received at time point t13. Due to the user operation being received, the display control unit 8 of the information terminal device 20 transmits a GUI event to the store information management unit 6. Due to the GUI event being transmitted, an updated screen is transmitted to the display control unit 8. The updated store screen is displayed at time point t14 (an update display timing).

This concludes the description of the sequence in phase ph11. The sequence in phase ph12 includes similar transmission/reception (performed at time points t21, t22, t23, t24). When the above-described sequence is executed for a given user, a store screen, an auxiliary store screen, and an MD information screen pertaining to a store that the user belongs to is displayed on the information terminal device 20 of the user. This concludes the description of the transmission/reception sequence for store screen creation. The following describes an application screen image displayed by the information terminal device 20.

Figure 18:
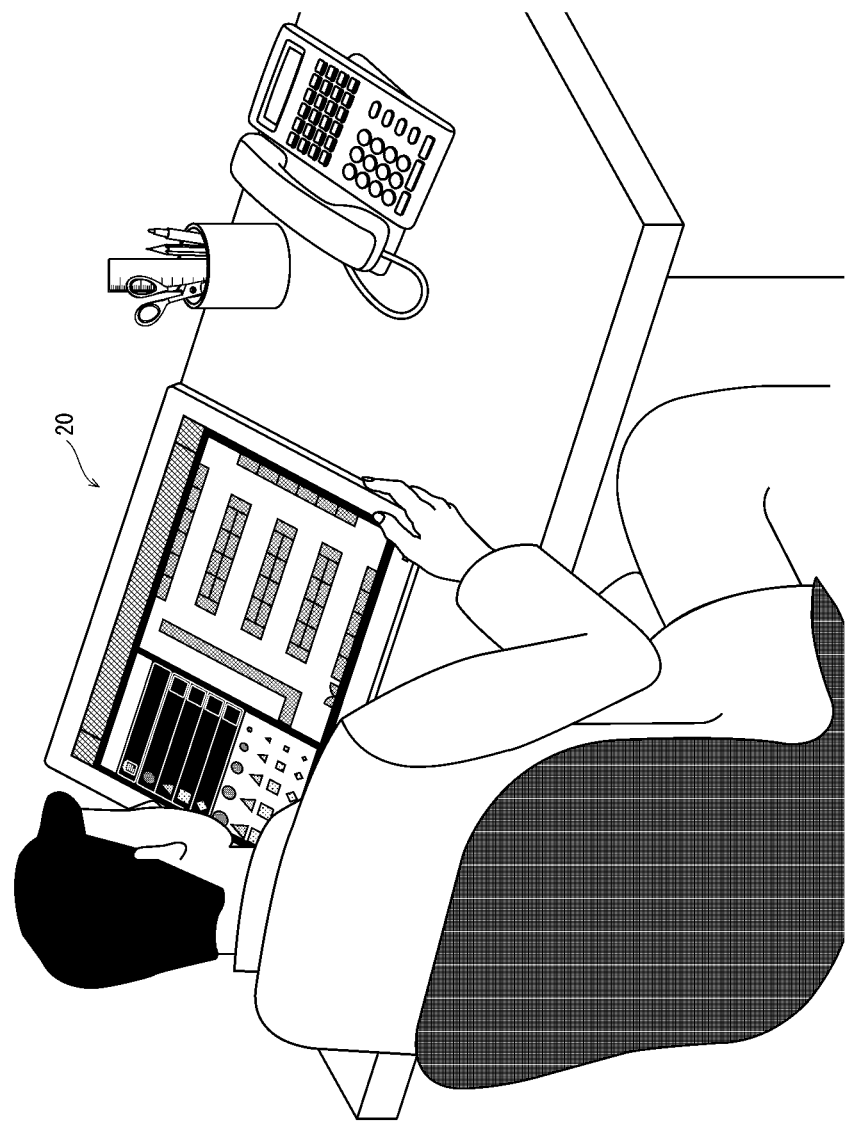
FIG. 18 illustrates one example of a situation where the information terminal device 20 is used.

FIG. 18 illustrates a case where the information terminal device 20 is used. In FIG. 18, the information terminal device 20 is illustrated as a tablet-type terminal where selection of icons and pressing of buttons are performed by touch being made to a screen. Further, as long as the information terminal device 20 is a tablet-type terminal, the information terminal device 20 may be a smartphone. Alternatively, the information terminal device 20 may be a lap-top computer where operations are made by using a pointing device such as a mouse or a keypad. The information terminal device 20, when receiving a touch operation on the screen, is capable of putting shelving unit icons in the store screen in selected state, or putting various buttons in the store screen in pressed state. In the case illustrated in FIG. 19, the information terminal device 20 is possessed and used by a user, who may be a staff at the headquarters of the franchise chain or an owner of a store. The information terminal device 20 displays a store screen, an auxiliary store screen, and an MD information screen in accordance with operations performed by this user.

Figure 19:
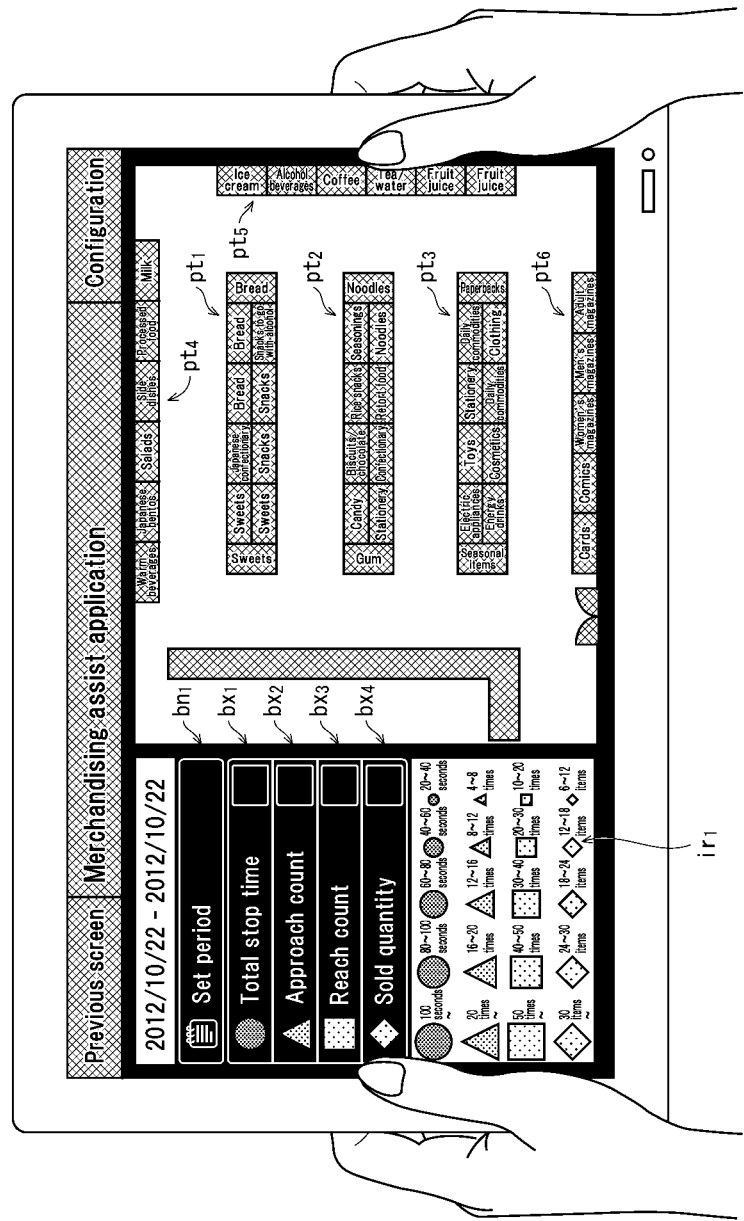
FIG. 19 illustrates one example of the application screen image created for one store.

FIG. 19 illustrates one example of an application screen image created for a given store. The right side of FIG. 19 shows a store screen. The store screen is formed by two-dimensionally arranging a plurality of shelving unit icons according to a layout diagram of shelving units inside the store. Each shelving unit icon is a rectangular GUI component that is provided with a character string indicating merchandise. For example, the character string may be sweets, Japanese confectionary, or bread. The following describes the shelving unit layout in the store screen illustrated in FIG. 19. In a store, a plurality of shelving units arranged in line in the vertical direction or the horizontal direction form a partition. In FIG. 19, partitions pt1, pt2, pt3 exist in front of the cash register counter of the store. The partitions pt1, pt2, pt3 are each composed of a plurality of shelving units arranged in line in the horizontal direction. Further, partitions pt4, pt5, pt6 are located along walls of the store. Partition pt5 is composed of shelving units with beverages, and partition pt6 is mainly composed of shelving units with books.

When there exists a plurality of merchandise of the same genre, forming such partitions enables arranging a plurality of shelving units with merchandise of the same genre in a group so as to be continuous in one direction (horizontal direction or vertical direction). In partition pt1 in FIG. 19, snacks occupy two shelving units that are aligned in the horizontal direction, and sweets occupy one vertically-arranged shelving unit at the left end and two shelving units next to the vertically-arranged shelving unit that are adjacent in the vertical direction. Further, in partition pt1, bread occupies three shelving units that form an L shape. The staff at the headquarters of the franchise chain, by simply viewing this store screen, is able to imagine the layout of the shelving units in the store, even when the store is located far from the headquarters.

The information terminal device 20 being a tablet terminal, the user is able to put a shelving unit icons in selected state by touching the screen. The left side of FIG. 19 shows a vertically-arranged tool bar. The tool bar includes a display target period setting button bn1 and display target item setting buttons bx1, bx2, bx3, bx4. The display target item setting buttons are those for total stop time, approach count, reach count, and sold quantity. Below the tool bar is arranged an indicator ir1 that indicates the correspondence between total stop time, approach count, reach count, sold quantity and graphic items. The indicator shows total stop time graphic items in five sizes, approach count graphic items in five sizes, reach count graphic items in five sizes, and the sold quantity graphic items in five sizes. Further, the total stop time graphic items, the approach count graphic items, the reach count graphic items, and the sold quantity graphic items have circular shapes, triangular shapes, square shapes, and rhombus shapes, respectively.

Figure 20:
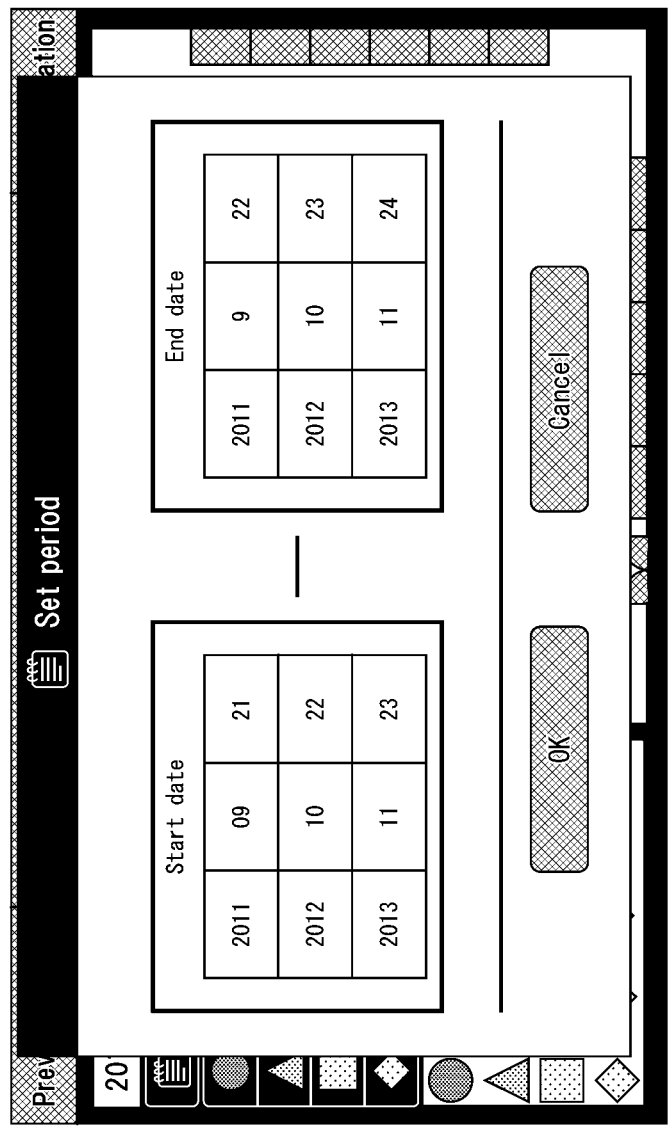
FIG. 20 illustrates one example of the store screen when setting a display target period of MD information.

When the Configuration button is pressed with the display period setting button bn1 in selected state, a display target period setting screen illustrated in FIG. 20 is displayed on the MD information screen plane. FIG. 20 illustrates one example of a display target period setting screen. The display target period setting screen illustrated in FIG. 20 is for receiving input of values for the year, month, and date of each of the start date of the display target period and the end date of the display target period. A specification of year can be made by selecting one year, in anno domini, between 2011 and 2013, a specification of month can be made by selecting one month between September and November, and a specification of date can be made by selecting one day between 21 and 23, and one day between 22 and 24. When the year, month, and date of the start date and the end date of the display target period are specified on the display target period setting screen and OK is pressed, a period between the start date and the end date is set as the display target period of the MD information.

Figure 21:
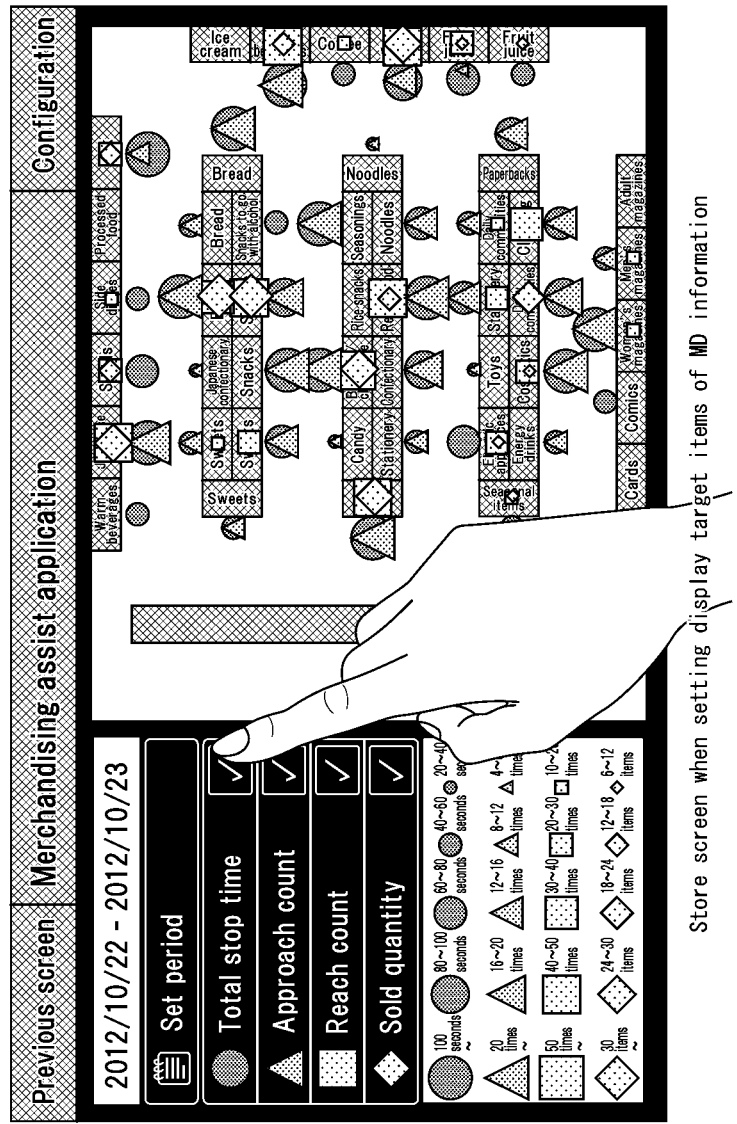
FIG. 21 illustrates one example of the store screen when setting of display target items of the MD information.

FIG. 21 illustrates one example of a store screen during setting of display target items of the MD information. FIG. 21 shows that check boxes corresponding to the items total stop time, approach count, reach count, and sold quantity have been ticked. Further, in the store screen illustrated in FIG. 21, as characteristic visual representations, "card-with-diamond" figures are overlaid onto shelving units and "circle-with-pyramid" figures are overlaid onto aisles in front of shelving units. Each "circle-with-pyramid" figure is a regular triangle arranged on a circle. The size of the circle indicates total stop time, and the size of the triangle indicates the approach count. A shelving unit having a large "circle-with-pyramid" figure and a large "card-with-diamond" figure is a shelving unit whose ability of attracting store visitors is high and which is making a great contribution to sales.

Meanwhile, a shelving unit having a small diamond figure but a large "circle-with-pyramid" figure is a shelving unit whose ability of attracting store visitors is high. Thus, placing and displaying campaign target merchandise on such a shelving unit would lead to high sales.

Among the shelving units, shelving units with cosmetics and retort food have "card-with-diamond" figures in which the ratio of the diamond portion to the card portion is small. Such "card-with-diamond" figures indicate shelving units at which reaching has frequently occurred but whose merchandise has not been purchased as frequently. When a shelving unit is provided with such a figure, sales of merchandise on the shelving unit may occur in the close future.

Meanwhile, shelving units with clothing, women's magazines, and men's magazines are provided not with "card-with-diamond" figures but only with small rectangular figures. Such figures indicate shelving units at which reaching has occurred at low frequency and whose merchandise has been rarely purchased. That is, a shelving unit icon that has provided thereto a figure of a rectangular frame without a rhombus inside indicates a shelving unit at which reaching has occurred but whose merchandise has not been purchased at all. The user, due to the existence of such shelving unit icons being made recognizable, is able to consider what merchandise has attracted reaching but has not been purchased at all and what strategy is to be taken to ensure that reaching leads to purchasing.

Further, the user, by carefully observing the composited graphic items, is able to recognize facts that were overlooked in everyday business, such as the existence of shelving units attracting much stopping but not selling much merchandise, the existence of merchandise attracting much reaching, and the existence of shelving units in front of which store visitors spent much time unexpectedly.

Figure 22:
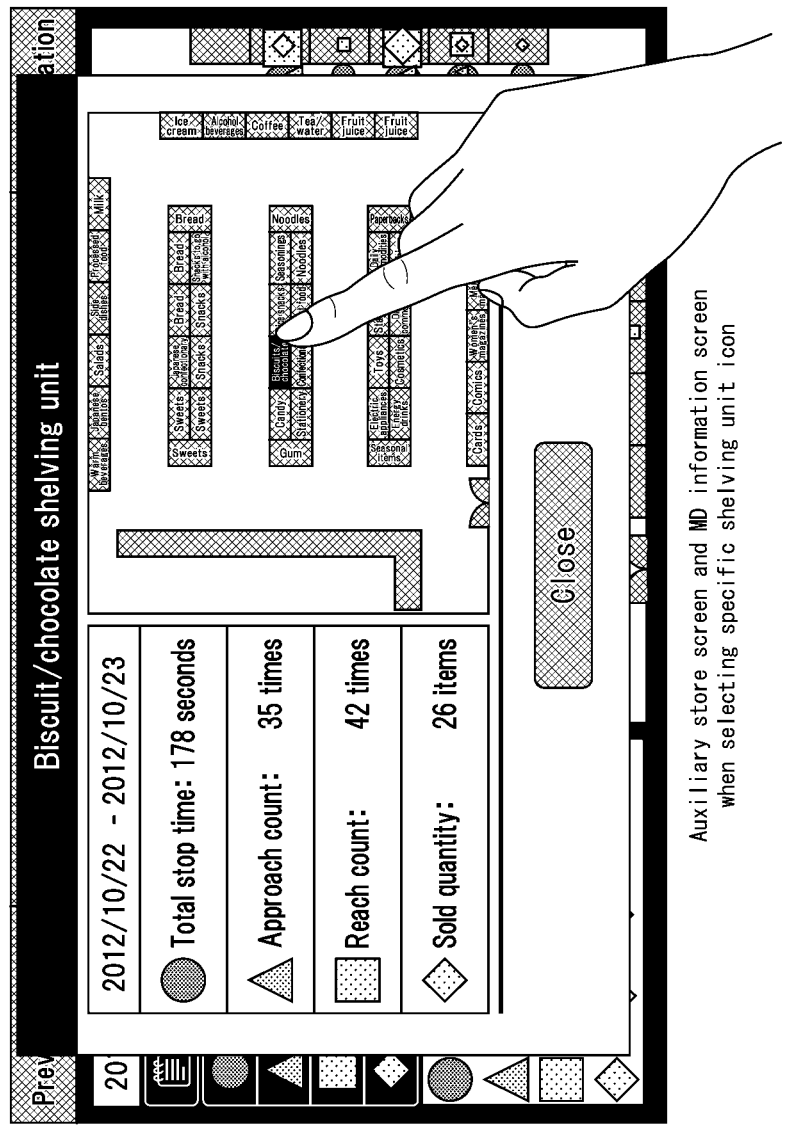
FIG. 22 illustrates one example of an auxiliary store screen and the MD information screen when selecting a specific shelving unit icon.

When one of the plurality of shelving unit icons displayed on the store screen is touched by the user, the information terminal device 20 changes the state of the shelving unit icon from normal state to selected state. This change in state is performed by changing display color of the shelving unit icon, by acquiring the color code corresponding to the touched shelving unit icon from a corresponding piece of shelving unit information in the store information, and by displaying the shelving unit icon by using the color code so acquired. Say a shelving unit icon corresponding to a biscuit/chocolate shelving unit is touched on the store screen illustrated in FIG. 19. In response to this touch, the store screen is switched from that in FIG. 19 to that in FIG. 22. FIG. 22 illustrates one example of an MD information screen and an auxiliary store screen that are displayed when the shelving unit icon of the biscuit/chocolate shelving unit is touched. In the auxiliary store screen, the biscuit/chocolate shelving unit, which has been touched in the store screen, is displayed with emphasis. Since check boxes such as those corresponding to total stop time, approach count, reach count, and sold quantity have been ticked, the MD information screen displays the following information: the total stop time of the biscuit/chocolate shelving unit is 178 seconds; the approach count of the biscuit/chocolate shelving unit is 35 times; the reach count of the biscuit/chocolate shelving unit is 42 times; and the sold quantity of the biscuit/chocolate shelving unit is 26 items. In FIG. 22, the MD information screen and the auxiliary store screen are overlaid on the store screen illustrated in FIG. 19, and the MD information screen and the auxiliary store screen are displayed in the front. Here, note that the overlaying is performed such that the store screen remains without being erased. Thus, touching the store screen that is displayed at the back side results in the front-side/back-side relationship between the store screen and the combination of the MD information screen and the auxiliary store screen changing, such that the store screen is displayed in the front.

As illustrated in FIG. 22, when the auxiliary store screen and the MD information screen are displayed in the front and the store screen is displayed in the back with the auxiliary store screen and the MD information screen overlaid thereon as a result of the compositing of layers, the individual shelving unit icons in the store screen are grayed-out and thus become not selectable.

Meanwhile, when the store screen is selected, the store screen is displayed in the front again, and this time, the auxiliary store screen and the MD information screen are grayed out and the shelving unit icons in the auxiliary store screen become not selectable. FIG. 22 illustrates a state where the auxiliary store screen is displayed in the front, and where the shelving unit icon having been selected on the store screen is explicitly displayed. Specifically, a display state of a shelving unit icon in the auxiliary store screen that corresponds to a shelving unit icon having been selected in the store screen transitions to a display state differing from a display state of the rest of the shelving unit icons included in the auxiliary store screen. Further, the shelving unit icons displayed in the auxiliary store screen are also selectable. When one of the shelving unit icons displayed in the auxiliary store screen is selected, the MD information screen is updated. That is, when one of the shelving unit icons included in the auxiliary store screen is put in selected state, the MD information screen displayed on the display is updated so as to display a numerical value of action statistics of the selected shelving unit icon, among the shelving unit icons included in the auxiliary store screen.

Figure 23A:
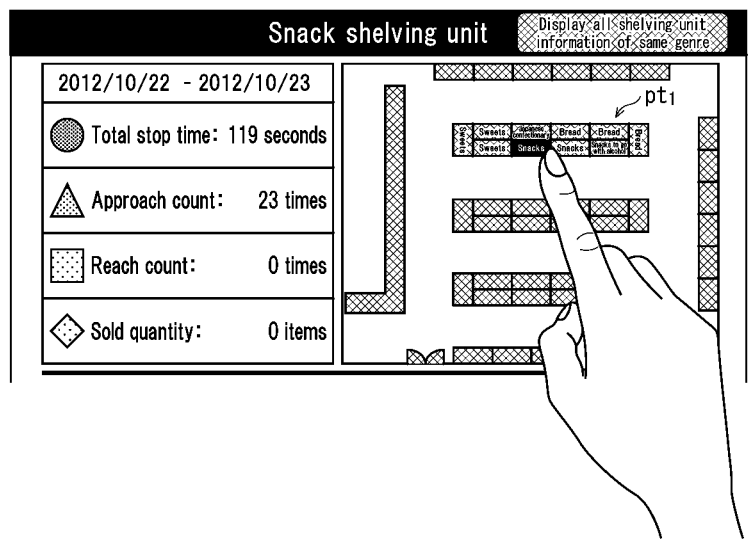
FIG. 23A illustrates an example where, for the snack shelving unit, the total stop time (119 seconds), the approach count (23 times), the reach count (0 times), and the sold quantity (0 times) are displayed.
Figure 23B:
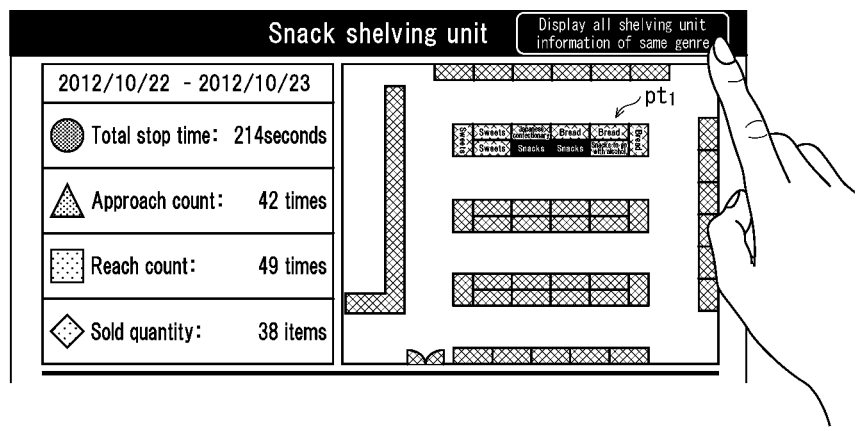
FIG. 23B illustrates one example of the auxiliary store screen and the MD information screen when a button for displaying all shelving unit information of a same genre is selected.

Here, only one biscuit/chocolate shelving unit exists in the store screen illustrated in FIG. 19. However, merchandise of each of genres such as bread, snack, and sweets occupies a plurality of shelving units in the store screen in FIG. 19. When merchandise belonging to one genre occupies a plurality of shelving units and one of such shelving units is touched, the information terminal device 20 executes screen transition as illustrated in FIGS. 23A and 23B. The following focuses on the merchandise genre of snacks, as the genre of merchandise occupying a plurality of shelving units. FIG. 23A illustrates one example of a store screen where one of the shelving units with snacks has been touched. As illustrated in FIG. 23A, when a shelving unit with snacks that is located third from the left in partition pt1 is touched, the shelving unit that has been touched is put in selected state, and in addition, a button for displaying all shelving unit information of the same genre is arranged in a tool bar located at the top of the screen. The MD information screen illustrated in FIG. 23A displays the following information with respect to the snack shelving unit that has been touched: the total stop time is 119 seconds; the approach count is 23 times; the reach count is 0 times; and the sold quantity is 0 items.

FIG. 23B illustrates one example of a store screen when the button for displaying all shelving unit information of the same genre has been touched. Since snacks occupy two contiguous shelving units in a partition, the two contiguous shelving units with snacks are put in selected state when the button for displaying all shelving unit information of the same genre is touched. Further, the MD information screen displays a total of each statistical value and a total of sold quantities for the two shelving units occupied by snacks. Specifically, the MD information screen displays: a total of the total stop times of the two snack shelving units, which is 214 seconds; a total of the approach counts of the two snack shelving units, which is 42 times; a total of the reach counts of the two snack shelving units, which is 49 times; and a total of the purchase quantities of the two snack shelving units, which is 38 items. Due to all shelving units occupied by merchandise of the same genre being displayed with emphasis when the button for displaying all shelving unit information of the same genre is touched, the user is able to check how a group of merchandise is arranged on a plurality of shelving units. Further, the user is able to consider whether or not there is a problem with the arrangement of merchandise on the plurality of shelving units.

This concludes the description of the display screens displayed by the information terminal device 20. The application screen images illustrated in FIGS. 19, 20, 21, 22, 23A, and 23B are created and displayed by the information terminal device 20, which is a table-type device, according to the display MD information provided from the management device. Accordingly, the headquarters staff possessing the information terminal device 20 is able to analyze the movement of numerous, unspecified store visitors in a store located far away. The following describes details of the procedures of the processing performed by the constituent elements.

The processing performed by the constituent elements of the MD information management device 30 and the information terminal device 20, description has been provided up to this point, can be generalized as procedures of processing performed with respect to hardware resources in accordance with various external events and internal device parameters. The flowcharts in FIGS. 24 through 28 illustrates such generalized processing procedures.

Figure 24:
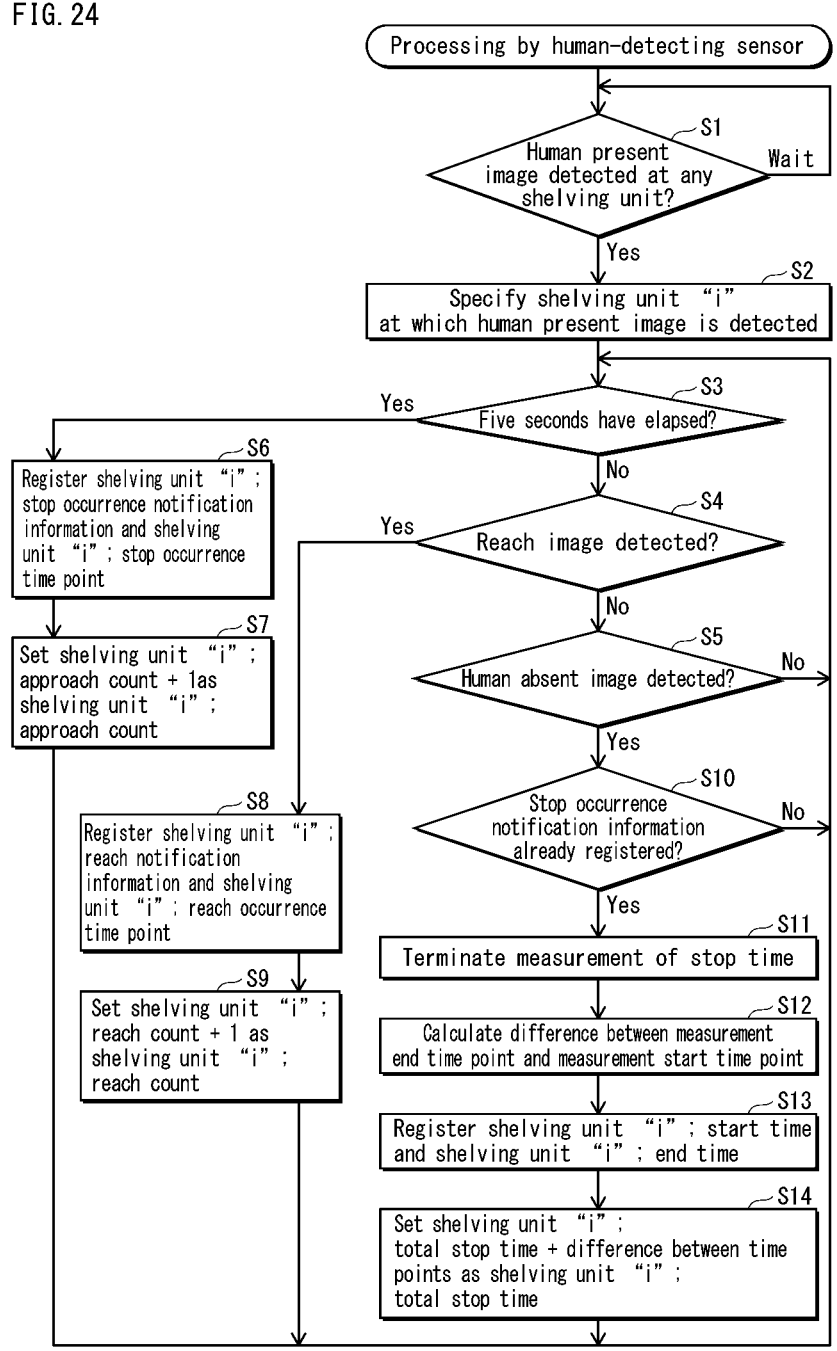
FIG. 24 is a flowchart illustrating processing procedures of a human-detecting sensor.

FIG. 24 is a flowchart illustrating processing procedures of a human-detecting sensor. In this flowchart, the variable i specifies a shelving unit at which action by a store visitor has been detected, among a plurality of shelving units existing in a store. Among action statistics information provided for each shelving unit, an information element included in action statistics information corresponding to the variable i is indicated by shelving unit i; . . . .

In Step S1, a determination is made of whether or not a human present image has been detected for any shelving unit. When a human present image has been detected, processing proceeds to Step S2. In Step S2, the shelving unit at which a human present image has been detected is specified, and processing proceeds to the loop of processing in Steps S3 through S5. This loop monitors whether five seconds have elapsed from the detection of a human present image (Step S3), whether a reach image is detected (Step S4), and whether or not a human absent image is detected (Step S5).

When five seconds elapse from the detection of a human present image (i.e., Yes in Step S3), shelving unit i; stop occurrence notification information and shelving unit i; occurrence time are registered to the user action statistics information management unit 5 (Step S6), and shelving unit i; approach count is incremented (Step S7). When a reach image is detected (i.e., Yes in Step S4), shelving unit i; reach occurrence notification information and shelving unit i; reach occurrence time are registered to the user action statistics information management unit 5 (Step S8), and shelving unit i; reach count is incremented (Step S9). When a human absent image is detected after a human present image has been detected (i.e., Yes in Step S5), processing proceeds to Step S10. In Step S10, a determination is made of whether or not stop occurrence notification information has already been registered. If Yes in Step S10, the measurement of stop time is terminated (Step S11), a difference between a measurement end time and a measurement start time is calculated (Step S12), shelving unit i; stop start time and shelving unit i; stop end time are registered (Step S13), and shelving unit i; total stop time is updated by adding the difference to the current shelving unit i; total stop time (Step S14).

Figure 28:
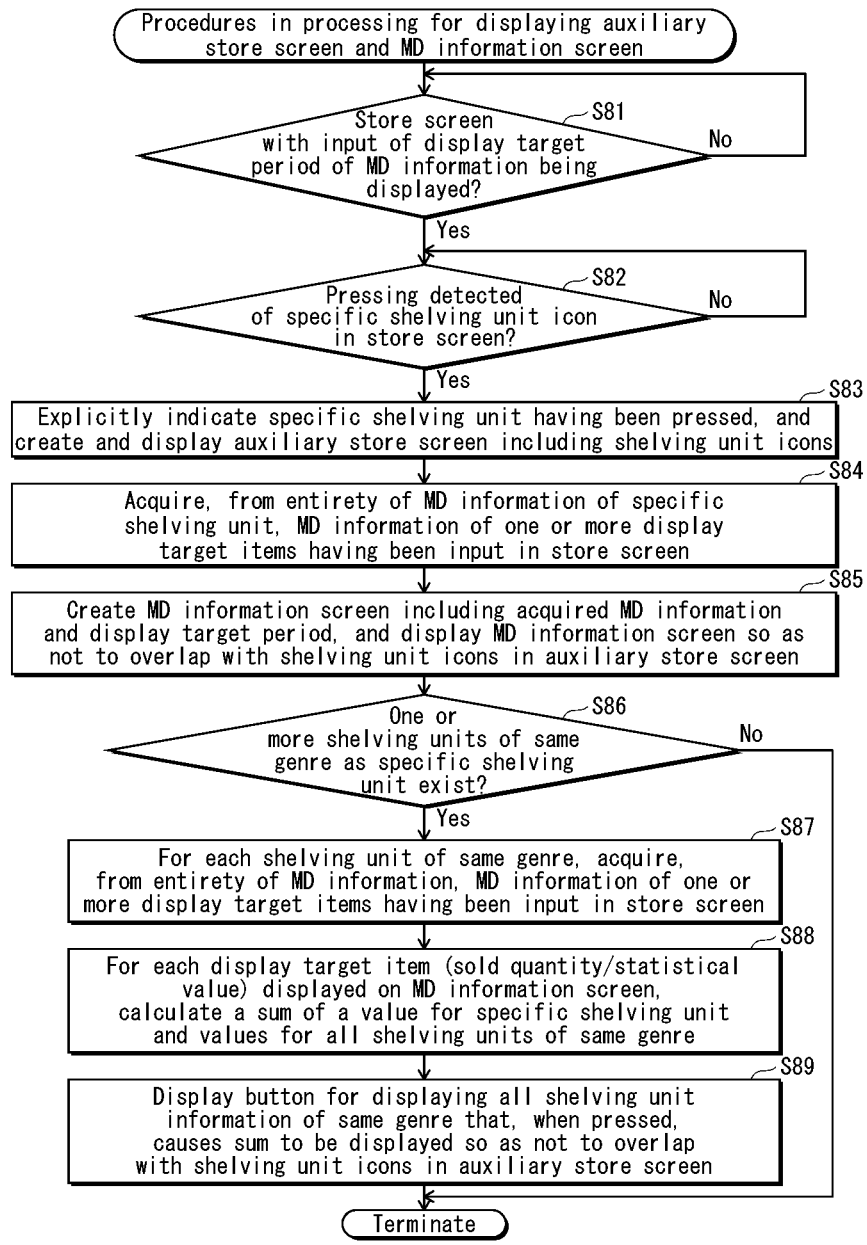
FIG. 28 is a flowchart illustrating processing procedures for displaying the auxiliary store screen and the MD information screen.

The following describes the processing procedures of the information terminal device 20. FIG. 25 is a flowchart illustrating the processing procedures in store screen displaying. This flowchart corresponds to processing at the highest level, or that is, a main routine. Meanwhile, FIGS. 26 through 28 illustrate flowcharts that correspond to processing at a lower level than that of the flowchart in FIG. 25. The processing procedures in the main routine are for a process of displaying by overlaying, with respect to a store screen including icons of shelving units in a store, graphic items representing sold quantity and statistical values among multiple types of MD information, in the vicinity of the shelving unit icons. The following describes the processing procedures of the main routine.

In Step S21 of this main routine, a determination is made of whether or not store information exists. If store information exists, the store information is acquired and a store screen is created and displayed (Step S22), and input buttons for a display target period and display target items of MD information are displayed so as not to overlap with the shelving unit icons (Step S23). Subsequently, processing stops at Step S24 until input of a display target period of MD information is detected in Step S24. When input of a display target period is detected, the display target period so input is displayed in order not to overlap with the shelving unit icons (Step S25), and level threshold values are calculated for all display target items of the MD information during the display target period having been input (Step S26).

Subsequently, the level threshold values so calculated are acquired, and the level threshold values and graphic items each with a size of a different level, for each display target item (sold quantity and statistical values), are displayed so as not to overlap with the shelving unit icons (Step S27). Subsequently, processing stops at Step S28 until input of a display target item is performed. When a display target item is input, MD information for the display target item having been input, within the display target period having been input, is calculated for each shelving unit (Step S29). In Step S30, a determination is made of whether or not a plurality of display target items have been input. When a plurality of display target items have been input, processing proceeds to Step S31, where the MD information of the display target items, calculated for each shelving unit, is acquired and graphic items having sizes of different levels are created in accordance with sold quantity/statistical values in the MD information so acquired, and the graphic items created for each of the display target items are displayed so as to be overlaid in the vicinity of the shelving unit icons in the store screen.

Meanwhile, when only one display target item has been input, processing proceeds to Step S32, where the MD information of the display target item, calculated for each shelving unit, is acquired and graphic items having sizes of different levels are created in accordance with the sold quantity or a statistical value in the MD information acquired, and the graphic items created are displayed so as to be overlaid in the vicinity of the shelving unit icons in the store screen.

Figure 26A:
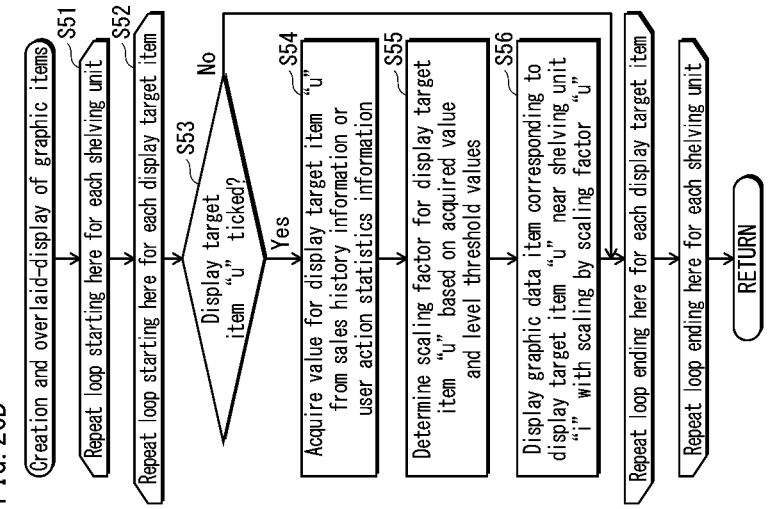
FIG. 26A is a flowchart illustrating a procedure of calculating level threshold values of display target items.

The following describes the calculation of the level threshold values in Step S26 in further detail, by dividing the processing in Step S26 into a plurality of procedures. FIG. 26A is a flowchart illustrating a procedure of calculating level threshold values for each display target item. In the flowchart in FIG. 26A, variable u is a control variable indicative of each of the display target items. The variable k specifies one of a plurality of levels, when displaying graphic items in a plurality of levels for a display target item (sold quantity graphic items or statistical graphic items). After MD information values are acquired for all display target items in Step S41, processing proceeds to Step S42. Step S42 defines a loop of processing in which the processing from Step S43 to Step S50 is performed for each display target item. In Step S43, the maximum value of MD information for a display target item u is calculated. Further, in Step S44, a value obtained by omitting the first digit of the maximum value of display target item u is set as a start value of the highest level of the display target item u. Subsequently, the variable k is initialized by being set to 1 (Step S45), and a value obtained by dividing the start value of the highest level of the display target item u by five is set as a start value of the lowest level of the display target item u (Step S46). Then, the variable k is incremented (Step S47) and processing enters the loop composed of Steps S47 through S50. In this loop, a value obtained by multiplying the start value of the lowest level of the display target item u by variable k is set as the start value of the $k^{th}$ level of the display target item u (Step S48). Then, a determination is made of whether variable k has reached its maximum value (Step S49). When variable k has not reached its maximum value, a value obtained by adding the start value of the lowest level of display target item u to the start value of the $k^{th}$ level of the display target item u is set as the end value of the $k^{th}$ level of the display target item u (Step S50). The processing in Steps S48, S49 and S50 is repeated until a determination is made that variable k has reached its maximum value in Step S49. By executing this loop of processing, the threshold value of each level of the display target item is set appropriately, based on the maximum and minimum of a value corresponding to the display target item.

Figure 26B:
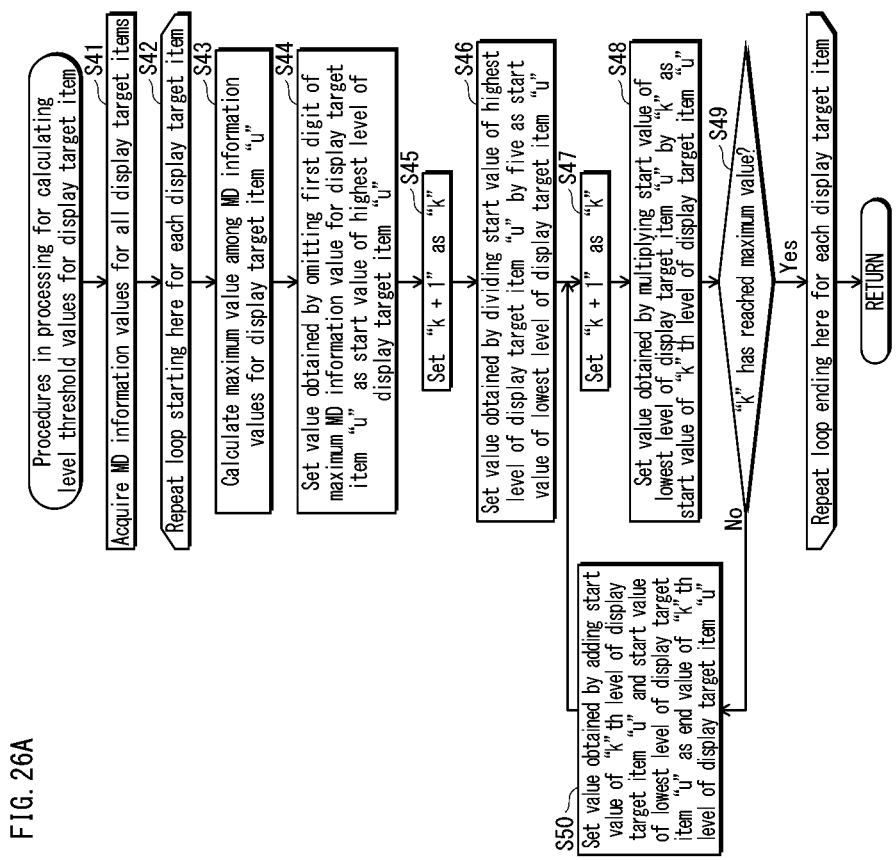
FIG. 26B is a flowchart illustrating processing procedures in graphic item creation and overlaying display.

FIG. 26B is a flowchart illustrating the processing procedures of graphics creation and overlaying display. The flowchart in FIG. 26B is composed of a first loop (Step S52) and a second loop (Step S51). In the first loop, the processing in Steps S53 through S56 is performed for each display target item. In the second loop, the processing in the loop defined by Step S52 is performed for each shelving unit.

In the processing in Steps S53 through S56, first, a determination is made of whether the current display target item u is ticked (Step S53). When the display target item u is not ticked, the processing in Steps S54 through S56 is skipped. When the display target item u is ticked, either a sold quantity or a statistical value corresponding to the display target item u is read from the user sales history information or the user action statistics information (Step S54). Then, the scaling factor for the display target item u is determined based on the sold quantity or the statistical value so read and the level threshold values (Step S55). Further, graphics data corresponding to the display target item u is displayed in the vicinity of the current shelving unit i, at a size specified by the scaling factor (Step S56). The execution of such loops results in graphics data for each display target item being displayed at an appropriate size, either on or near shelving units.

FIG. 27 is a flowchart illustrating the displaying of a graphic item with respect to a shelving unit. In the flowchart in FIG. 27, the processing in Steps S61 and S62 is executed immediately after the commencement of processing. In Step S61, a determination is made of whether an aisle exists at an upper side or at a lower side of the shelving unit, and in Step S62, a determination is made of whether an aisle exists at a left side or a right side of the shelving unit. When an aisle exists at an upper side, OffsetX is set to Icon_width/4 and OffsetY is set to −Icon_height in Step S63. When an aisle exists at a lower side, OffsetX is set to +Icon_width/4 and OffsetY is set to +Icon_height in Step S64.

When an aisle exists at a left side, OffsetX is set to −Icon_width and OffsetY is set to +Icon_height/4 in Step S65. When an aisle exists at a right side, OffsetX is set to +Icon_width/4 and OffsetY is set to +Icon_height in Step S66.

In Step S67, a determination is made of whether the target display target item is one of sold quantity and reach count, and in Step S67, a determination is made of whether the shelving unit is arranged horizontally or vertically. When the display target item is one of total stop time and approach count, a graphic item is displayed at $(x_{i\text{-}j}+\text{OffsetX}, y_{i\text{-}j}+\text{OffsetY})$ in Step S71.

When the display target item is one of sold quantity and reach count and the shelving unit is horizontally arranged, a graphic item is displayed at $(x_{i\text{-}j}+\text{OffsetX}, y_{i\text{-}j})$ in Step S69. When the display target item is one of sold quantity and reach count and the shelving unit is vertically arranged, a graphic item is displayed at $(x_{i\text{-}j}, y_{i\text{-}j}+\text{OffsetY})$ in Step S70. The execution of such a loop results in graphic items being displayed at appropriate positions in accordance with the arrangement direction of the shelving units.

FIG. 28 is a flowchart illustrating the processing procedures in the displaying of the auxiliary store screen and the MD information screen. In this flowchart, when a shelving unit icon corresponding to a shelving unit is selected, a new store screen including shelving unit icons and MD information for the selected shelving unit are displayed. Further, a configuration is made so that the shelving unit icons in the new store screen and the MD information do not overlap with one another. In addition, a configuration is made such that, when a shelving unit with merchandise of the same genre as the merchandise on the selected shelving unit icon exists, a button for displaying all shelving unit information of the same genre is displayed.

In Step S81, a determination is made of whether or not a store screen with respect to which an input of display target period of MD information has been made is being displayed. When such a store screen is being displayed, processing stops at Step S82 until pressing of a specific shelving unit icon in the store screen is detected. When pressing of a specific shelving unit icon in the store screen is detected in Step S82, an auxiliary store screen including shelving unit icons is created and displayed, with the specific shelving unit explicitly indicated in the auxiliary store screen (Step S83). Further, from the entirety of MD information of the specific shelving unit, MD information matching the display target items having been input on the store screen is read (Step S84). Then, an MD information screen including the MD information so acquired and the display target period is created, and is displayed so as not to overlap with the shelving unit icons in the auxiliary store screen (Step S85). Subsequently, processing proceeds to Step S86.

In Step S86, a determination is made of whether a shelving unit with merchandise of the same genre as the merchandise on the specific shelving unit exists. When one or more shelving units with merchandise of the same genre as the merchandise on the specific shelving unit exist, from the entirety of MD information of each of the shelving units with merchandise of the same genre, MD information matching the display target items having been input on the store screen is read (Step S87). Further aggregation is performed of the MD information for the specific shelving unit and the MD information for all shelving units with merchandise of the same genre, for each display target item (sold quantity/statistical value) (Step S88). Further, so that the user can issue an instruction for causing values resulting from the aggregation to be displayed, a button for displaying all shelving unit information of the same genre is displayed so as not to overlap with the shelving unit icons in the auxiliary store screen (Step S89). When a shelving unit with merchandise of the same genre as the merchandise on the specific shelving unit does not exist, the processing in Steps S87 through S89 is skipped. This concludes description of the flowcharts.

The present embodiment can be summarized as follows. An MD information management device manages statistical values for actions (i.e., stopping, approaching, and reaching) that store visitors make near shelving units. An information terminal displays graphic items that are in accordance with the statistical values in the vicinity of shelving unit icons. As such, it can be intuitively determined, based on statistics indicating the behavior of a plurality of store visitors, what layout of shelving units has affected the behavior of store visitors, has attracted customers, and has lead to sales increase. Further, when merchandise sales does not increase as desired, a problem in the layout of shelving units in a store can be intuitively determined, based on statistics indicating the behavior of a plurality of store visitors. This allows determining strategies for improving the layout of shelving units in stores. As such, staff belonging to a franchise chain, which includes a large number of franchise stores, staff in charge of providing sales instructions and advice in supermarkets, large-size mass retailers, etc., are able to provide accurate instructions to retail stores with low sales as to how store layout should be improved. Accordingly, improvement of business revenue can be achieved.

(Embodiment 2)

In embodiment 1, the MD information screen and the auxiliary store screen are overlaid onto the store screen. Meanwhile, in the present embodiment, interactive control is achieved through an application screen image (integrated application screen image) including the functions of the store screen and the functions of the MD information screen and the auxiliary store screen.

Figure 29:
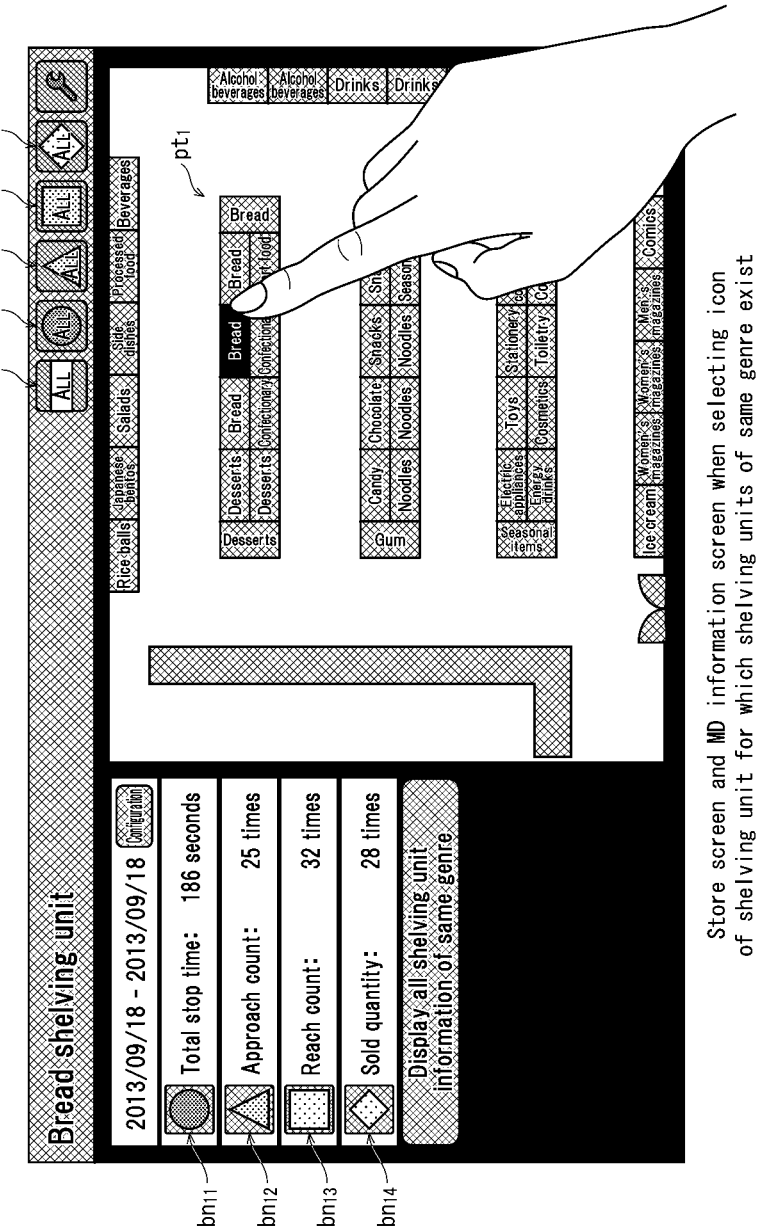
FIG. 29 illustrates an integrated application screen image, which integrates functions of the store screen and the auxiliary store screen.

FIG. 29 illustrates an application screen image that integrates the functions of the store screen, the MD information screen, and the auxiliary store screen. The application screen image includes select-and-lock buttons bn11, bn12, bn13, bn14, a select-all button bn20, and display-all buttons bn21, bn22, bn23, bn24. The select-and-lock buttons bn11, bn12, bn13, bn14 each correspond to one of the four display target items (i.e., total stop time, approach count, reach count, and sold quantity). The select-all button bn20 is arranged at a tool bar at the top of the application screen image, and is for receiving an instruction for selecting all shelving unit icons. The display-all buttons bn21, bn22, bn23, bn24 each correspond to one of the four display target items. Each of the display-all buttons bn21, bn22, bn23, bn24 is for receiving an instruction to display the corresponding display target item for all shelving units.

The select-and-lock buttons bn11, bn12, bn13, bn14, each of which corresponding to one of the four display target items, are each for receiving a setting of whether or not graphic items for the corresponding display target item is to be displayed. When a select-and-lock button is pressed once, the select-and-lock button remains in pressed state and a specification to display all graphic items for the corresponding display target item is made. When the select-and-lock button is pressed for the second time, the specification to display all graphic items for the corresponding display target item is cancelled. The select-and-lock buttons bn11, bn12, bn13, bn14 enable making a configuration of whether to display all graphic items for a corresponding display target item (sold quantity, approach count, reach count, or total stop time).

The select-all button bn20 defines whether or not to receive a select-all specification. A select-all specification is a specification of selecting all shelving unit icons. When the select-all button bn20 is pressed once, the button remains in selected state and the select-all specification is made. When the select-all button bn20 is pressed for the second time, the select-all specification, i.e., the specification to display all shelving units in a store, is cancelled.

The display-all buttons bn21, bn22, bn23, bn24 each are a button for receiving a specification of whether graphic items of a corresponding display target item (total stop time, approach count, reach count, or sold quantity) are to be displayed for all shelving unit icons or for only one shelving unit icon that is selected. When a display-all button is pressed once, the display-all button remains in selected state and a specification is made to display graphic items for all shelving unit icons. When the display-all button is pressed for the second time, the specification to display graphic items for all shelving unit icons is cancelled.

The partition pt1, which is the second partition from the top in the store screen illustrated in FIG. 29, includes four shelving units with bread. When a shelving unit icon corresponding to one of the shelving units included in this partition is selected, an icon for displaying all shelving unit information of the same genre is displayed.

Figure 30:
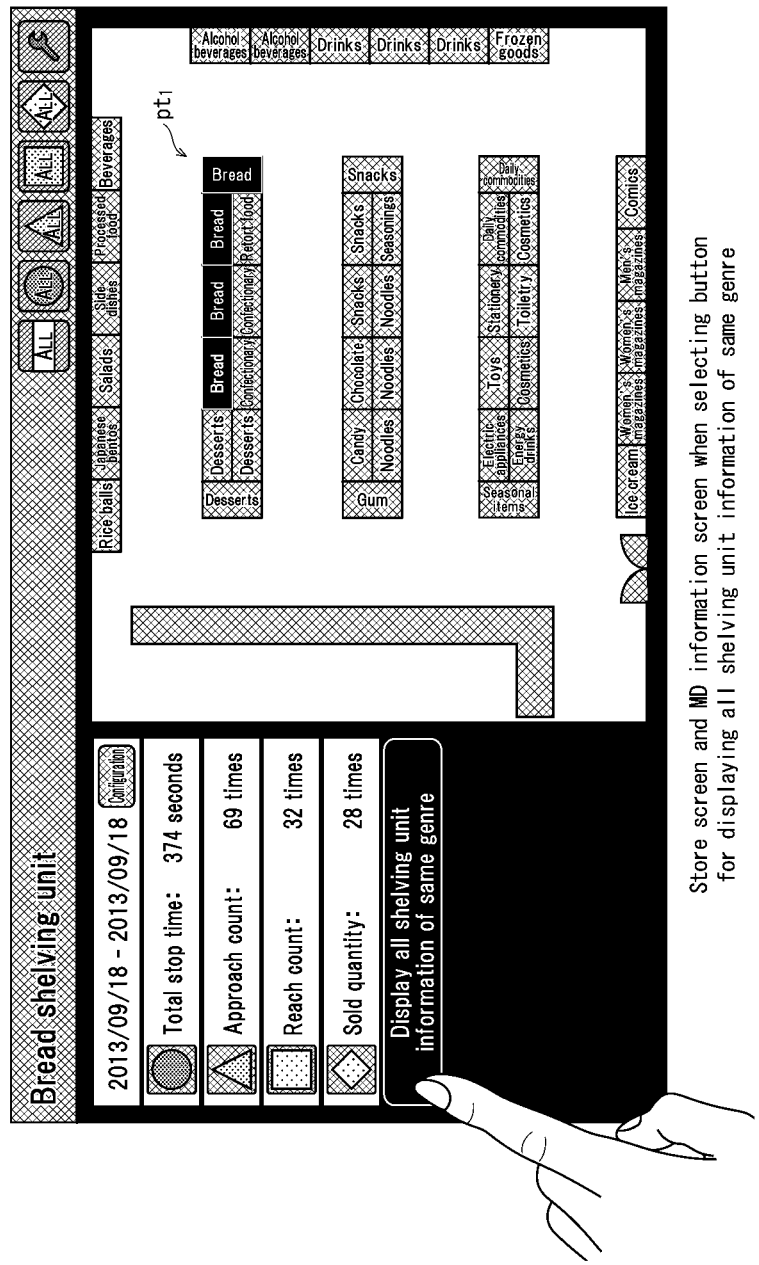
FIG. 30 illustrates one example of the store screen and the MD information screen when selecting the button for displaying all shelving unit information of the same genre and selecting shelving units.

FIG. 30 illustrates the store screen and the MD information screen in a case where the icon for displaying all shelving unit information of the same genre has been pressed.

When the icon for displaying all shelving unit information of the same genre is pressed, the four shelving unit icons corresponding to the four shelving units with bread in the partition pt1 are put in selected state. The four shelving units form an L shape. As a result, the total of total stop times of the four shelving units with bread (374 seconds), the total of the approach counts of the four shelving units with bread (69 times), the total of the reach count of the four shelving units (32 times), and the total of the purchase quantities of the four shelving units (28 times) are displayed.

In FIG. 30, due to a plurality of shelving unit icons being selected, the displaying of the total stop time graphic items, the approach count graphic items, the reach count graphic items, and the sold quantity graphic items for two or more shelving unit icons can be updated. When four shelving unit icons corresponding to shelving units with bread are selected in the store screen in FIG. 30, the total stop time graphic items, the approach count graphic items, the reach count graphic items, and the sold quantity graphic items are displayed for all of the four shelving units having been selected, and further, total values obtained by summing statistical values of action statistics for the four shelving unit icons are displayed in the MD information screen in the form of numerals.

Figure 31:
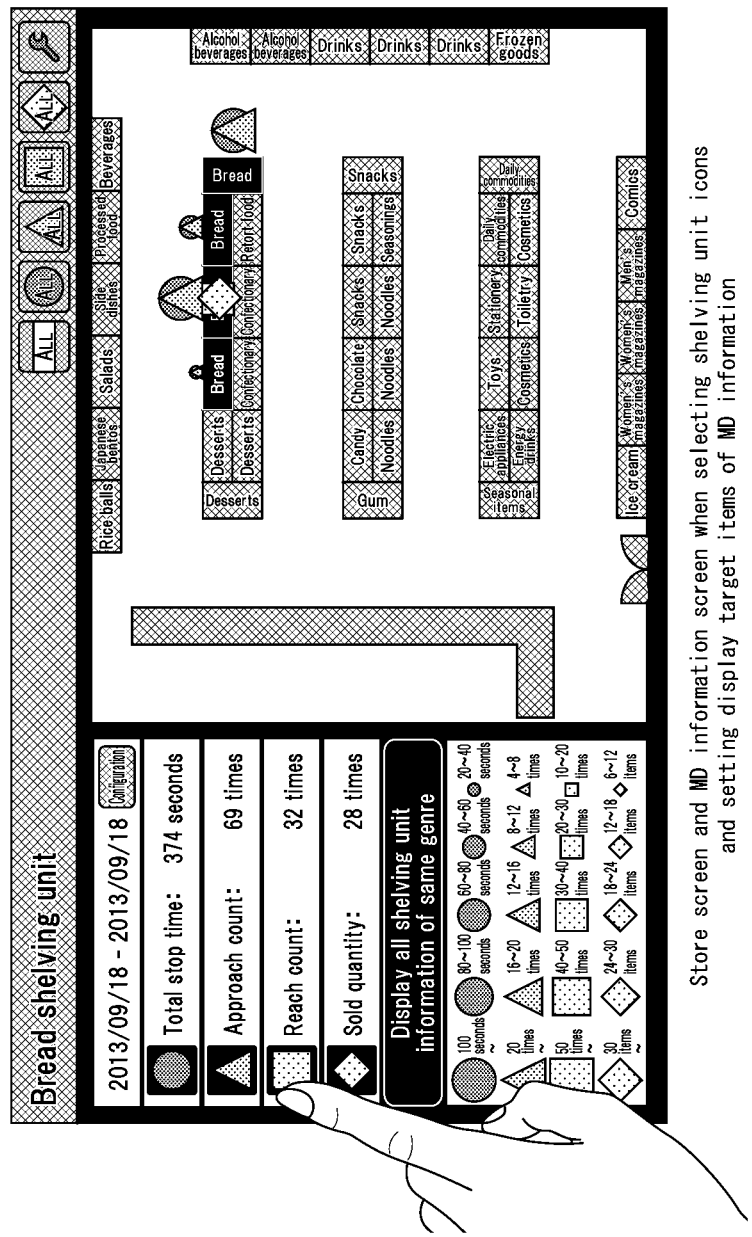
FIG. 31 illustrates one example of the store screen and the MD information screen when setting the total stop time, the approach count, the reach count, and the sold quantity as the display target items and selecting all shelving unit icons of bread.

That is, when two or more shelving unit icons are selected, the total stop time graphic items, the approach count graphic items, the reach count graphic items, and the sold quantity graphic items are displayed for the two or more shelving unit icons having been selected. FIG. 31 illustrates such information being displayed.

FIG. 31 illustrates one example of the application screen image when the display target items total stop time, approach count, reach count, and sold quantity are selected with all shelving unit icons corresponding to shelving units with bread being selected. In FIG. 31, the total stop time graphic items, the approach count graphic items, the reach count graphic items, and the sold quantity graphic items are displayed for each of the shelving unit icons that form the L shape. That is, when four shelving unit icons corresponding to shelving units with bread are selected in FIG. 30, the total stop time graphic items, the approach count graphic items, the reach count graphic items, and the sold quantity graphic items for the four shelving units with bread are overlaid on what is being displayed on the display. Further, display control performed when a shelving unit icon corresponding to one shelving unit is selected with total stop time graphic items, approach count graphic items, reach count graphic items, and sold quantity graphic items for one or more other shelving units being displayed includes (a) and (b) described in the following. Display control (a) is putting the newly selected shelving unit icon in selected state and updating the MD information screen while continuing display of the total stop time graphic items, the approach count graphic items, the reach count graphic items, and the sold quantity graphic items currently displayed. Display control (b) is putting the newly selected shelving unit icon in selected state and updating the MD information screen while cancelling display of the total stop time graphic items, the approach count graphic items, the reach count graphic items, and the sold quantity graphic items currently displayed. Display control (a) is advantageous in that comparison can be made between shelving unit icons based on statistical value/sold quantity. Meanwhile, display control (b) is advantageous in that displaying of graphic items is linked with the selecting of shelving unit icons.

Figure 32:
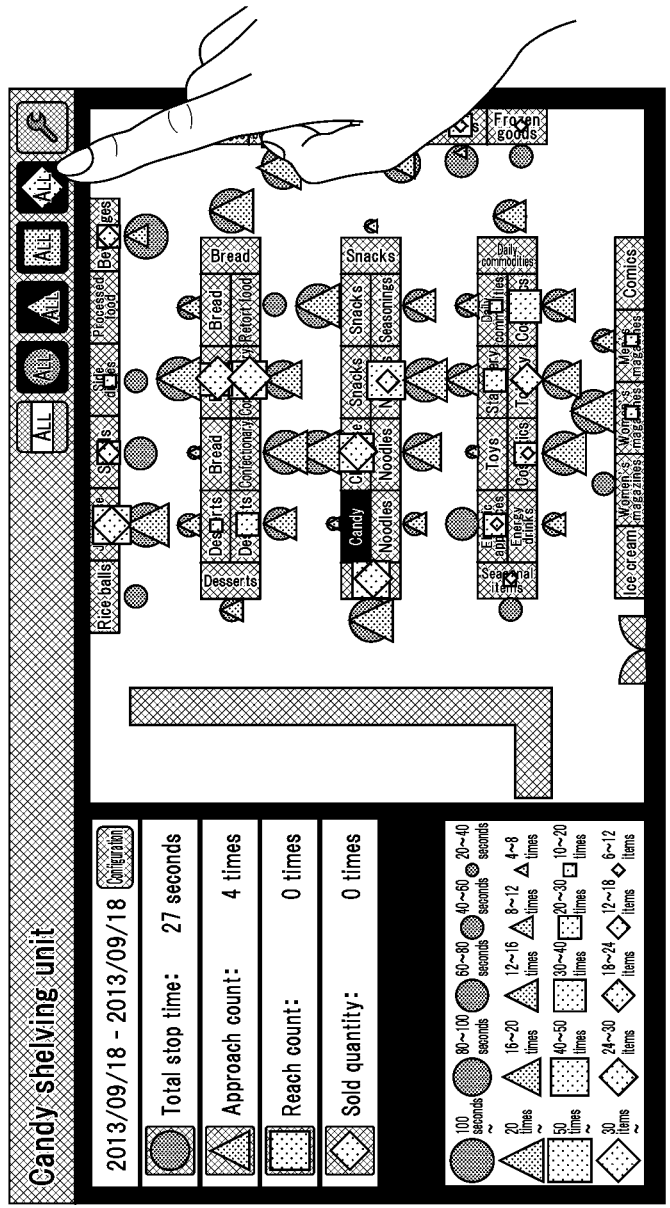
FIG. 32 illustrates one example of the store screen and the MD information screen when pressing select-all buttons for the total stop time, the approach count, the reach count, and the sold quantity, selecting a shelving unit icon of candy, and selecting the approach count for the shelving unit icon.

FIG. 32 illustrates one example of the store screen and the MD information screen when a shelving unit icon corresponding to a shelving unit with candy is selected, and with the total stop time, the approach count, the reach count, and the sold quantity for the selected shelving unit icon being displayed, the display-all buttons for total stop time, approach count, reach count and sold quantity are pressed.

In the application screen image illustrated in FIG. 32, a sold quantity graphic item, a total stop time graphic item, a approach count graphic item, and a reach count graphic item is overlaid with respect to each shelving unit. Meanwhile, in the MD information screen, the total of total stop times of shelving units with candy (27 seconds), the total of the approach counts of shelving units with candy (4 times), the total of the reach counts of shelving units with candy (0 times), and the total of the sold quantities of shelving units with candy (0 times) are displayed.

As illustrated in FIG. 32, when a shelving unit icon is selected by the user with a configuration made of displaying total stop time graphic items, approach count graphic items, reach count graphic items, and sold quantity graphic items for all shelving unit icons, display control as described in (1) and (2) in the following can be performed.

Display control (1) is displaying graphic items for only one shelving unit. That is, as illustrated in FIG. 32, when one shelving unit icon is selected with total stop time graphic items, approach count graphic items, reach count graphic items, and sold quantity graphic items for a plurality of shelving units being displayed, displaying of the total stop time graphic item, the approach count graphic item, the reach count graphic item, and the sold quantity graphic item for the selected shelving unit icon is continued while displaying of total stop time graphic items, approach count graphic items, reach count graphic items, and sold quantity graphic items for shelving units other than the selected shelving unit is cancelled. Display control (1) creates a display effect that is easily perceptible by the user. This is since, before one shelving unit icon is selected, total stop time graphic items, approach count graphic items, reach count graphic items, and sold quantity graphic items are displayed with respect to all shelving unit icons, and after one shelving unit icon is selected, only the total stop time graphic item, the approach count graphic item, the reach count graphic item, and the sold quantity graphic items for the selected shelving unit icon are displayed.

Display control (2) maintains graphic display in a similar state before and after the selection of one shelving unit icon. Specifically, as illustrated in FIG. 32, when one shelving unit icon is selected with total stop time graphic items, approach count graphic items, reach count graphic items, and sold quantity graphic items for all shelving units being displayed, displaying of total stop time graphic items, approach count graphic items, reach count graphic items, and sold quantity graphic items for all shelving units is continued. That is, when one shelving unit icon is selected with total stop time graphic items, approach count graphic items, reach count graphic items, and sold quantity graphic items for all shelving units being displayed, total stop time graphic items, approach count graphic items, reach count graphic items, and sold quantity graphic items for all shelving units continue to be displayed. Display control (2) enables the contents on the screen to be maintained in a similar state before and after the selection of a shelving unit icon, and thus does not confuse the user.

Figure 33:
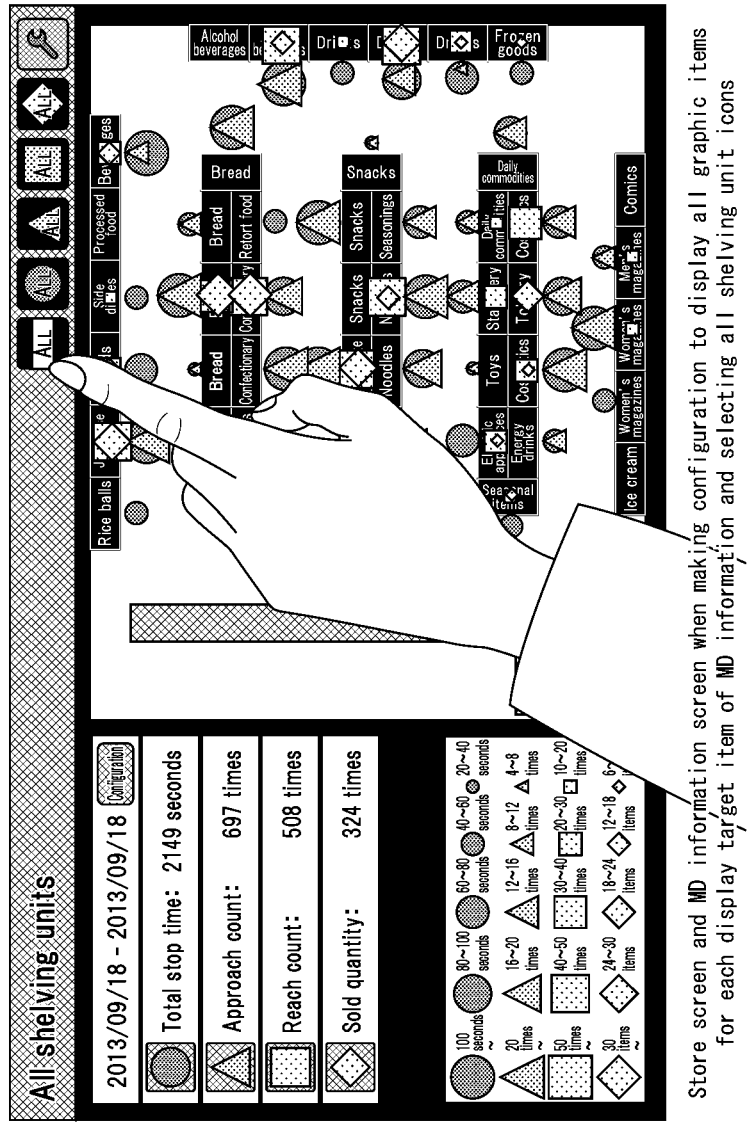
FIG. 33 illustrates one example of the store screen and the MD information screen when pressing a select-all button.

FIG. 33 illustrates one example of the store screen and the MD information screen when the select-all button is pressed. In FIG. 33, all shelving unit icons are displayed with tone inversion, which indicates that all shelving unit icons are in selected state. With display being performed in this state, when the display-all buttons for the total stop time, the approach count, the reach count, and the sold quantity are pressed, a total stop time graphic item, a approach count graphic item, a reach count graphic item, and a sold quantity graphic item are displayed with respect to each of the shelving unit icons, and further, a total of the total stop times (2149 seconds), a total of the approach counts (697 times), a total of the reach counts (508 times), and a total of the sold quantities (324 times) are displayed in the MD information screen.

As such, according to the present embodiment, a selection of performing display for all shelving units can be made for each of sold quantity, approach count, reach count, and total stop time. Further, when one shelving unit is selected, a sold quantity graphic item, a approach count graphic item, a reach count graphic item, and a total stop time graphic item for the selected shelving unit are displayed without switching between screens. Thus, the functions of the MD information screen and the auxiliary store screen, and the functions of the store screen are integrated into one screen. This increases user convenience.

(Embodiment 3)

In embodiment 1, a plurality of threshold values defining display state are calculated for each of the approach count, the reach count, the total stop time, and the sold quantity. That is, a plurality of threshold values are calculated for each of the approach count graphic, the reach count graphic, the total stop time graphic, and the sold quantity graphic. Meanwhile, in the present embodiment, the same multiple threshold values are used to define display states of the approach count, the reach count, and the sold quantity.

Figure 34:
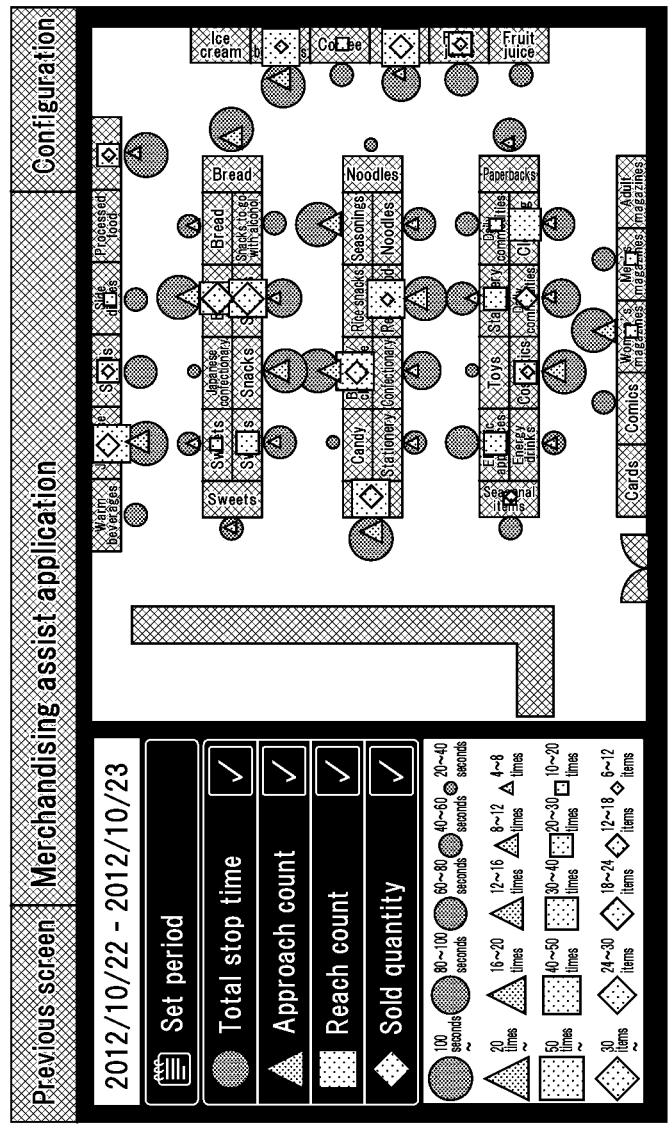
FIG. 34 illustrates one example of the store screen in a case where threshold values of numerical ranges for displaying graphic items in levels are varied, between the approach count, the reach count, and the sold quantity.
Figure 35:
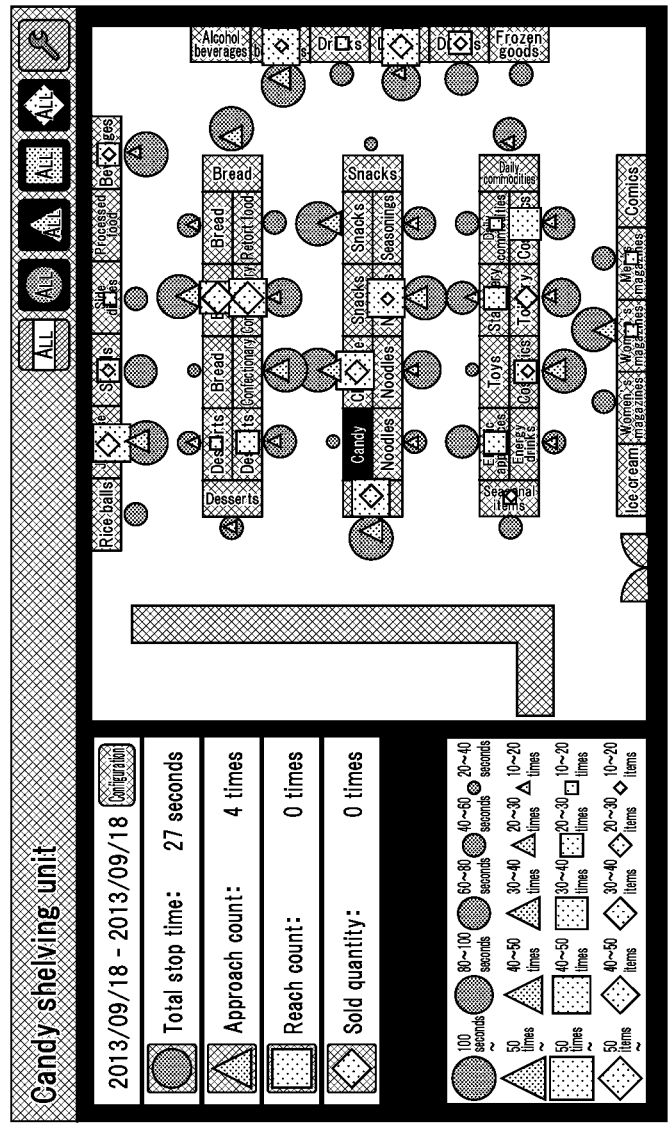
FIG. 35 illustrates one example of the store screen and the MD information screen in a case where threshold values of numerical ranges for displaying graphic items in levels are the same for the approach count, the reach count, and the sold quantity.

FIG. 34 illustrates one example of the store screen and the MD information screen when varying threshold values of the numerical ranges for displaying graphic items in different levels between the approach count, the reach count, and the sold quantity. Meanwhile, FIG. 35 illustrates one example of the store screen and the MD information screen when using, for the approach count, the reach count, and the sold quantity, the same threshold values of the numerical ranges for displaying graphic items in different levels. At the bottom part of the screen illustrated in FIG. 35, the approach count, the reach count, and the sold quantity are each divided into five numerical values, namely 50 or more times, 40 to 50 times, 30 to 40 times, 20 to 30 times, and 10 to 20 times. Thus, the size of the approach count graphic item, the reach count graphic item, and the sold quantity graphic item for a given shelving unit icon differs depending upon which of such ranges the approach count, the reach count, and the sold quantity of the shelving unit icon belongs to, respectively.

In FIG. 35, near a given shelving unit icon, a approach count graphic item, a reach count graphic item, and a sold quantity graphic item that have the same scaling factor applied thereto are displayed. Since the threshold values enabling displaying in different levels are the same for the sold quantity, the approach count, and the reach count, the differences between the sold quantity, the approach count, and the reach count can be visually represented.

The calculation of the level threshold values according to the present embodiment can be realized by modifying the processing procedures in the flowchart in FIG. 26A as follows. In the flowchart in FIG. 26A, the maximum value of MD information is calculated for each display target item through the loop of Step S42. Meanwhile, in the present embodiment, the maximum value of the total stop time, the maximum value of the approach count, the maximum value of the reach count, and the maximum value of the sold quantity are compared, and the greatest among such maximum values is set as a maximum value applied to all of the total stop time, the approach count, the reach count, and the sold quantity (i.e., is set as the maximum value for all display target items). Subsequently, processing proceeds to Steps S44 through S49. In Step S44, a value obtained by omitting the first digit of the maximum value for all display target items is set as a start value of the highest level of all display target items. Subsequently, the variable k is initialized by being set to "1" (Step S45), and a value obtained by dividing the start value of the highest level of all display target items by five is set as a start value of the lowest level of all display target items (Step S46). Then, the variable k is incremented (Step S47), and processing enters the loop composed of Steps S47 through S50. In this loop, a value obtained by multiplying the start value of the lowest level of all display target items by variable k is set as the start value of the kth level of all display target items (Step S48). Then, a determination is made of whether variable k has reached its maximum value (Step S49). When variable k has not reached its maximum value, a value obtained by adding the start value of the lowest level of all display target items to the start value of the kth level of all display target items is set as the end value of the kth level of all display target items (Step S50). The processing in Step S50 is repeated until a determination is made that variable k has reached its maximum value in Step S49. By executing this loop of processing, the threshold value of each level of the display target items is set appropriately, based on a maximum and minimum of statistical values corresponding to display target items. This allows defining the same numerical ranges in FIG. 35.

As such, according to the present embodiment, for the approach count, the reach count, and the sold quantity, the same threshold values of the numerical ranges for displaying graphic items in different levels are used. Thus, based on sizes of the corresponding graphic items, the user is able to make an assumption of the ratio of the number of time store visitors reach for a given shelving unit to the number of times store visitors approach and stop in front of the given shelving unit, and the ratio of the number of times store visitors purchase merchandise on a given shelving unit to the number of times store visitors approach and stop in front of the given shelving unit. Further, by observing the ratio of a rhombus figure to a square figure, the user is able to make an assumption of the ratio of sold quantity to reach count. Accordingly, the user is acknowledged of shelving units with merchandise attracting much reaching but not being purchased.

(Embodiment 4)

In embodiment 1, the display MD information calculation unit 9 exists in the MD information management device 30, and the display control unit 8 exists in the information terminal device 20. However, the present invention is not limited to this example, and each of the display MD information calculation unit 9 and the display control unit 8 may be included in either one of the information terminal device 20 and the MD information management device 30. The present embodiments relates to variations differing in terms of where the display control unit 8 and the display MD information calculation unit 9 exist. The variations of the information terminal device 20 and the MD information management device 30 illustrated in FIGS. 36 and 37 can be made by changing where the display control unit 8 and the display MD information calculation unit 9 exist.

Figure 36:
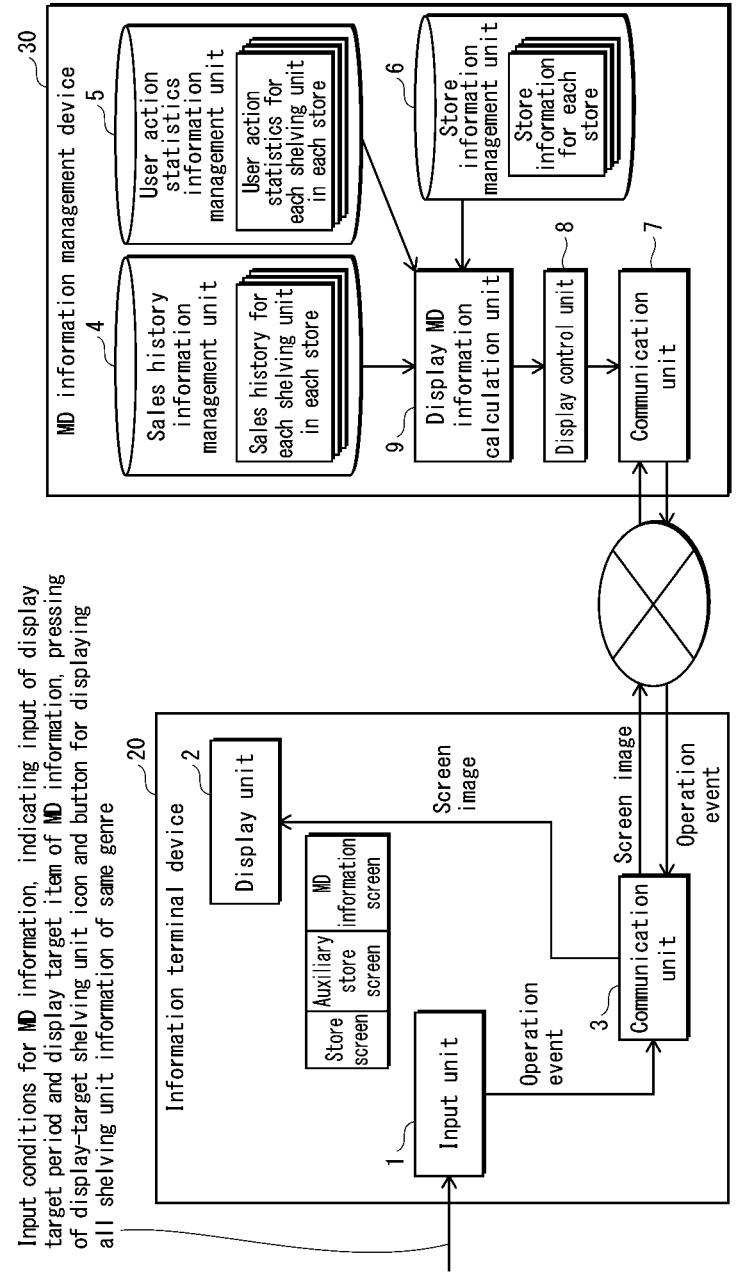
FIG. 36 illustrates a variation of block structure where a display control unit 8 and a display MD information calculation unit 9 are included in the MD information management device 30, and are not included in the information terminal device 20.

FIG. 36 illustrates a variation of functional block structure where the display control unit 8 and the display MD information calculation unit 9 are included in the MD information management device 30, and the information terminal device 20 does not include the display control unit 8 or the display MD information calculation unit 9.

Figure 37:
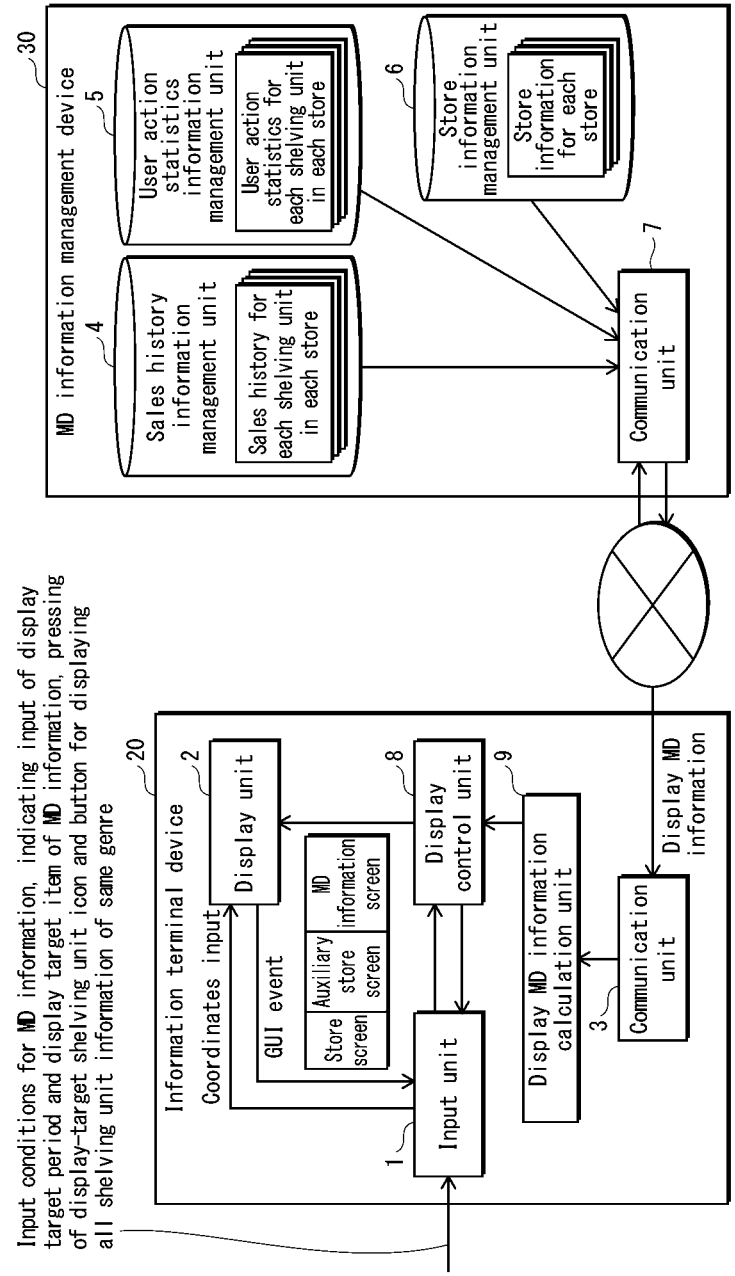
FIG. 37 illustrates a variation of block structure where the display control unit 8 and the display MD information calculation unit 9 are included in the information terminal device 20, and are not included in the MD information management device 30.

FIG. 37 illustrates a variation of functional block structure where the display control unit 8 and the display MD information calculation unit 9 are included in the information terminal device 20, and the MD information management device 30 does not include the display control unit 8 or the display MD information calculation unit 9.

As such, the present invention achieves an improvement in processing performance by, when there is a difference in hardware performance of the information terminal device 20 and the MD information management device 30, providing the combination of the display MD information calculation unit 9 and the display control unit 8 to the one of the information terminal device 20 and the MD information management device 30 that has higher hardware performance Enabling the combination of the display MD information calculation unit 9 and the display control unit 8 to be included in either the MD information management device or the information terminal device achieves service that is not dependent upon network transfer rate.

(Embodiment 5)

In embodiment 1, the sales history information is accumulated in the sales history information management unit 4 and is acquired from the sales history information management unit 4 when creating display. However, notwithstanding stores newly open, merchandise sales of an existing store is managed by a POS terminal network, and the latest merchandise sales of the store can be acquired from the POS terminal network. As such, acquiring the latest sales amount from a POS terminal network and not the sales history information management unit 4 enables displaying action statistics that are closer to the latest situation.

The following describes a structure for acquiring sales history from a POS terminal network. Specifically, the following describes the internal structure of the information terminal device 20 and the MD information management device 30 when acquiring the sales history from a POS terminal network.

A POS (point of sales) terminal network includes one or more POS terminals, each of which being a register device having a code-scanner. When merchandise is sold, a POS terminal transmits, to the headquarters of the franchise chain, information indicating registration of monetary movement accompanying the sales, the type of merchandise sold, and the quantity of the merchandise sold.

Figure 38:
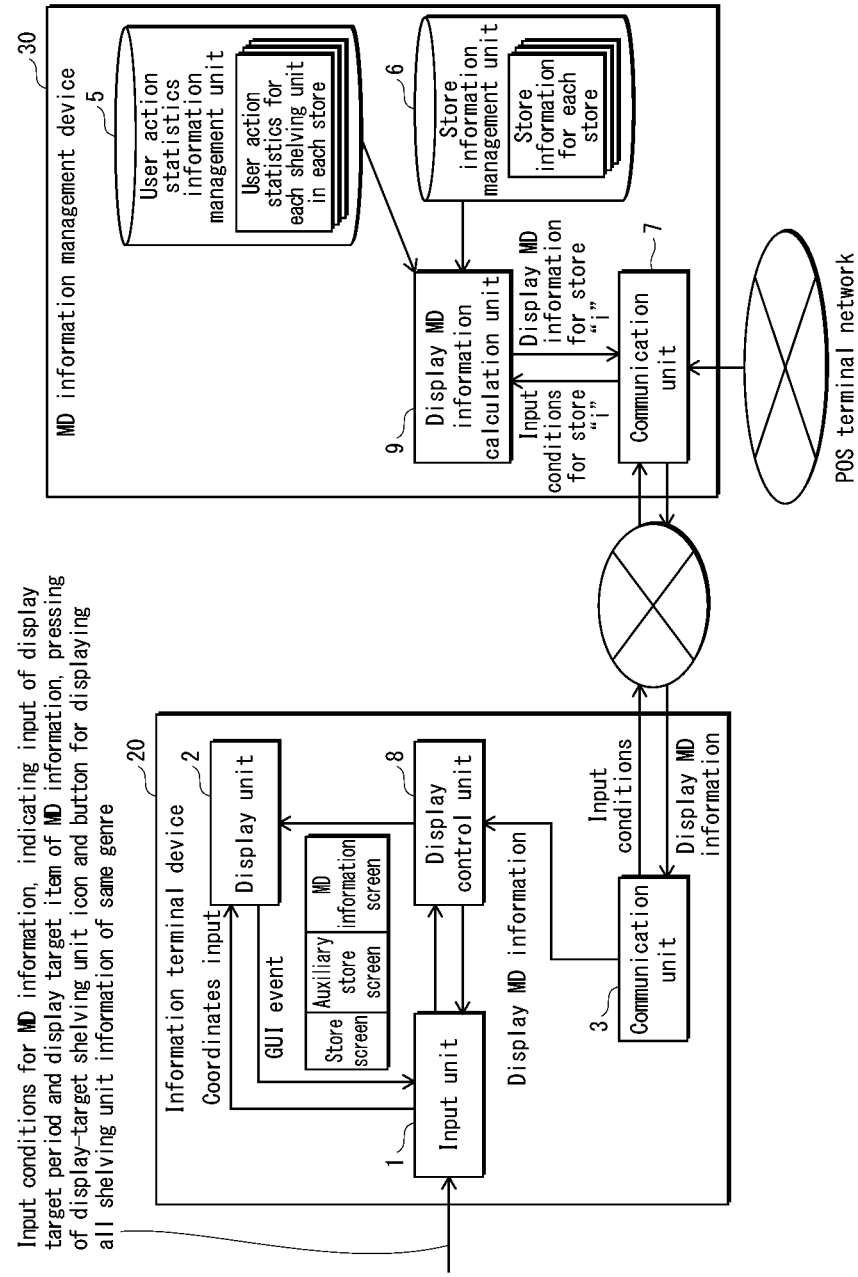
FIG. 38 illustrates the internal structure of the MD information management device 30 when not including a sales history information management unit 4 but including the display MD information calculation unit 9.

FIG. 38 illustrates the internal structure of the MD information management device 30. Here, the MD information management device 30 does not include the sales history information management unit 4 but includes the display MD information calculation unit 9. In this internal structure, the display MD information calculation unit 9 included in the MD information management device 30 acquires the quantity of merchandise sold from the POS terminal network, and converts the information into sold quantity for each shelving unit. Further, the display MD information calculation unit 9 of the MD information management device 30 creates display MD information by using sales history acquired through this conversion and action statistics, for each shelving unit.

Figure 39:
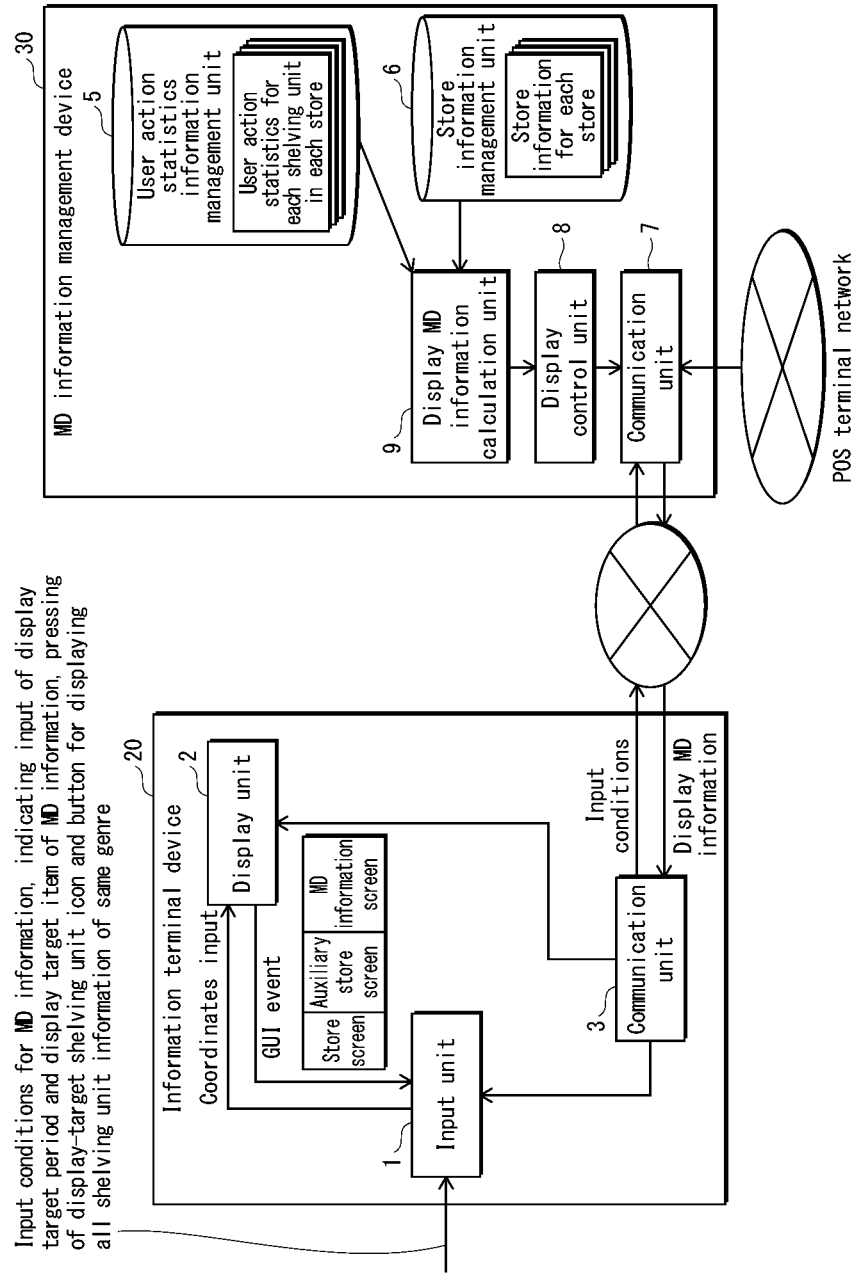
FIG. 39 illustrates the internal structure of the MD information management device 30 when not including the sales history information management unit 4 but including the display control unit 8 and the display MD information calculation unit 9.

FIG. 39 illustrates the internal structure of the MD information management device 30. Here, the MD information management device 30 does not include the sales history information management unit 4 but includes the display control unit 8 and the display MD information calculation unit 9. In this internal structure, the display MD information calculation unit 9 included in the MD information management device 30 acquires the quantity of merchandise sold from the POS terminal network, and converts the information into sold quantity for each shelving unit. Further, the display MD information calculation unit 9 of the MD information management device 30 creates display MD information by using sales history acquired through this conversion and action statistics, for each shelving unit.

Figure 40:
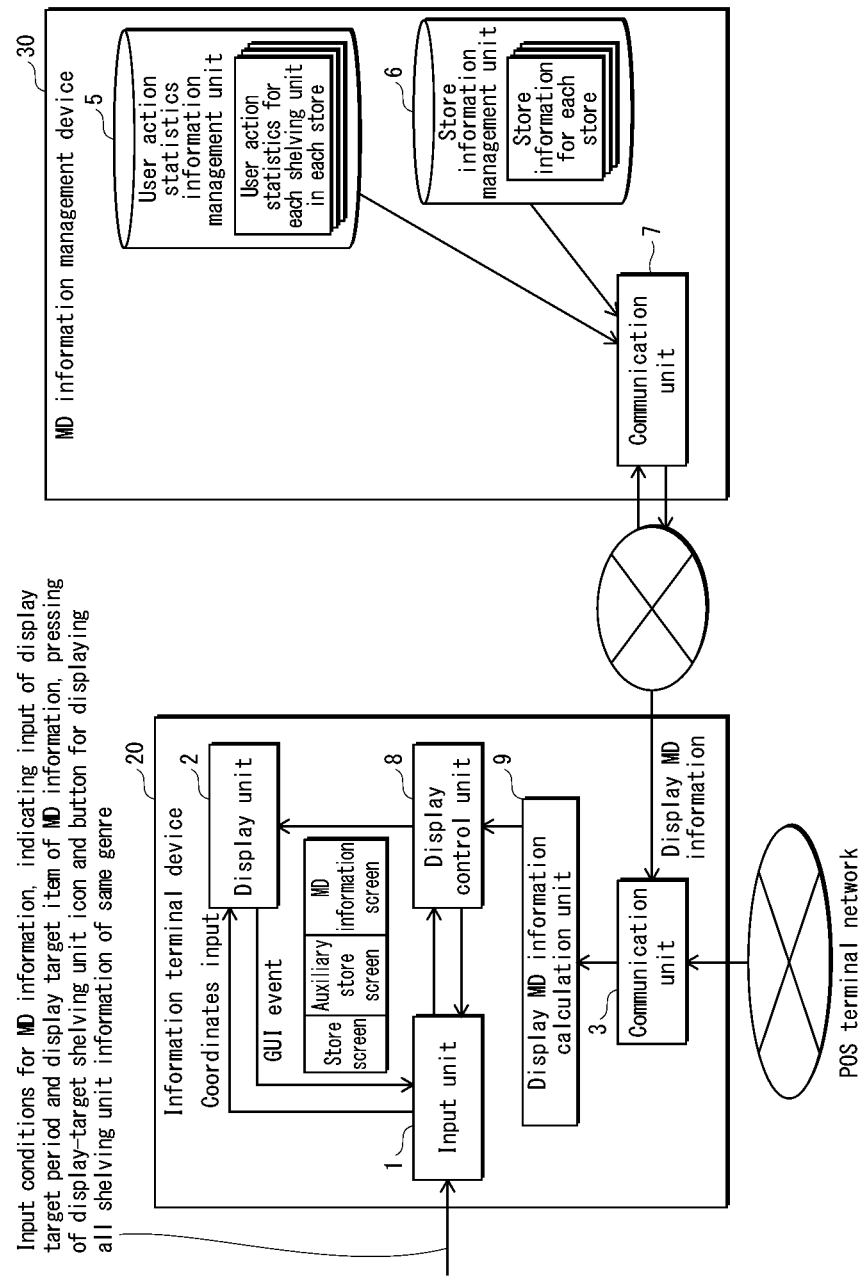
FIG. 40 illustrates the internal structure of the MD information management device 30 when not including the sales history information management unit 4, the display control unit 8, or the display MD information calculation unit 9.

FIG. 40 illustrates the internal structure of the MD information management device 30. Here, the MD information management device 30 does not include the sales history information management unit 4, the display control unit 8, or the display MD information calculation unit 9. In this internal structure, the display MD information calculation unit 9 is included in the information terminal device 20 and acquires the quantity of merchandise purchased from the POS terminal network, and converts the information into sold quantity for each shelving unit. Further, the display MD information calculation unit 9 of the information terminal device 20 creates display by using sales history acquired through this conversion and action statistics, for each shelving unit.

As such, the present embodiment ensures that the sold quantity graphic items that are displayed are in accordance with the actual sold quantities. This is achieved by the display MD information calculation unit 9, in calculating display, acquiring sold quantities by acquiring information on merchandise sold from a POS terminal network and converting this information into a sold quantity for each shelving unit. Accordingly, the present embodiment improves system efficiency by avoiding a wasteful situation where the same information is managed by both a POS terminal network and the system.

(Embodiment 6)

In embodiment 1, among various types of information (action statistics, sales history, and store information), store information is managed by only the management device. However, there are cases where it is preferable that store information be managed by the information terminals in stores, and not by the management device. The present invention relates to the management of store information by information terminal devices in stores.

Figure 41:
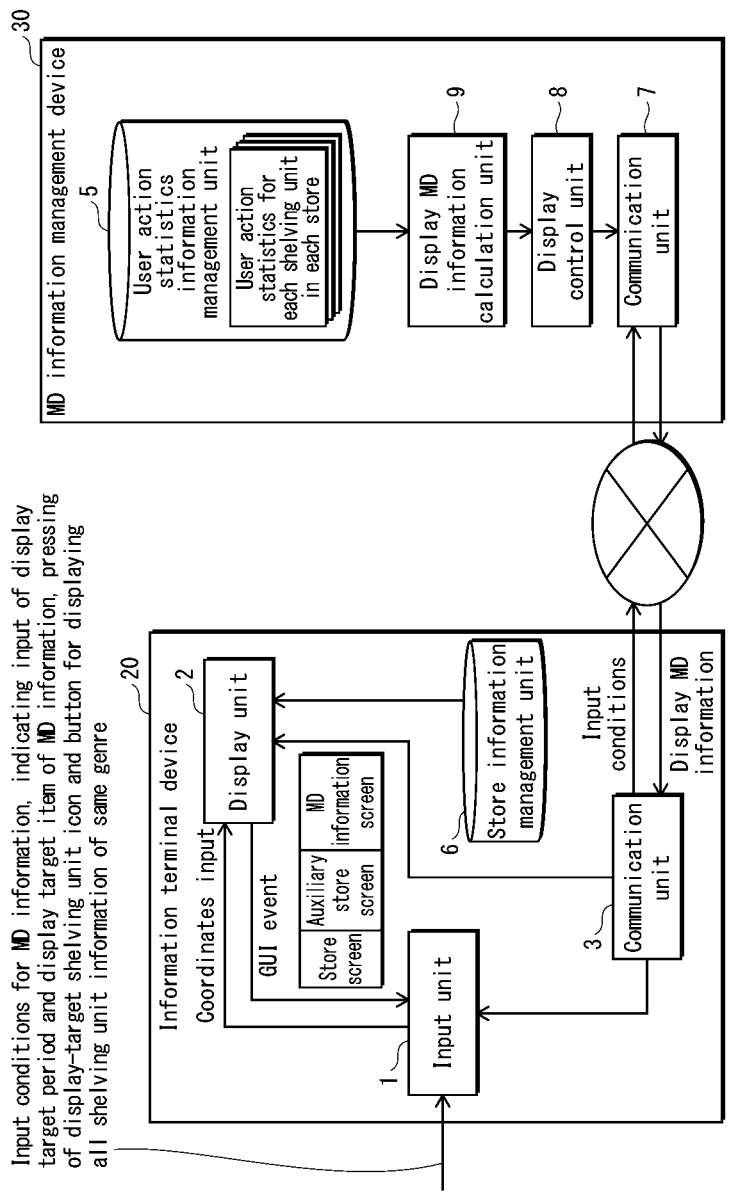
FIG. 41 illustrates the internal structures of the information terminal device 20 and the MD information management device 30 when the information terminal device 20 includes a store information management unit 6 and the MD information management device 30 includes the display control unit 8 and the display MD information calculation unit 9.
Figure 42:
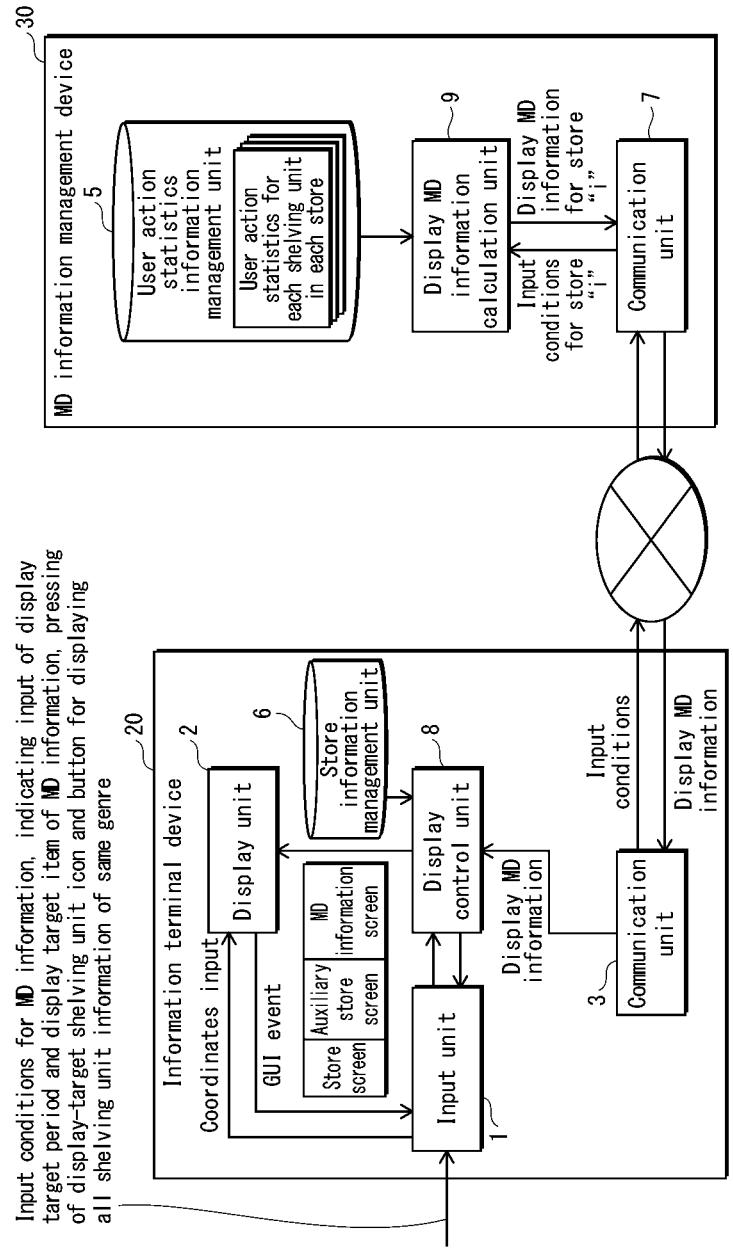
FIG. 42 illustrates the internal structures of the information terminal device 20 and the MD information management device 30 when the information terminal device 20 includes the store information management unit 6 and the display control unit 8 and the MD information management device 30 includes the display MD information calculation unit 9.
Figure 43:
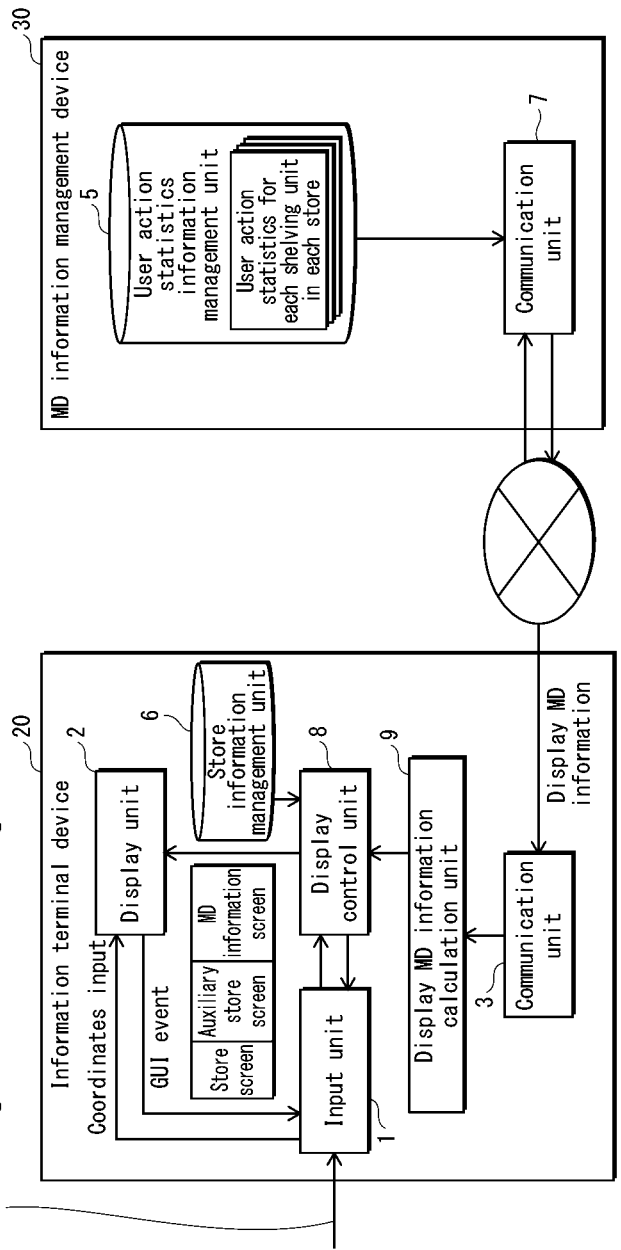
FIG. 43 illustrates the internal structures of the information terminal device 20 and the MD information management device 30 when the information terminal device 20 includes the store information management unit 6, the display control unit 8, and the MD information calculation unit 9.

FIG. 41 illustrates the internal structures of the information terminal device 20 and the MD information management device 30. Here, the information terminal device 20 includes the store information management unit 6, and the MD information management device 30 includes the display MD information calculation unit 9. FIG. 42 illustrates the internal structures of the information terminal device 20 and the MD information management device 30. Here, the information terminal device 20 includes the store information management unit 6 and the display control unit 8, and the MD information management device 30 includes the display MD information calculation unit 9. FIG. 43 illustrates the internal structures of the information terminal device 20 and the MD information management device 30. Here, the information terminal device 20 includes the store information management unit 6, the display control unit 8, and the display MD information calculation unit 9. As can be seen from such internal structures, in the present embodiment, the store information management unit 6 is included in the information terminal device 20.

As such, the present embodiment enables performing a local analysis of how a change in shelving unit layout in one store affects the behavior of store visitors in the store.

(Embodiment 7)

In FIG. 25, which is referred to in embodiment 1, each of the input of display target period, the input of display target items, and the pressing of shelving unit icons is received in a separate input loop. However, the input of display target period, the input of display target items, and the pressing of shelving unit icons can be received in a single input loop.

The present embodiment achieves receiving the input of display target period, the input of display target items, and the pressing of shelving unit icons in a single input loop.

Figure 44:
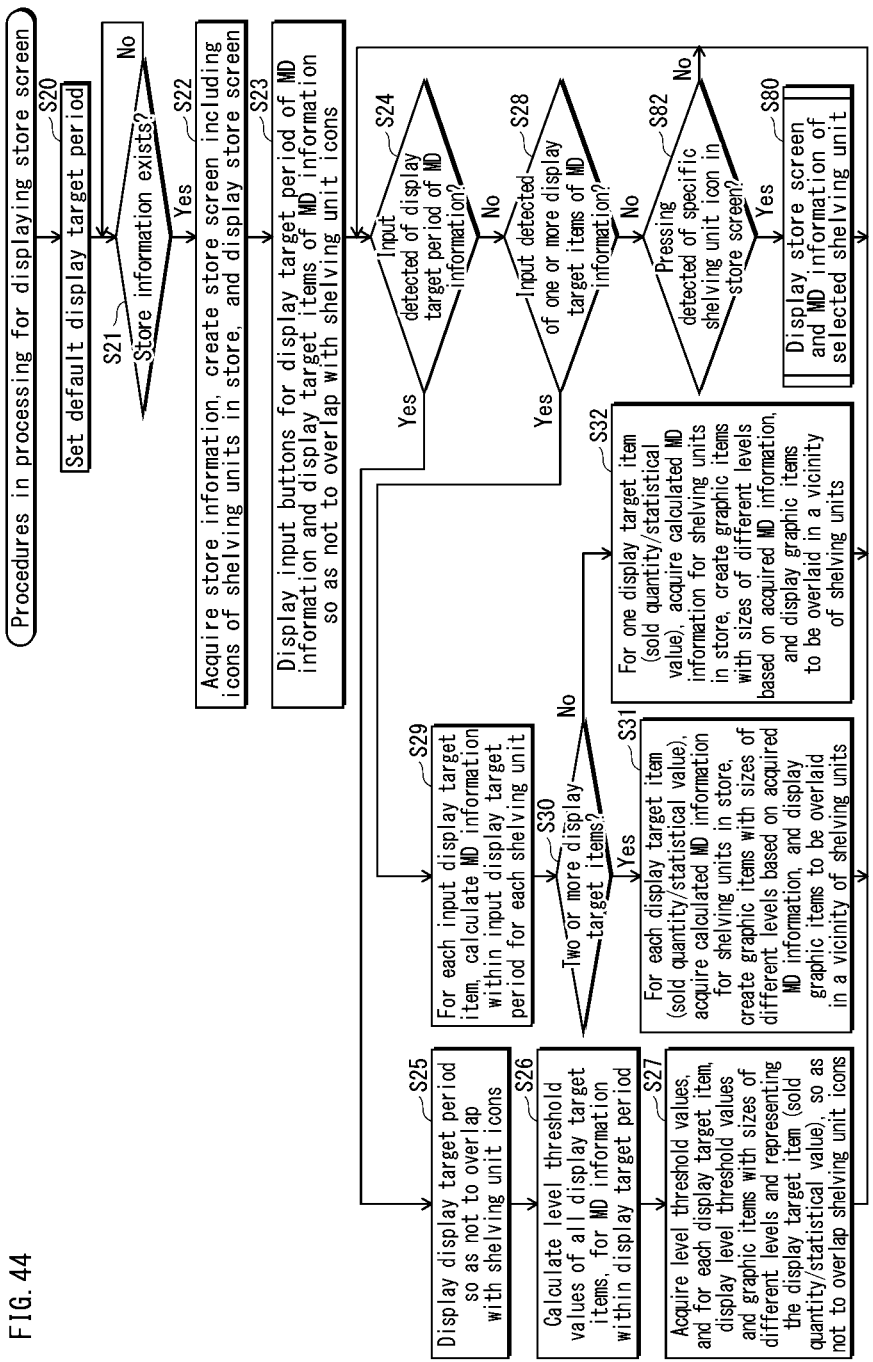
FIG. 44 illustrates a main routine of the processing procedures in the store screen display.

FIG. 44 illustrates a main routine of processing procedures in the display of a store screen. The flowchart in FIG. 44 is based on the flowchart of the main routine in FIG. 25 and the flowchart in FIG. 28. As such, steps included in FIG. 25 are provided with the same reference symbols and description thereof is omitted in the following. In the flowchart in FIG. 44, Step S20 is executed before determining whether or not store information corresponding to the store from which a request is made exists. In Step S20, a default display target period is set. The default display target period, for example, may be one year (e.g., 2013/01/01-2013/12/31), which is a relatively long period. Due to the default display target period being set as described above, a chronological range for which MD information is acquired is temporarily set. Subsequently, Steps S22 and S23 are executed after processing proceeds to Step S21. Then, processing proceeds to the loop of processing in Steps S24, S28, and S82.

This loop monitors whether one of the following events take place; input of a display target period of MD information (Step S24), setting of one or more display target items of MD information (Step S28), and pressing of a specific shelving unit icon in the store screen (Step S82).

When a display target item of MD information is input, an affirmative decision is made in Step S28 and processing proceeds to Steps S29 through S31. Accordingly, graphic items having different sizes are created for the each display target item of the MD information (sold quantity/statistical value), and are displayed in the vicinity of the shelving unit icons in the store screen. When a specific shelving unit icon in the store screen is pressed, an affirmative decision is made in Step S82 and processing proceeds to Step S80. In Step S80, the store screen and MD information for the selected shelving unit are displayed. Since the default display target period is set in Step 20, processing corresponding to input of a display target item of MD information or processing corresponding to pressing of a specific shelving unit icon in the store screen can be executed, even when the user does not set a display target period.

Meanwhile, when the user sets a display target period, an affirmative decision is made in Step S24 and processing in Steps S25 through S27 is executed. Accordingly, the temporarily-set display target period is replaced with a more specific display target period.

Figure 45A:
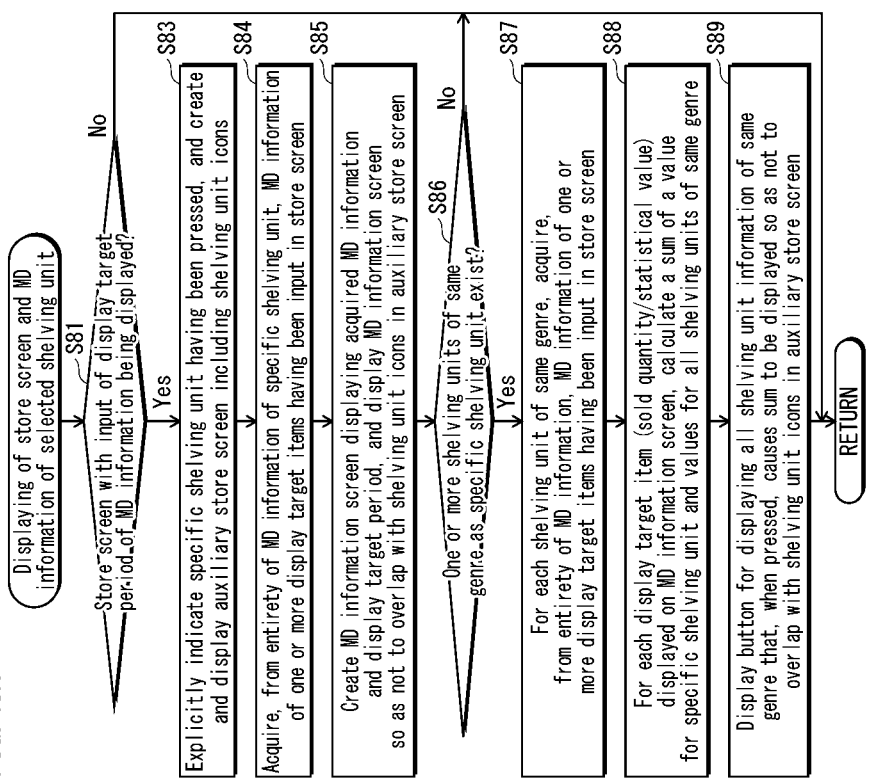
FIG. 45A is a flowchart illustrating processing procedures for displaying the store screen and the MD information screen.

FIG. 45A is a flowchart illustrating the processing procedures in the displaying of a store screen and an MD information screen. The flowchart in FIG. 45A is based on the flowchart in FIG. 28. As such, steps included in FIG. 28 are provided with the same reference symbols and description thereof is omitted in the following.

In Step S81, a determination is made of whether or not a store screen with respect to which an input of a display target period of MD information has been made is displayed. When such a store screen is displayed, processing in Steps S83 through S85 is executed. Accordingly, the MD information screen is created and displayed so as not to overlap with the shelving unit icons in the auxiliary store screen. In Step S86, a determination is made of whether a shelving unit with merchandise of the same genre as the merchandise on the specific shelving unit exists. When such a shelving unit exists, processing in Steps S87 through S89 is executed. Accordingly, an icon for displaying all shelving unit information of the same genre is displayed so as not to overlap with the shelving unit icons in the auxiliary store screen.

Figure 45B:
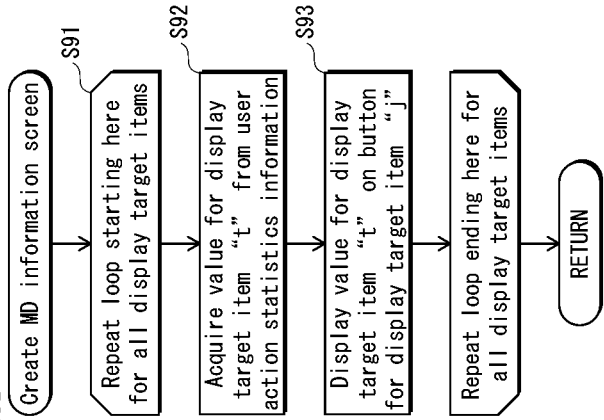
FIG. 45B is a flowchart illustrating the processing procedures in creating the MD information screen.

FIG. 45B is a flowchart illustrating the processing procedures in the creating of an MD information screen. Step S91 defines a loop of processing so that the processing in Steps S92 and S93 is performed for each display target item. In Step S92, a value for display target item t is read from the user action statistics information. In Step S93, the value (sold quantity or statistical value) for the display target item t is displayed on display target item j.

As such, the present invention further reduces the number of steps in operation, by enabling selection of a shelving unit icon to be made without setting a display target period.

(Embodiment 8)

The present embodiment describes an embodiment where an application corresponding to the display MD information calculation unit 9 and an application corresponding to the display control unit 8 are run on a cloud network, and service is provided via the cloud network.

FIG. 46A illustrates a computer system (information provision system) for realizing provision of MD information. The computer system realizes MD service for a household appliance. The information provision system is configured from a plurality of groups of devices 1000 (each including a home gateway 100 and a plurality of household appliances 101, 102, and so on), a data administration center 3000 (which includes a cloud server 301 and a group of big data storages 302), a service provision center 2000 (which includes a server 200), and the information terminal device 20.

Each group of devices 1000 is an in-store network and is a collection of devices installed at a store. Each group of devices 1000 includes the home gateway 100 and the devices 101, 102, and so on.

The service provision center 2000 serves as a point of contact for those receiving the service of the service provision center. The service provision center 2000 receives an access request specifying an URL, and manages data directly connected with store-related duties conducted by a user. One example of such data management is user registration. The user registration is, for example, receiving user registration from a user upon opening of a new store, and managing the user having performed the user registration as a member of the MD service. The user registration includes registration of store information that is the target of merchandising, and member registration necessary for the user to become a member of the merchandising service. The service provision center 2000 manages the store information so registered and the user registration information input through the member registration. The computer configured as the service provision center 2000 includes the server 200. The server 200 is indicated by a dashed line because, in some cases, the service provision center 2000 may not have the server 200. For example, the server 200 is unnecessary when the cloud server 301 manages all data.

The data administration center 3000 is an entity that executes operations on behalf of the service provision center 2000. The data administration center 3000 is not limited to a company performing only data management, administration of the cloud server 301, and the like. For example, a device manufacturer developing and manufacturing the devices 101, 102, and so on may have a computer serving as the data administration center 3000 when the device manufacturer also performs data management and administration of the cloud server 301 (see FIG. 46B). Further, the data administration center 3000 need not be a single company. For example, when a device manufacturer and another management company perform data management and administration of the cloud server 301 together, then a computer belonging to either one of the device manufacturer and the management company or computers belonging to both the device manufacturer and the management company may serve as the data administration center 3000 (see FIG. 46C). The other management company may be a security company or an electric power company.

The cloud server 301 is within the data administration center 3000, being a virtual server similarly accessing both the company intranet installed by the data center operator and the outside Internet, and manages big data through connection with various devices via the Internet.

The group of big data storages 302 is composed of a plurality of storages that each store part of the big data. In the present embodiment, the big data are action statistics information indicating actions of users at shelving units in stores, and sales history information.

The following describes the flow of information in the above-described service. First, the devices 101, 102, and so on of the device group 100 generate an action log each time a user action is detected, and accumulates the action logs in the big data storage group 302 of the data administration center 3000 via the cloud server 301 (refer to arrow al). Here, an action log is a log indicating user action near a shelving unit in a store. The action logs may also be provided directly to the cloud server 301 by the devices (101, 102, and so on) themselves via the Internet. Also, the action logs may be accumulated in the home gateway 100 and provided to the cloud server 301 by the home gateway 100.

Next, the cloud server 301 of the data administration center 3000 provides the accumulated action logs to the service provision center 2000 in fixed units of data. The units in which action logs are provided may be a unit of data in which the data center operator is able to organize accumulated information and provide information to the service provision center 2000, or may be a unit of data based on a request made by the service provision center 2000. In the above, description has been provided that action logs are provided in fixed units. However, action logs need not be provided in fixed units, and the amount of information provided may fluctuate depending upon circumstances.

The action logs are also stored to the server 200, which is owned by the service provision center 2000, via a storage of the cloud server 301, as necessary (refer to arrow b1). The service provision center 2000 then organizes the action logs into information suitable for the service provided to the user, and provides the result to the user. The user who receives this organized information may be both user AAA using the device 101 or may be an external user ZZZ. The service may also be provided to the user via routes of provision indicated by arrows f1 and e1.

Also, the service may be provided to the user via routes of provision indicated by arrows c1 and d1. That is, the service may be provided to the user by re-passing through the cloud server 301 of the data administration center 3000. The cloud server 301 of the data administration center 3000 has the function of organizing the action logs to be suitable for the service provided to the user. The service provision center 2000 may be provided with information obtained through such organizing.

Figure 47:
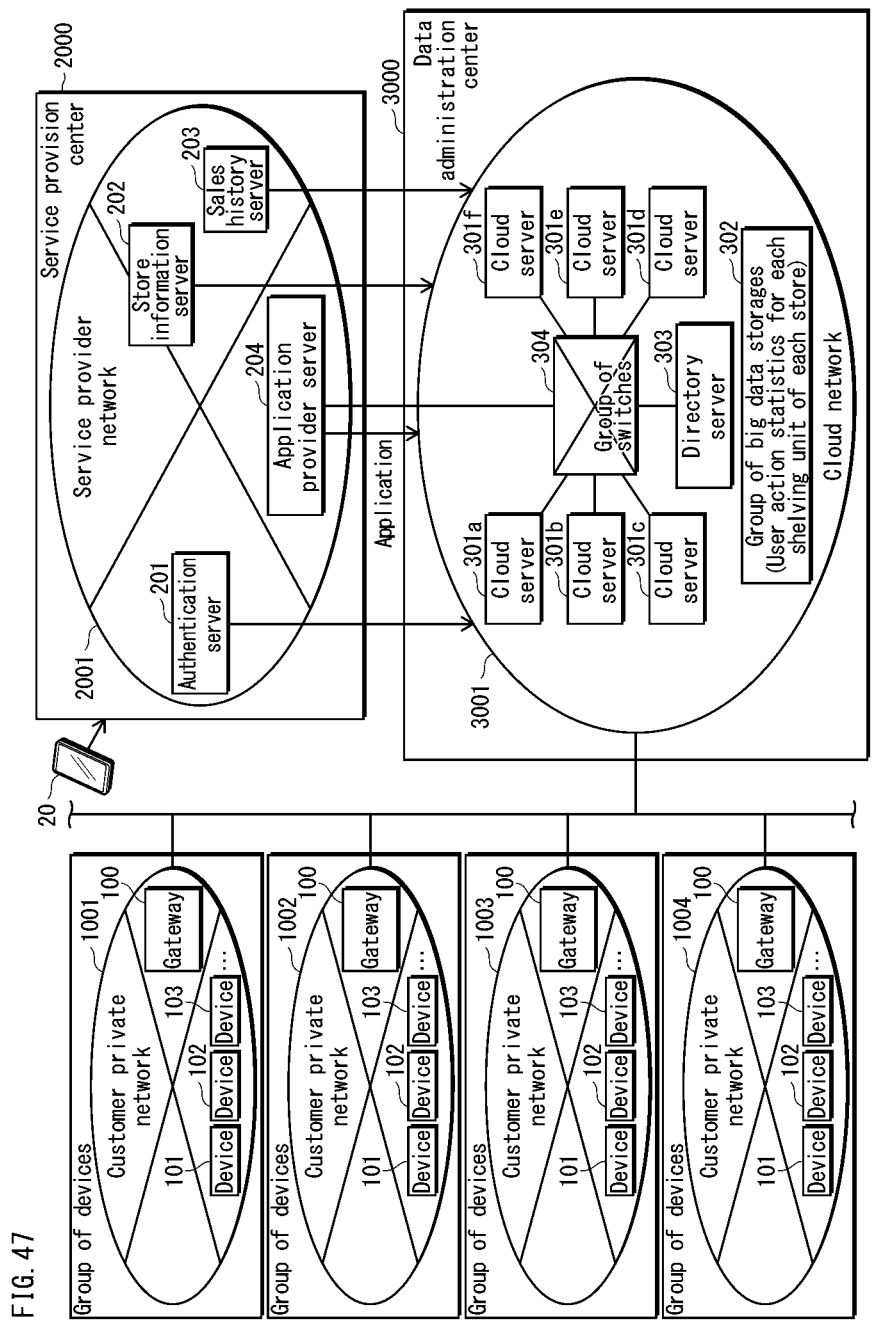
FIG. 47 illustrates the network configuration of the information provision system.

FIG. 47 illustrates the network configuration of the information provision system. FIG. 47 illustrates, as groups of devices, customer private networks 1001, 1002, 1003, and 1004. Further, in FIG. 47, a cloud network 3001 is illustrated as a specific form of the data administration center 3000 illustrated in FIG. 46, and a service provider network 2001 is illustrated as a specific form of the service provision center 2000 illustrated in FIG. 46.

Constituent elements included in each of the customer private networks 1001, 1002, . . . , 1004, each of which is one group of devices 1000, are provided with three digit reference signs starting from 1. Such reference signs are provided based on the reference signs included in the device groups 1000, and for distinction from constituent elements of other networks.

Similarly, constituent elements included in each of the data provision center 2000 and the service provider network 2001 are provided with three digit reference signs starting from 2. Such reference signs are provided based on the reference signs included in the data provision center 2000, and for distinction from constituent elements of other networks. Further, constituent elements included in each of the data administration center 3000 and the cloud network 3001 are provided with three digit reference signs starting from 3. Such reference signs are provided based on the reference signs included in the data administration center 3000, and for distinction from constituent elements of other networks.

Each of the customer private networks 1001 through 1004 is a private network constituted of a group of devices located in a store of a customer of the information provision service. Among the customer private networks 1001 through 1004, the customer private network 1001 is composed of the home gateway 100 and the devices 101, 102, and so on.

The service provider network 2001 is an intranet in the service provision center 2000. The service provider network 2001 includes an authentication server 201 that performs authentication of a user from which a log-in operation is received, a store information server 202 that manages store information existing for each of a plurality of stores, a sales history server 203 that acquires 203 sales histories from the POS systems of the stores and manages the sales histories, and an application provider server 204 that provides applications that are necessary for the provision of service.

The cloud network 3001 is a network running on integrated Elastic Cloud Computing (iEC2) architecture or similar, and is a virtual local area network (hereinafter, VLAN) treated as integral to the service provider network in the service provision center 2000. The cloud network 3001 is composed of cloud servers 301a, 301b, 301c, 301d, 301e, 301f, the group of big data storages 302, a directory server 303, and a group of switches 304. The directory server 303 manages the locations of instances on the cloud network and switches connecting to the cloud servers, in association with a paired IP address and MAC address for each of a processing-requesting node and a processing-destination node. The group of switched 304 is for connection among the cloud servers. This concludes the description of network structure. The following describes the internal structure of the cloud servers, which serve as the core of the cloud network.

FIG. 48A illustrates the internal structure of a cloud server. The cloud server includes, as hardware, a microprocessor unit (hereinafter, MPU) 310, a random access memory (hereinafter, RAM) 311, a read-only memory (hereinafter, ROM) 312, a graphics processor unit (hereinafter, GPU) 313, an I/O circuit 314, a storage drive 315, and communications hardware 316.

The cloud server includes, in the program structure, a hypervisor 317, OS instances 318a, 318b, . . . , 318z (illustrated in FIG. 48 as OS instance for user AAA, OS instance for user BBB, . . . , OS instance for user ZZZ), and applications 319a, 319b, . . . , 319z (illustrated in FIG. 48 as application for user AAA, application for user BBB, . . . , application for user ZZZ). The hypervisor 317 monitors an operating system (OS), generates OS instances in accordance with requests from terminals, and manages the states of the OS instances. The OS instances 318a, 318b, ..., 318z each correspond to one user and are each generated for one logged-in user. The applications 319a, 319b, ..., 319z are each launched by a corresponding one of the OS instances 318a, 318b, ..., 318z, and the states of the applications 319a, 319b, ..., 319z are managed by the OS instances 318a, 318b, ..., 318z, respectively.

An OS instance for a user is an instance of a library program that is in charge of middleware processing. Instances of the library program include: an instance of a graphics rendering engine rendering GUIs such as menus and windows in response to API calls from applications; an instance of an event module that monitors operations made with respect to the GUIs, and when an operation is made, outputs an event indicating the operation; an instance of a network file system for acquiring various files from a network drive, a local drive, and the like; an instance of a kernel performing application state management; and an instance of a protocol stack executing various protocols for server connection. As such, in the cloud network, the functions of the library program, which is in charge of middleware processing, are provided by the cloud server 301 and not by the information terminal device 20.

FIG. 48B illustrates the internal structure of one application 319. As illustrated in FIG. 48B, each of the applications 319 includes a display MD information calculation application that calculates the display MD information, and a display control application that creates the store screen, the auxiliary store screen, and the MD information screen based on the display MD information.

FIG. 48C illustrates the hardware structure of the information terminal device 20. The information terminal device 20 includes, as hardware, an MPU 111, a RAM 112, a ROM 113, a GPU 114, communications hardware 115, a display panel 116, a touch sensor circuit 117, an acceleration sensor circuit 118, a magnetic sensor circuit 119, an I/O circuit 120, and a storage drive 121. The hardware structure of the information terminal device 20 differs from the hardware structure of the cloud server for including the display panel 116, the touch sensor circuit 117, the acceleration sensor circuit 118, and the magnetic sensor circuit 119, which form an environment in which a user is able to perform operations. The touch sensor circuit 117 optically or electrically detects touch operations performed by the user. Surface static capacitive detection is an example of such a detection. A surface static capacitive touch sensor has a configuration in which a transparent electrode film (i.e., a conductive layer) is applied over a glass substrate and has a protective cover layered on the surface thereof. Voltage is applied to electrodes at the four corners of the glass substrate to produce a uniform, low-voltage electric field across the entirety of the panel. When a finger touches the surface of the panel, the change in static capacitance is measured at the four corners to specify the coordinates of the finger. Thus, coordinates of a touch operation are detected.

Further, the program structure of the information terminal device 20 differs from the program structure of the cloud server for including only a browser program 131 and not including a hierarchical layer corresponding to the operating system. The browser program 131 realizes the processing of the input unit 1 and the display unit 2 of the information terminal device 20. The program structure of the information terminal device 20 includes only the browser program 131 since a presumption is made that all applications performing processing related to merchandising are loaded on the cloud server. Further, various processing utilizing an application is realized by an OS instance for the corresponding user by the cloud server, and thus, it suffices that the information terminal device 20 only browse the processing results of the OS instance for the user. Accordingly, the browser program 131 of the information terminal device 20 performs control of transmitting events requesting screen creation and events requesting screen update to an application on the cloud server, receiving screens in accordance with the requests from the application on the cloud server, and displaying the screens.

A cloud server connecting to the store information server and the sales history server of the service provider network and having loaded the MD information calculation application and the display control application constitutes the MD information management device 30. FIGS. 49A through 49D illustrate variations differing in terms of where an application and an OS instance for a user are loaded, i.e., whether on the service provision center 2000 or the data administration center 3000. That is, FIGS. 49A through 49D illustrate four types of cloud services.

FIGS. 49A through 49D have the following three points in common. First, an application 319 and a user OS instance 318 are running on a cloud server of the data administration center 3000. Second, action logs are transmitted from a device group 100 to a cloud server 301 of the date center, as indicated by arrow 321. Third, the cloud server 301 of the data center provides information to the information terminal device 20, as indicated by arrow 322.

(Service Type 1: Local Data Center)

Figure 49A:
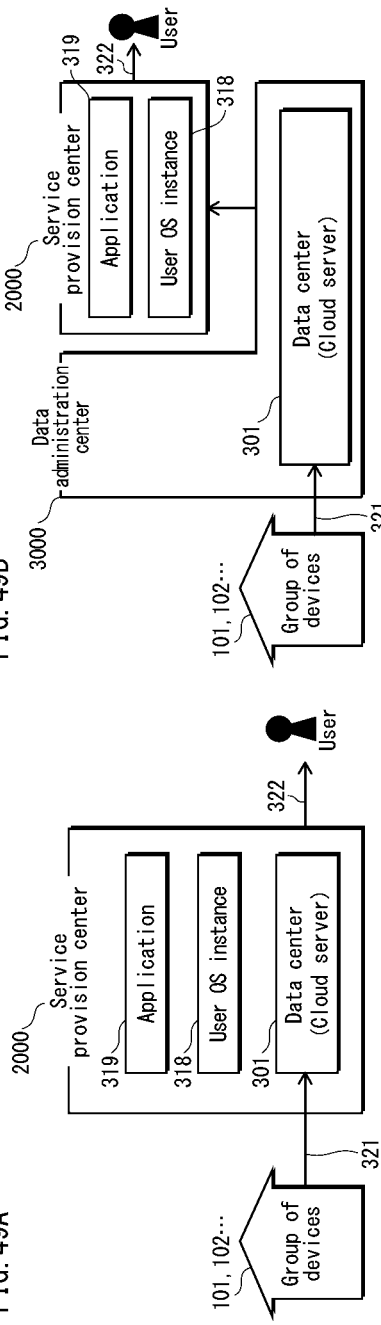
FIG. 49A illustrates service type 1 (local data center-type service).

FIG. 49A illustrates service type 1 (local data center-type service). Here, the service provision center 2000 acquires information from the device group 100 and supplies a service to the user. In this type of service, the service provision center 2000 has the functions of the data center operator. That is, the service provider includes the cloud server 301 performing big data management. As such, there is no data center operator.

In this type of service, the data center of the service provision center 2000 administers and manages the cloud server 301. Further, the service provision center 2000 manages the user OS instance 318 and the application 319. The service provision center 2000 performs user service provision 322 by using the user OS instance 318 and the application 319, which are managed by the service provision center 2000.

(Service Type 2: IaaS)

Figure 49B:
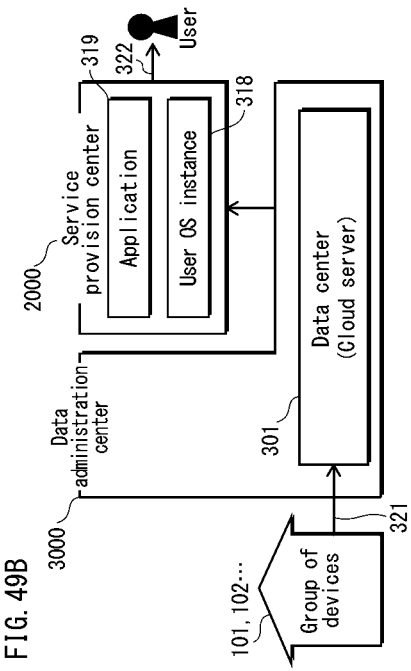
FIG. 49B illustrates service type 2 (IaaS-type service).

FIG. 49B illustrates service type 2 (Infrastructure as a Service, hereinafter IaaS). Here, IaaS is a model in which infrastructure for constructing and operating a computer system is supplied as a cloud service through the Internet.

In this type of service, the data center operator administers and manages the data center 301 (corresponding to the cloud server 301). Further, the service provision center 2000 manages the user OS instance 318 and the application 319. The service provision center 2000 performs user service provision 322 by using the user OS instance 318 and the application 319, which are managed by the service provision center 2000.

(Service Type 3: PaaS)

Figure 49C:
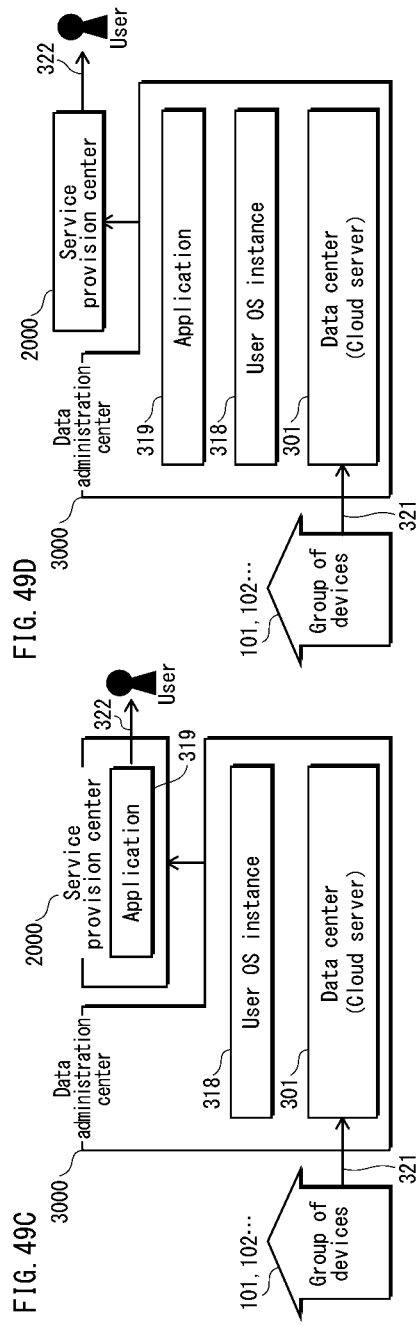
FIG. 49C illustrates service type 3 (PaaS-type service).

FIG. 49C illustrates service type 3 (Platform as a Service, hereinafter PaaS). Here, PaaS is a model in which a platform for constructing and operating a computer system is supplied as a cloud service through the Internet.

In this type of service, the data administration center 3000 manages the user OS instance 318, and administers and manages the data center 301 (corresponding to the cloud server 301). Further, the service provision center 2000 manages the application 319. The service provision center 2000 performs user service provision 322 by using the user OS instance 318, which is managed by the data center operator, and the application 319, which is managed by the service provision center 2000.

(Service Type 4: SaaS)

Figure 49D:
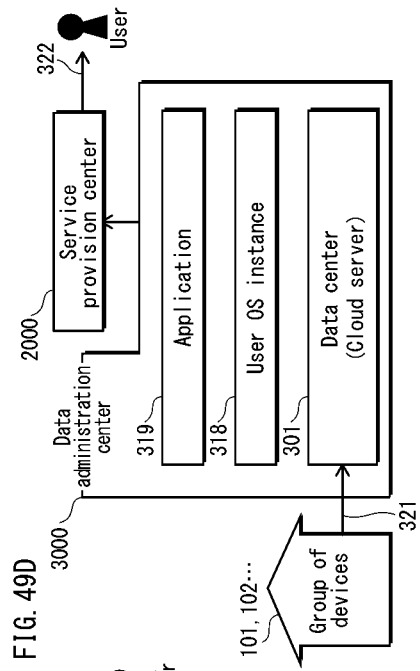
FIG. 49D illustrates service type 4 (SaaS-type service).

FIG. 49D illustrates service type 4 (Software as a Service, hereinafter SaaS). In this model, for example, an application provided by a platform provider having a data center (i.e., a cloud server) is supplied to a business or person (i.e., a user) who does not have a data center (i.e., a cloud server) as a cloud service using a network such as the Internet.

In this type of service, the data administration center 3000 manages the application 319, manages the user OS instance 318, and administers and manages the data center 301 (corresponding to the cloud server 301). The service provision center 2000 performs user service provision 322 by using the user OS instance 318 and the application 319, which are managed by the data administration center 3000.

The main actor in service provision is the service provision center 2000 in all of the above service types. Further, for example, the service provider or the data center operator may develop their own OS, application, or big data database, or may order any of these from a third party.

The following describes a communication sequence when log information is collected and provided via a cloud server.

Figures 50A, 50B, 50C:
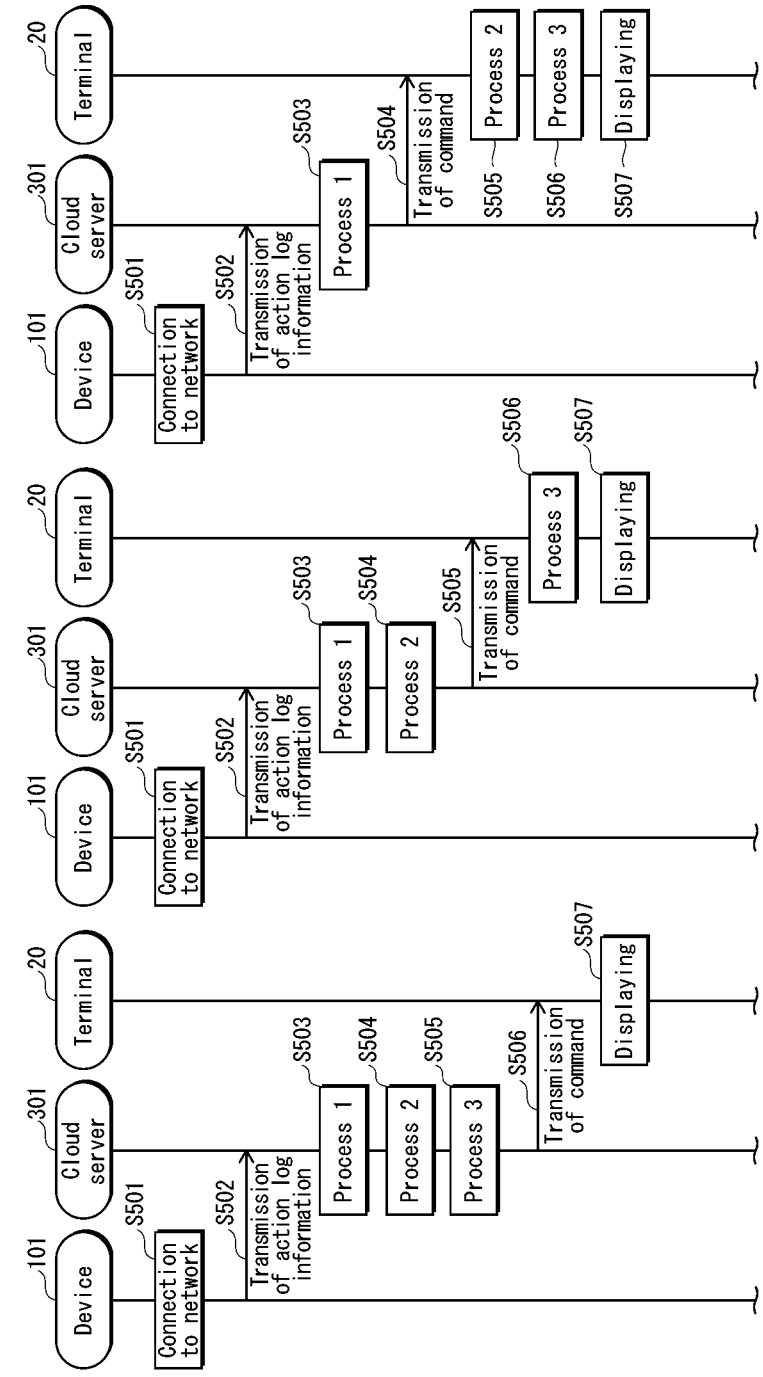
FIG. 50A illustrates a configuration where processes 1 through 3 are all performed by a cloud server 301.
FIG. 50B illustrates a sequence where process 3, among the processes 1 through 3, is executed by the information terminal device 20.
FIG. 50C illustrates a sequence where processes 2 and 3, among the processes 1 through 3, are executed by the information terminal device 20.

FIG. 50A illustrates a basic sequence of the communication between the cloud server 301 and the information terminal device 20. FIG. 50A illustrates a situation where the human-detecting sensor 101, which is a device, performs network connection (S501) and transmits an action log to the cloud server 301, and the cloud server 301 performs processes 1 through 3 described in the following all together. Process 1 (Step S503), process 2 (Step S504), and process 3 (Step S505) are three processes that abstractly correspond to the plurality of procedures described in embodiment 1. In specific, process 1 corresponds to the collection of action statistics based on action logs. Process 2 corresponds to the calculation of display MD information by the display MD information calculation unit 9. Process 3 corresponds to the creation and updating of a store screen by the display control unit 8.

The command transmitted in Step S506 indicates the processing results of processes 1 through 3. The information terminal device 20 performs display in accordance with the command so transmitted (S507). FIG. 50B illustrates a sequence that is a variation of the sequence illustrated in FIG. 50A. In the sequence illustrated in FIG. 50B, among the processes 1 through 3 performed by the cloud server 301 in FIG. 50A, process 3 is executed by the information terminal device 20. FIG. 50C illustrates a sequence that is another variation of the sequence illustrated in FIG. 50A. In the sequence illustrated in FIG. 50C, among the processes 1 through 3 performed by the cloud server 301 in FIG. 50A, processes 2 and 3 are executed by the information terminal device 20.

As such, the present embodiment achieves the provision of MD information having high scalability, due to an application corresponding to the display MD information calculation unit 9 or an application corresponding to the display control unit 8 being loaded to a cloud server, and the calculation of displaying by the display MD information calculation unit 9 or the generation/updating of store screens by the display control unit 8 being performed on a cloud network.

Note that the customer private network, the service provider network, and the cloud network described in embodiment 8 are preferably configured as packet exchange networks. The cloud network is preferably configured as a virtual stub identifiable by a common VLAN tag in a virtual private network (hereinafter, VPN) configured using a layer 3 protocol of multiprotocol label switching (hereinafter, MLPS) or similar. Further, a network node serving as a router or switch in the private customer network preferably has the ability of performing layer 3 communication using MPLS (hereinafter, L3MLPS) and layer 2 communication using Ethernet™ and a virtual private LAN service (hereinafter, VPLS).

Further, the cloud server in embodiment 8 is preferably equipped with an autoscaler. An autoscaler performs performance monitoring, scaling management, and instance management. Performance monitoring involves collecting performance data from a sequence of user OS instances, calculating system performance based on performance metrics that are calculated according to the collected performance data, and generating metrics indicating an average number of requests completed per second, response times, and so on. Scaling management involves assessing whether or not resource in a cloud network is to be adjusted, in response to realistic and inelastic requests. Instance management involves connecting to a sequence of server OS instances via a secure plane connection in a data link layer, and managing the server OS instances generated in a cloud network. Furthermore, the cloud network of Embodiment 8 is preferably equipped with a load distribution device. A load distribution device connects to a sequence of user OS instances via a secure plane connection in a data link layer, and distributes workload among internal servers and/or user OS instances. The distribution is, for example, based on Weighted Round Robin, Least Connections, or Fastest.

Further, the data amount in embodiment 8 is enormous since management is performed of total stop times, reach counts, approach counts, and sold quantities that are accumulated day by day for each shelving unit in each of a plurality of stores in a chain store business. Meanwhile, the above-described autoscaler and load distribution device change the number of generated user OS instances in accordance with a request from the information terminal device 20. Thus, an information provision request from information terminal device 20 receives a quick response even when the data amount is enormous of total stop times, reach counts, approach counts, and sold quantities that are accumulated day by day from a plurality of stores.

(Embodiment 9)

Figure 51A:
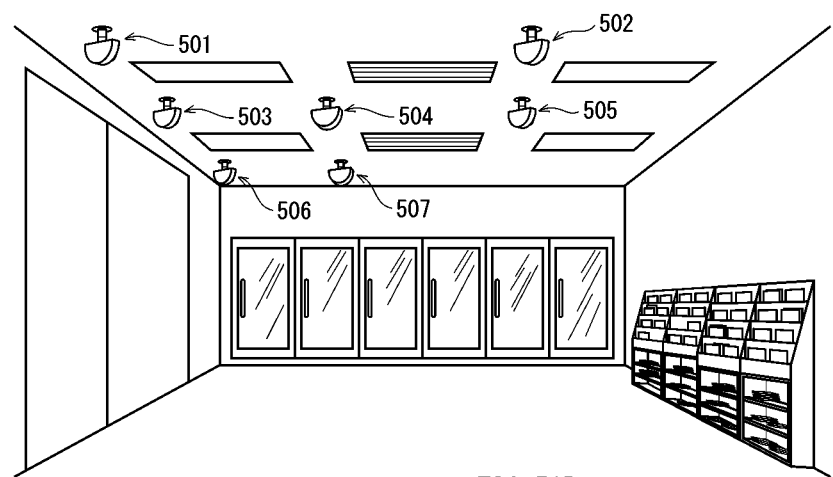
FIG. 51A illustrates the installation of human-detecting sensors in embodiment 9.

In embodiment 1, image sensors are used as human-detecting sensors. In the present embodiment, phase-type distance measurement sensors are used as human-detecting sensors. Phase-type distance measurement sensors include laser range scanners and laser range finders. FIG. 51A illustrates the installation of human-detecting sensors in embodiment 9.

Figure 51B:
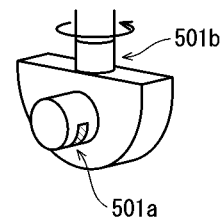
FIG. 51B illustrates the exterior appearance of a phase-type distance measurement sensor 501.

Phase-type distance measurement sensors 501, 502, 503, 504, 505, 506, which are human-detecting sensors, are attached to the ceiling, and perform beam scanning from the ceiling to aisles to form sensing curtains. FIG. 51B illustrates the exterior appearance of the phase-type distance measurement sensor 501. The phase-type distance measurement sensor 501 has a window portion 501a at which a pair of a light-emitting element and a light-receiving element is disposed. The phase-type distance measurement sensor 501 has a platform 501b that adjusts the azimuth (pan) and the elevation (tilt) of the pair of the light-emitting element and the light-receiving element.

Figure 51C:
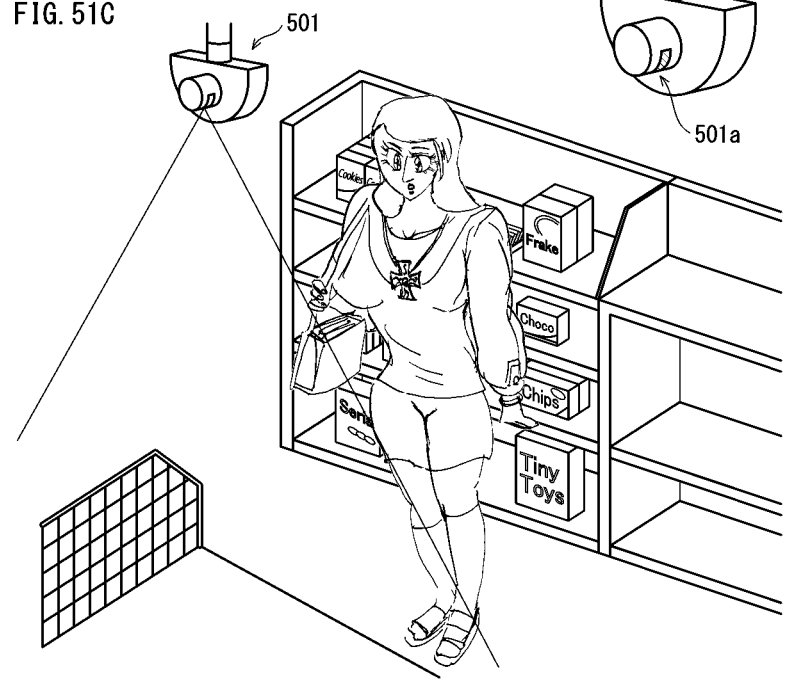
FIG. 51C illustrates a sensing curtain formed by the phase-type distance measurement sensor 501.

FIG. 51C illustrates a sensing curtain formed by the phase-type distance measurement sensor 501. The sensing curtain has a triangular shape, with the phase-type distance measurement sensor 501 at the vertex and an aisle at the base. The angle of the vertex of the sensing curtain equals a movable angle that defines the scanning range of the pair of the light-emitting element and the light-receiving element. In the sensing curtain, the light-receiving element of the phase-type distance measurement sensor 501 receives reflected light that is the reflection of the beam. Here, when denoting a phase difference between the light-emitting element and the light-receiving element as $\Phi$, modulation frequency as f, and the speed of light as c, the distance from the phase-type distance measurement sensor 501 to the reflection target satisfies $L=\Phi \times (c/4\pi f)$. The phase-type distance measurement sensor 501 measures the distance to the reflection target based on the phase difference between light emission and light reception. When a store visitor does not exist, nothing blocks the sensing curtain, which is in front of a shelving unit. As such, the distance measured is the distance from the vertex to the base (distance from the sensor to the aisle).

However, when reaching to the shelving unit occurs, a hand reflects the beam. As such, the distance measured is shorter than the distance measured with nothing blocking the sensing curtain. When such a short distance is detected, a detection is made that hand detection has occurred, assuming that a store visitor has reached for the shelving unit.

As such, the present embodiment achieves excellent detection of occurrence of reaching with respect to a shelving unit by using the phase-type distance measurement sensor 501.

<Notes>

Up to this point, description is provided on preferred embodiments known to the application. However, further modifications and additions can be made, particularly in connection with the technical topics described in the following. A person implementing the present invention may implement the present invention as described in the embodiments or make the following modifications and additions, the decision in which being purely subjective.

<Provision of Optimum Layout by MD Information Management Device 30>

The MD information management device 30, in response to a request from the information terminal device 20, may provide an optimum shelving unit layout. That is, when the information terminal device 20 issues a request for viewing an optimum layout and the request includes a specification of a merchandise genre, the MD information management device 30 may, by using the sales history information management unit 4, search for a maximum sold quantity among sold quantities managed individually for each shelving unit in each store. Further, the MD information management device 30 may send MD information including the sold quantity acquired through the search and store information indicating the shelving unit layout of a store corresponding to the maximum sold quantity to the information terminal device 20 having issued the request. Here, the MD information transmitted in response to the request may include total stop time, reach count, and approach count. Based on the MD information, which includes sold quantity, reach count, approach count, and total stop time, the information terminal device 20 having issued the request may generate a store screen, an auxiliary store screen, and an MD information screen, and display an application screen image. Such a modification allows a user to carefully consider what shelving unit layout is ideal for selling merchandise of a given genre, and how the acquired shelving unit layout differs from the shelving unit layout of the store that the user is in charge of.

<Provision of Standing by MD Information Management Device 30>

The MD information management device 30, in response to a request from the information terminal device 20, may provide a standing of one store among all stores that are managed. That is, when a request for viewing a standing of a given shelving unit of a given store is issued, the MD information management device 30 may calculate an average of sold quantities for merchandise of a specific genre among all the stores managed in the system. Further, the MD information management device 30 may calculate, for the given shelving unit in the given store to which the user having made the request belongs, a variance, a deviation, a total score, and a quota achievement rate with respect to the sold quantities of the merchandise genre. Further, an average, a variance, a deviation, a total score, and a quota achievement rate also may be calculated with respect to each of the reach count, the approach count, and the total stop time. Provision of MD information including an average, a variance, a deviation, a total score, and a quota achievement rate for each of the sold quantity, the reach count, the approach count, and the total stop time to the information terminal device 20, and further, creating and displaying an application screen image including a store screen, an MD information screen, and an auxiliary store screen based on such MD information enables rousing staff into action.

<Display of Monthly and Weekly Graphs>

When a given shelving unit icon is selected, monthly graphs of the total stop time, the reach count, the approach count, and the sold quantity for the corresponding shelving unit may be created and displayed as the first and second graphic items. Such a monthly graph may have a horizontal axis indicating a week or day belonging to a display target period, and a vertical axis indicating a time length for the total stop time or a number of times for the reach count, the approach count, or the sold quantity. Displaying such a graph for a specific shelving unit icon that is selected enables the user to observe store visitor behavior with respect to shelving units from a different point of view. Further, the graph need not be a monthly graph, and may be a weekly graph or a yearly graph. Further, monthly graphs and weekly graphs for shelving units may be converted into thumbnails and composited with the shelving unit icons in the store screen.

<Addition of Search Engine>

A search engine for searching store information, shelving unit information, sales history information, and action statistics information may be provided. Specifically, the information terminal device 20 receives an input of a search condition on an application screen image, and searches for information matching the search condition among store information and shelving unit information managed by the MD information management device 30. When a piece of store information and a piece of shelving unit information matching the search condition is found through the search, the information terminal device 20 may provide the store information, statistical values of action statistics in the shelving unit information, and sold quantities in the sales history for displaying in the form of graphic items in the store screen or in the form of values in the MD information screen. The search condition may be a store ID, a name of a district, a merchandise genre, or a shelving unit. Further, the information terminal device 20 may receive input of a combination of shelving units, and provide for display, statistical values of action statistics and sold quantities in the sales history for a partition including the combination of shelving units. Further, the information terminal device 20 may receive input of a combination of shelving units composing one partition, and perform a search as to whether there exists a store having a shelving unit layout including such a partition.

<Modification of Display of Shelving Units>

The application screen image in embodiment 1 arranges graphic items with respect to a shelving unit layout. Alternatively, shelving units may be sorted according to statistical values of action statistics, or sold quantities of merchandise. Further, the sorting may be performed in response to a user operation performed on a displayed store screen, and a screen after the sorting may be displayed. Further, a function may be provided of making a proposal to the user of a shelving unit layout in which shelving units are arranged in the order of similarity between statistical values.

<Variations of Human-Detecting Sensors>

In the above, human-detecting sensors use image recognition to detect stopping and reaching with respect to shelving units. However, the present invention is not limited to this, and stopping and reaching with respect to shelving units may be detected through a method other than image recognition. For example, be it a primitive method, reaching with respect to a shelving unit may be detected by disposing, at both sides of a shelving unit, sensors that are each composed of a light-emitting element and a light-receiving element and that detect the blocking of light. Providing such sensors achieves detecting the occurrence of reaching since the light from the light-emitting unit is blocked when a store visitor reaches for merchandise on the shelving unit.

<Capturing Range of Human-Detecting Sensors>

In embodiment 1, one human-detecting sensor is provided to each shelving unit to detect user action near the shelving unit. Alternatively, one human-detecting sensor may be used to monitor two or more shelving units. When making such a modification, two or more regions are obtained from an image yielded by one human-detecting sensor, by dividing the image in the horizontal direction. Further, the regions are each allocated to one of two or more shelving units. When the image is divided into n regions, each of the n regions is allocated to one shelving unit. The allocation is performed based on a rule such that the first region from the left is allocated to shelving unit 3, the second region from the left is allocated to shelving unit 2, and the third region from the left is allocated to shelving unit 1. Further, recognition of a human body is performed such that a shelving unit that a store visitor stops by at or a shelving unit that a store visitor reaches for is recognized according to which of the n regions to which coordinates of a human image acquired through the recognition belong to. Further, image sensors used as human-detecting sensors may be surveillance camera devices.

<Variations of Recognition Dictionary 110*d*, Image Recognition Unit 110*f*>

The constituent elements of the human-detecting sensor illustrated in FIG. 4C (i.e., the recognition dictionary 110*d* and the image recognition unit 110*f*) may be provided so as to be used by a plurality of human-detecting sensors. In specific, when making such a modification, each human-detecting sensor may be composed of a camera main body and a communication unit. Further, a log collecting device may be provided to the in-store network, separate from the human-detecting sensors, and the log collecting device may include the recognition dictionary 110*d* and the image recognition unit 110*f*. Alternatively, the recognition dictionary 110*d* and the image recognition unit 110*f* may be provided as constituent elements of the MD information management device 30.

<Transmission of Action Logs>

An action log transmitted by a human-detecting sensor may include image data captured by the human-detecting sensor. Further, the action log may include metadata indicating characteristics of the image captured by the human-detecting sensor. Including such data in an action log enables analysis of the sex and age range by the user, and thus, analysis of action statistics while taking into consideration the sex and age range of store visitors.

<Cycle at which Frame Images for Store Visitor Detection are Captured>

A frame image used for detecting store visitors may be each frame image yielded through capturing of a moving image, or may be each frame image yielded through capturing of still images. When acquiring frame images through capturing of a movie image, the detection of store visitors is performed at a cycle equal to the display cycle when playing back the moving image. For example, when the display frequency of the display is 23.976 Hz, the measurement cycle is 1/23.976 seconds. Alternatively, when display frequency per field is 59.94 Hz, the measurement cycle is 1/59.94 seconds, and when display frequency per field is 50 Hz, the measurement cycle is 1/50 seconds.

When acquiring frame images through capturing of still images, the detection of store visitors is performed at a cycle specified in accordance with the timer setting of the human-detecting sensors. For example, when the timers of the human-detecting sensor are set to five seconds, the human-detecting sensors perform image capturing once every five seconds, and thus, the detection of whether or not store visitors have approached shelving units is performed once every five seconds.

<User Authentication>

Since the MD information is information pertaining to the running of stores and thus of high confidentiality, it is preferable that the information terminal device 20 perform user authentication. Here, the user using the information terminal device 20 is limited to a supervisor of a franchise chain (i.e., a manager that is in charge of a plurality of stores located in one area), a staff at the headquarters of the franchise chain, or an owner of a store that is officially run by the headquarters of the franchise chain. As such, it is preferable that the input unit of the information terminal device 20 perform authentication of whether a user attempting to receive service by using the information terminal device 20 is one of the above-described users.

<Variations of Detection Target>

In embodiment 1, action statistics are based on reaching to merchandise, and are not based on the holding of merchandise. Alternatively, action statistics may be based on holding of merchandise instead of reaching to merchandise.

<Variations of Image Sensors>

The human-detecting sensor 110, which is an image sensor, need not include a platform or the like. Alternatively, the human-detecting sensor 110 may be stationarily installed, so as to capture images within a fixed range. When the camera main body 110*a* is stationarily installed as described above, the adjustment of camera installation angle may be performed manually. Alternatively, the azimuth, the elevation, etc., of the camera main body 110*a* may be changed through operation of an external device.

<Estimation of Three-Dimensional Posture>

The collection of action statistics of store visitors may be performed by estimating a three-dimensional posture of store visitors from image data captured by cameras, and then modeling the posture. Further, the analysis of actions of store visitors may be performed through posture estimation, kinematic analysis, or the like. In order to estimate motion of a human body three-dimensionally from an image yielded by a monocular camera, a probability-based dimension reduction method is used. By using a probability-based dimension reduction method, a model that is acquired through modeling a three-dimensional action in a high dimension posture space into a low dimension potential space is acquired as prior knowledge. Then, by using this action model that is acquired as the prior knowledge, action statistics of store visitors with respect to each shelving unit may be acquired by estimating information necessary for representation in a three-dimensional virtual space from points corresponding to joints of people who are tracked in two-dimensional images, and by categorizing actions of store visitors based on this information.

<Loaded Application>

In embodiment 8, the program structure of the information terminal device 20 includes only a browser. Alternatively, the information terminal device 20 may be provided with an operating system, and the information terminal device 20 may load the MD information calculation application and/or the display control application, whereby the information terminal device 20 achieves the functions of the display control unit 8 and/or the display MD information calculation unit 9. Further, the MD information management device 30 may load only one of the display control application and the display MD information calculation application. Alternatively, the MD information management device 30 need not load either the display control application or the display MD information calculation application. Selecting and loading applications as such achieves the variations of internal structures illustrated in FIGS. 36 through 43.

<Variations of Application Screen Image>

The application screen images illustrated in FIGS. 21 through 23, and FIGS. 29 through 35, are mere examples of GUIs formed by using various widgets. The application screen images in the embodiments may be any application screen image accomplishing the goal of promoting sales of merchandise in the shop. Specifically, the screen displayed by the display control unit 8 encompasses a wide variety of GUIs that are created as described in the following.

i) For receiving selection of an information element in the assessment of shelving unit layout in a store, the display control unit 8 displays widgets such as a toggle button, a radio button, a list box, a slider, a checkbox, a spin button (or drop-down list), a toolbar, a combo box, an icon, and a tree view. A toggle button is a widget whose state changes each time the toggle button is pressed. A radio button is a widget enabling selecting one among a plurality of choices via the input unit 1. A list box is a widget enabling receiving an operation of selecting one or more items from a list of items via the input unit 1. A checkbox is a widget enabling ticking of an item via the input unit 1. The MD information screen in embodiment 1 is created by combining the list box and the checkbox. A slider is a widget used for setting a value by moving a scroll bar. A spin button (drop-down list) is a widget similar to a list box, and in a normal state, displays only selected items. A tool bar is a widget constituted of buttons, icons, etc., that are arrange in a line in a vertical direction or a horizontal direction. The bar at the top of the integrated application screen image in embodiment 2 is created by arranging toggle buttons in line in the horizontal direction. A combo box is a widget of a textbox having added thereto a menu, a list box, and the like. An icon is a widget representing separately-selectable items. A tree view is a widget representing a tree structure. For example, when a shelving unit is represented by using an icon, a tree view may be used to represent the relationship between the shelving unit and the plurality of types of merchandise on the shelving unit. A grid view is a widget in a form of a table that corresponds to an arrangement.

ii) For providing guidance to the user in performing operations in the assessment of shelving unit layout in a store, widgets such as a tab and a scroll bar are used. A tab is a widget resembling folder tabs, and is used for switching between various items to be displayed at the same area of a screen. A scroll bar is a widget used to display, at a given area of a screen, information of a size greater than the area.

iii) For receiving input of text in the assessment of shelving unit layout in a store, widgets such as a text box and a combo box are used. A text box is a widget allowing a user to input text (a character string). A combo box is a widget of a textbox having added thereto a menu, a list box, and the like.

(iv) For providing feedback corresponding to a user operation to a user in the assessment of shelving unit layout in a store, widgets such as a label, a tool tip, a help balloon, a progress bar, and an info bar are used.

A label is a static widget that displays text. A tool tip is a widget that is displayed while a finger, a mouse cursor, or the like is pointing to an item. A balloon help is a widget similar to a tool tip. A status bar is a widget that is usually located bottommost in a window and displays various types of information. A progress bar is a widget displaying the progress of a task, and an infobar is a widget that is displayed below the tool bar in a browser.

For displaying image data in formats such as JPEG, TIFF, and GIF, and for displaying document data in formats such as HTML and XML in the assessment of shelving unit layout in a store, widgets such as a modal window and a palette window are used. A modal window is a child window that requires users to interact with it before it can return to operating the parent window. A dialog box is a window that conveys information such as an error message to a user. A palette window (also referred to as a utility window) is a child window offering various functions. The display control unit 8 displays image data yielded by image-capturing scenery in a store, image data yielded by human-detecting sensors image-capturing a vicinity of shelving units, data of payment slips, and data of shipment statements by using widgets such as a modal window and a palette window.

<Method of Generating Shelving Unit Icons>

A store screen includes shelving unit icons in the embodiments. However, such shelving unit icons are mere examples. For example, a virtual store image may be formed that includes shelving unit icons that are realistic three-dimensional shape models. When making such a modification, each shelving unit icon is configured by using shape model data defining the shape of a shelving unit with three-dimensional coordinates.

Further, the display unit 2 of the information terminal device 20 visualizes a three-dimensional shape model by performing a sequence of rendering processing, including coordinate conversion, illuminance calculation, texture mapping, viewport conversion and the like, on shape model data defining a shelving unit icon. In the texture mapping, a pattern, a character string, or the like providing the user with an image of the merchandise on the shelving unit is pasted. This enables the user to identify the merchandise on each of the shelving units.

<Use of Combined Image>

A graphic item representing action statistics may be a combination of people, animals, or imaginary characters. When making such a modification, change in display state of a graphic item of a shelving unit may be achieved by changing the number of people, animals, or characters in such a combination in accordance with the number of times store visitors stop at the shelving unit, the number of times store visitors approach the shelving unit, the number of time store visitors reach for merchandise on the shelving unit, and the sold quantity of merchandise on the shelving unit, and the graphic item may be composited near the shelving unit in a store image. This achieves visualizing, with higher visual perceptibility, a distribution indicating what actions store visitors have made near the shelving unit.

<Implementation as Program>

The present invention may be configured as a program module that receives arguments specifying a store and/or a shelving unit, and in response, provides a predetermined return value (displaying of an MD information screen and a store screen including a sold quantity graphic item and a statistical value graphic item) by calling a predetermined application programming interface. The program code configuring such a program module, or that is, a program code causing a computer to execute the processing procedures in FIGS. 24 through 28 and FIGS. 44 and 45 can be yielded as follows. First, a software developer, by using programming language, writes a source program realizing each flowchart, each functional constituent element, and the like. Here, the software developer writes a source program realizing each flowchart, each functional constituent element, etc., by using class structures, variables, array variable, and calls for external functions, and in accordance with the syntacs of the programming language.

The source program so written is provided to a compiler in the form of a file. The compiler generates an object program by translating the source program. The translation by the compiler includes processes such as syntax interpretation, optimization, resource allocation, and code generation. Program codes generated in the code generation includes program codes of various types, such as a processor native code and a byte code. The program codes so generated may be provided from an application provider server to a plurality of computers in a distributed computing environment, or may be provided to users in the form of computer-readable non-transitory recording media having the program codes recorded thereon.

INDUSTRIAL APPLICABILITY

The present invention enables management of a plurality of stores run under merchandising contracts, and thus is applicable to business related to stores under merchandising contracts.

REFERENCE SIGNS LIST 1 input unit
2 display unit
8 display control unit
9 display MD information calculation unit
10 information terminal device
20 MD information management device

The invention claimed is:

1. A control method for a system, the system including shelving units in a store, sensors in a vicinity of the shelving units, a management device, and an information terminal the control method comprising:
   collecting, using the sensors, statistics on actions taken in a vicinity of the shelving units by store visitors that approach the shelving units and perform multiple action types, and transmitting the statistics to the management device:
   providing to the information terminal using a controller of the management device, at least two types of merchandising information for merchandising of merchandise displayed on the shelving units, the at least two types of merchandising information including information corresponding to action taken by the store visitors in the vicinity of the shelving units and information corresponding to the statistics on the multiple actions taken by the store visitors in the vicinity of the shelving units:
   storing, using layered plane memories of the information terminal, a store screen image representing a store layout in a background plane memory of the layered plane memories and a merchandising information screen image including a first graphic item and a second graphic item in a foreground plane memory of the layered plane memories;
   the store screen image representing positions of the shelving units in the store and each of the first and the second graphic items representing different merchandising information corresponding respectively to the multiple actions taken by the store visitors in the vicinity of the shelving units and the statistics on the multiple actions taken by the store visitors in the vicinity of the shelving units;
   generating, using a controller of the information terminal a composite display that combines the store screen image in the background plane memory and merchandising information screen image in the foreground plane memory;
   the generating of the composite display also including applying a scaling operation on the first graphic item and the second graphic item of merchandising information screen image such that their sizes are adjusted according to the statistics for each type of the multiple actions taken as indicated by the merchandising information received from the management device; and
   displaying, using a display screen of the information terminal, the generated composite display, the composite display including the store screen image and the first and the second graphic items with the scaling applied.

2. The control method of claim 1, wherein
   the sensors detect presence and actions of store visitors near the shelving units,
   and
   the control method further comprises
   each time one of the sensors transmits an action log indicating that a store visitor has made a predetermined action near one of the shelving units, updating one of the action types of statistics that corresponds to the predetermined action.

3. The control method of claim 2, wherein
   one of the action types of statistics indicates a number of times store visitors approach the shelving units and stop at the shelving units, and
   when one of the sensors transmits an action log indicating that a store visitor has approached one of the shelving units and stopped at the one of the shelving units, the number of times is updated by increasing, in accordance with the transmitted action log, a current value of the number of times managed by the management device.

4. The control method of claim 2, wherein
one of the action types of statistics indicates an amount of time for which store visitors have stopped at the shelving-trait units, and
when one of the sensors transmits an action log indicating that a store visitor has approached one of the shelving units and stopped at the one of the shelving units, the amount of time is updated by increasing, in accordance with a difference between a time point indicating that the store visitor has approached the shelving unit and stopped at the shelving unit and a time point indicating that the store visitor has departed from the shelving unit, a current value of the amount of time managed by the management device.

5. The control method of claim 2, wherein
one of the action types of statistics indicates a number of times store visitors have reached for one of the shelving-amt units, and
when one of the sensors transmits an action log indicating that a store visitor has reached for one of the shelving units, the number of times is updated by increasing, in accordance with the transmitted action log, a current value of the number of times managed by the management device.

6. The control method of claim 1, wherein
one of the first graphic item and the second graphic item is dependent upon one of a number of times store visitors have approached the shelving units, and stopped at the shelving units, an amount of time for which store visitors have stopped at the shelving units, and a number of times store visitors have reached for the shelving units, and another one of the first graphic item and the second graphic item is dependent upon a sold quantity of merchandise on the shelving units.

7. The control method of claim 1, wherein
a scaling factor of the first graphic item and a scaling factor of the second graphic item each have a plurality of level which are applied according to which of a plurality of numerical ranges a corresponding value belongs to, the corresponding value being the value of statistics for the first graphic item and the second graphic item and being a sold quantity for another one of the first graphic item and the second graphic item, and
threshold values defining the numerical ranges are the same for the first graphic item and the second graphic item.

8. The control method of claim 1, wherein
a scaling factor of the first graphic item and a scaling factor of the second graphic item each have a plurality of levels, which are applied according to which of a plurality of numerical ranges a corresponding value belongs to, the corresponding value being the value of statistics for both the first graphic item and the second graphic item, and
a start value of a numerical range of a highest level is based on a maximum one of values of the statistics for a plurality of the shelving units,
a start value of a numerical range of a lowest level is based on a result of dividing the start value of the numerical range of the highest level by a number of levels included in the plurality of levels, and
a start value of a numerical range that is not the highest level or the lowest level is based on a multiple of the start value of the numerical range of the lowest level.

9. The control method of claim 8, wherein
an end value of a given one of the plurality of numerical ranges is based on a result of adding the start value of the numerical range of the lowest level to a start value of the given one of the plurality of numerical ranges.

10. The control method of claim 1 further comprising:
in response to an operation performed by a user for selecting one shelving unit in the store screen, putting the selected shelving unit in elected state; and
when putting one shelving unit in the store screen in the selected state, displaying a merchandising information screen displaying merchandising information for one shelving unit represented by the selected shelving unit, the merchandising information screen displaying a numerical value of the statistics and a character string indicating a type of the numerical value, the numerical value of the statistics being a numerical representation of a value of the statistics corresponding to one of the first graphic item and the second graphic item corresponding to the merchandising information for the one shelving unit.

11. The control method of claim 10 further comprising
when putting one shelving unit in the store screen in the selected state, displaying an auxiliary store screen including at least one shelving unit, wherein
the at least one shelving unit in the auxiliary store screen corresponds one-to-one with the at least one shelving unit in the store screen, and
the character string and the numerical value in the merchandising information screen and the at least one shelving unit in the auxiliary store screen are displayed without overlapping one another.

12. The control method of claim 11, wherein
when putting one shelving unit in the store screen in the selected state, the auxiliary store screen and the merchandising information screen are displayed on the display at a same time so as to overlap with the store screen, and the control method further comprises
when the auxiliary store screen and the merchandising information screen overlap with the store screen, putting the at least one shelving unit in the store screen in non-selectable state.

13. The control method of claim 11 further comprising
when putting one shelving unit in the store screen in the selected state, causing a state of a shelving unit in the auxiliary store screen that corresponds to the selected shelving unit to transition to a state differing from a state of another shelving unit in the auxiliary store screen.

14. The control method of claim 11 further comprising
when putting one shelving unit in the auxiliary store screen in selected state, updating the merchandising information screen so as to display a numerical value of statistics and a character string indicating a type of the numerical value for one shelving unit represented by the selected shelving unit in the auxiliary store screen.

15. The control method of claim 10 further comprising:
with a first graphic item and a second graphic item corresponding to one shelving unit being displayed, when a selection of another shelving unit is detected, deleting the first graphic item and the second graphic item and displaying, at a same time, the store screen and a merchandising information screen displaying merchandising information for one shelving unit corresponding to the selected shelving unit; and causing a display state of the selected shelving unit to transition to a display state differing from a display state of another shelving unit.

16. The control method of claim 1 further comprising with a first graphic item and a second graphic item corresponding to one shelving unit being displayed, when a selection of another shelving unit is detected, deleting the first graphic item and the second graphic item.

17. The control method of claim 1 further comprising with first graphic items and second graphic items corresponding to two or more shelving unit being displayed, when a selection of one of the two or more shelving unit is detected, continuing to display a first graphic item and a second graphic item corresponding to the selected shelving unit and deleting each first graphic item and each second graphic item corresponding to each shelving unit, among the two or more shelving unit, other than the selected shelving unit.

18. The control method of claim 1 further comprising with a first graphic item and a second graphic item corresponding to one shelving unit being displayed, when a selection of another shelving unit is detected, continuing to display the first graphic item and the second graphic item.

19. The control method of claim 1, wherein a first graphic item and a second graphic item are overlaid with respect to each of all shelving unit in the store screen, and the control method further comprises with first graphic items and second graphic items corresponding to all shelving unit, when a selection of one shelving unit is detected, continuing to display the first graphic items and the second graphic items regardless of the detection of the selection.

20. The control method of claim 1 further comprising:

receiving a selection of two or more shelving unit on the store screen, and in response to a selection of two or more shelving unit on the store screen, displaying a first graphic item and a second graphic item corresponding to each of the two or more selected shelving unit, and displaying a numerical value obtained by summing values of statistics for the two or more selected shelving unit.

21. The control method of claim 1 further comprising:

receiving a selection of two or more shelving unit on the store screen; and in response to a selection of two or more shelving unit on the store screen, displaying, on or near each of the two or more selected shelving unit, a first graphic item and a second graphic item corresponding to the selected shelving unit.

22. The control method of claim 1 further comprising:

when receiving a selection of one shelving unit on the store screen by a user, putting the selected shelving unit in selected state; and displaying a select-all button when a genre of merchandise on a shelving unit represented by the selected shelving unit satisfies a predetermined condition, wherein the predetermined condition is that merchandise belonging to the genre is on at least one shelving unit other than the shelving unit represented by the selected shelving unit, and pressing of the all-select button puts shelving unit corresponding to shelving units with merchandise belonging to the genre in selected state.

23. A control method for a system including shelving units in a store, sensors in a vicinity of the shelving units, management device, and an information terminal, the control method comprising:

unit collecting, using the sensors, statistics on actions taken in a vicinity of the shelving units by store visitors that approach the shelving units and perform multiple action types, and transmitting the statistics to the management device:

providing to the information terminal using a controller of the management device, at least two types of merchandising information for merchandising of merchandise displayed on the shelving units, the at least two types of merchandising information including information corresponding to action taken by the store visitors in the vicinity of the shelving units and information corresponding to the statistics on the multiple actions taken by the store visitors in the vicinity of the shelving units:

storing, using layered plane memories of the information terminal a store screen image representing a store layout in a background plane memory of the layered plane memories and a merchandising information screen image including a first graphic item and a second graphic item in a foreground plane memory of the layered plane memories;

the store screen image representing positions of the shelving units in the store and each of the first and the second graphic items representing different merchandising information corresponding respectively to the multiple actions taken by the store visitors in the vicinity of the shelving units and the statistics on the multiple actions taken by the store visitors in the vicinity of the shelving units;

generating, using a controller of the information terminal a composite display that combines the store screen image in the background plane memory and merchandising information screen image in the foreground plane memory;

the generating of the composite display also including applying a scaling operation on the first graphic item and the second graphic item of merchandising information screen image such that their sizes are adjusted according to the statistics for each type of the multiple actions taken as indicated by the merchandising information received from the management device;

displaying, using a display screen of the information terminal, the generated composite display, the composite display including the store screen image and the first and the second graphic items with scaling applied;

in response to an operation performed by a user for selecting one shelving unit on the store screen, putting the selected shelving unit in a selected state; and when putting the selected shelving unit in the selected state, displaying an auxiliary store screen and the merchandising information screen displaying merchandising information for a shelving unit represented by the selected shelving unit, wherein the merchandising information screen displays a numerical value of statistics and a character string indicating a type of the numerical value, the statistics pertaining to an action that store visitors make near the selected shelving unit, the auxiliary store screen includes a plurality of shelving units corresponding one-to-one with the plurality of shelving units in the store screen, and the character string and the numerical value in the merchandising information screen and the plurality of shelving unit in the auxiliary store screen are displayed without overlapping one another.

24. A control method for a system including shelving units in a store, sensors in a vicinity of the shelving units, a management device, and an information terminal the control method comprising:

collecting, using the sensors, statistics on actions taken in a vicinity of the shelving units by store visitors that approach the shelving units and perform multiple action types, and transmitting the statistics to the management device:

providing to the information terminal, using a controller of the management device, at least two types of merchandising information for merchandising of merchandise displayed on the shelving units, the at least two types of merchandising information including information corresponding to action taken by the store visitors in the vicinity of the shelving units and information corresponding to the statistics on the multiple actions taken by the store visitors in the vicinity of the shelving units:

storing, using layered plane memories of the information terminal, a store screen image representing a store layout in a background plane memory of the layered plane memories and a merchandising information screen image including a first graphic item and a second graphic item in a foreground plane memory of the layered plane memories;

the store screen image representing positions of the shelving units in the store and each of the first and the second graphic items representing different merchandising information corresponding respectively to the multiple actions taken by the store visitors in the vicinity of the shelving units and the statistics on the multiple actions taken by the store visitors in the vicinity of the shelving units:

generating, using a controller of the information terminal, a composite display that combines the store screen image in the background plane memory and merchandising information screen image in the foreground plane memory;

the generating of the composite display also including applying a scaling operation on the first graphic item and the second graphic item of merchandising information screen image such that their sizes are adjusted according to the statistics for each type of the multiple actions taken as indicated by the merchandising information received from the management device:

displaying, using a display screen of the information terminal the generated composite display, the composite display including the store screen image and the first and the second graphic items with scaling applied;

when receiving a selection of one shelving unit on the store screen by a user, putting the selected shelving unit in a selected state; and displaying a select-all button when a genre of merchandise on a shelving unit represented by the selected shelving unit satisfies a predetermined condition, wherein the predetermined condition is that merchandise belonging to the genre is on at least one shelving unit other than the shelving unit represented by the selected shelving unit, and pressing of the all-select button puts shelving unit corresponding to shelving units with merchandise belonging to the genre in selected state.

* * * * *